(12) United States Patent
Grudzien et al.

(10) Patent No.: US 11,366,061 B2
(45) Date of Patent: Jun. 21, 2022

(54) PROTEIN MICROARRAY ASSAY IMAGER

(71) Applicant: Grace Bio-Labs, Inc., Bend, OR (US)

(72) Inventors: Jennipher Lyn Grudzien, Bend, OR (US); Michael Albert Shultz, Bend, OR (US); Florian Gene Bell, Bend, OR (US); Charles M. McGrath, Bend, OR (US)

(73) Assignee: Grace Bio-Labs, Inc., Bend, OR (US)

( * ) Notice: Subject to any disclaimer, the term of this patent is extended or adjusted under 35 U.S.C. 154(b) by 660 days.

(21) Appl. No.: 14/162,608

(22) Filed: Jan. 23, 2014

(65) Prior Publication Data

US 2014/0206580 A1    Jul. 24, 2014

Related U.S. Application Data

(60) Provisional application No. 61/901,354, filed on Nov. 7, 2013, provisional application No. 61/756,392, filed on Jan. 24, 2013.

(51) Int. Cl.
   *G01N 21/64*       (2006.01)
   *B82Y 15/00*       (2011.01)

(52) U.S. Cl.
   CPC ..... *G01N 21/6452* (2013.01); *G01N 21/6458* (2013.01)

(58) Field of Classification Search
   None
   See application file for complete search history.

(56) References Cited

U.S. PATENT DOCUMENTS

| 5,505,928 A | 4/1996 | Alivisatos et al. |
| 5,674,698 A | 10/1997 | Zarling et al. |
| 5,690,807 A | 11/1997 | Clark, Jr. et al. |

(Continued)

FOREIGN PATENT DOCUMENTS

| EP | 1271154 A2 | 1/2003 |
| EP | 2520636 A1 | 11/2012 |

(Continued)

OTHER PUBLICATIONS

Bavykin, Sergei G., et al. "Portable System for Microbial Sample Preparation and Oligonucleotide Microarray Analysis", Applied and Environmental Microbiology, vol. 67, No. 2, Feb. 2001, pp. 922-928.

(Continued)

*Primary Examiner* — Neil N Turk
(74) *Attorney, Agent, or Firm* — McCoy Russell LLP

(57) ABSTRACT

An approach is described that combines distinct properties of a specialized porous nitrocellulose film (PNC) with quantum nanoparticles to create an improved assay and detection sensitivity, permitting the development of a camera-based imaging system for fluorescent detection of macromolecules in microarray format. The two properties of PNC that facilitate the approach are an extraordinarily high binding capacity and a newly observed internal scattering of light. Quantum nanoparticles complement these PNC properties by providing a higher level of emitted light than the fluorescent dyes in common microarray use. Overall, the approach allows for instrument cost savings, reduced imaging time, and the ability to remotely image.

19 Claims, 21 Drawing Sheets

(56) References Cited

U.S. PATENT DOCUMENTS

| | | | |
|---|---|---|---|
| 5,863,504 A * | 1/1999 | Heffelfinger | G01N 21/64 |
| | | | 422/50 |
| 6,207,392 B1 | 3/2001 | Weiss et al. | |
| 6,274,323 B1 | 8/2001 | Bruchez et al. | |
| 6,306,610 B1 | 10/2001 | Bawendi et al. | |
| 6,326,144 B1 | 12/2001 | Bawendi et al. | |
| 6,630,307 B2 | 10/2003 | Bruchez et al. | |
| 6,743,581 B1 * | 6/2004 | Vo-Dinh | C12Q 1/001 |
| | | | 356/335 |
| 6,773,884 B2 | 8/2004 | Mirkin et al. | |
| 6,818,435 B2 | 11/2004 | Carvalho et al. | |
| 6,855,551 B2 | 2/2005 | Bawendi et al. | |
| 7,033,747 B2 | 4/2006 | Gordon | |
| 7,141,416 B2 | 11/2006 | Krutzik | |
| 7,235,361 B2 | 6/2007 | Bawendi et al. | |
| 8,298,677 B2 | 10/2012 | Wiesner et al. | |
| 2001/0055764 A1 * | 12/2001 | Empedocles | B82Y 15/00 |
| | | | 435/6.11 |
| 2002/0090320 A1 * | 7/2002 | Burow | B01L 9/523 |
| | | | 422/64 |
| 2003/0003464 A1 | 1/2003 | Phan et al. | |
| 2005/0191756 A1 * | 9/2005 | Corson | G01N 21/15 |
| | | | 436/164 |
| 2006/0132778 A1 * | 6/2006 | Curry | G01N 15/1468 |
| | | | 356/417 |
| 2006/0253035 A1 * | 11/2006 | Stern | G01N 21/6428 |
| | | | 600/476 |
| 2007/0098596 A1 | 5/2007 | Fries et al. | |
| 2008/0226562 A1 | 9/2008 | Groves et al. | |
| 2009/0309967 A1 | 12/2009 | Kim et al. | |
| 2010/0283005 A1 | 11/2010 | Pickett et al. | |
| 2012/0016616 A1 | 1/2012 | Kato et al. | |
| 2012/0252018 A1 | 10/2012 | Bruchez et al. | |

FOREIGN PATENT DOCUMENTS

| | | |
|---|---|---|
| GB | 2341924 A | 3/2000 |
| WO | 0017655 A1 | 3/2000 |

OTHER PUBLICATIONS

Fenner, D.B., et al., "Development of A First-Responder Fluorescence Reader for Microarray Cytokine Assay of Human Immune Response to Disease", MRS Proceedings, vol. 1004, No. 1, Cambridge University Press, Apr. 2007, 7 pages.

Geho, David, et al. "Pegylated, Steptavidin-Conjugated Quantum Dots are Effective Detection Elements for Reverse-Phase Protein Microarrays", Bioconjugate Chemistry, vol. 16, No. 3, May 2005, pp. 559-566.

Thompson, Deanna L. et al., "An Adaptable Portable Microarray Reader for Biodetection", Sensors, vol. 9, No. 4, Apr. 14, 2009, pp. 2524-2537.

* cited by examiner

PROTEIN MICROARRAY ASSAY IMAGER

CROSS REFERENCE TO RELATED APPLICATIONS

The present application claims priority to U.S. Provisional Patent Application No. 61/756,392, filed on Jan. 24, 2013, and U.S. Provisional Patent Application No. 61/901,354 filed Nov. 7, 2013, the entire contents of each of which are hereby incorporated by reference for all purposes.

FIELD

The present application relates to methods and systems for imaging microarray data, such as protein microarray data.

BACKGROUND AND SUMMARY

Many methods have been developed for the detection of analytes, such as proteins, using microarrays. One widely used method is fluorescence scanning. In this technique, labels, such as fluorescent dyes (also known as organic fluorophores) are conjugated to markers within each microarray spot on an assay surface during an assay. The assay surface may be a mechanical planar surface, such as a microscope slide, a microarray channel, a microarray well, etc. For example, organic fluorophores may be conjugated to protein markers in a protein assay. The proteins are subsequently identified by measuring the fluorescent light emitted by the fluorophores when they are stimulated by light of a particular excitation wavelength, characteristic of the individual fluorophore.

Various scanning or imaging devices can be used for the detection and quantification of the analytes. These devices may use one or more light sources and detectors. Their merits include brightness of the source, efficiency of the beam-steering optics and filters, and sensitivity of the detectors. However, based on the combination of light source and detector selected, the price and performance of the device may vary. For example, the instruments that perform the best can be very expensive. In addition, the devices tend to be bulky and not easily amenable to remote handling.

Another issue with the scanning devices is that the instrument settings need be adjusted to optimized without which the microarray images can be either saturated (that is, too much signal) or not detectable at all (that is, too little signal). Since the operator may not be able to decide settings a priori, once the results of a scan are available, the operator can make adjustments to the instrument settings based on whether the images are saturated or invisible. The operator may then need to repeat the scan at the adjusted settings. Given that a single scan can take up to several minutes to complete, this iterative process can become very time consuming and inefficient.

The inventors herein have recognized that by using porous nitrocellulose in conjunction with quantum nanoparticle fluorophores in microarray systems, the detection sensitivity of the assays can be improved while also permitting the development of more efficient, yet more compact and cost-effective instruments. In particular, by using porous nitrocellulose as a microarray assay substrate, the high binding capacity and enhanced internal scattering properties of porous nitrocellulose can be leveraged to provide a higher level of emitted light. Consequently, imaging can be performed using single source lasers and digital cameras (such as CCD cameras) to stimulate the fluorophores. Overall, the cost of microarray imaging is reduced. In addition, the instrumentation can be made cheaper and more compact. Further still, the combination may be couplable to robotic fluid handling assay systems, enabling remote imaging and analysis. The inventors have further recognized that by using a camera for imaging, various dithering algorithms may be developed to increase the resolution of captured images during the acquisition or as a post-acquisition process. As such, this improves image analysis while also reducing the need for reiterating scans.

Thus in one example, the issues may be addressed by a microarray imaging system. In one embodiment, a microarray imaging system comprises: a first light source including a diode laser; a second light source configured to provide one or more of ultraviolet and visible light; a digital optical receiver; and a processor having instructions for processing and storing images generated by the optical receiver. In this way, fluorescence scanning of microarrays can be improved through the use of more efficient, compact, and cost-effective imagers.

In another embodiment, a method for generating an image of an assay surface, comprises: capturing a first set of images of an assay surface at a microarray imager with a laser light source disabled, mathematically stacking the first set of images to determine a background correction.

Then, the method includes capturing a second set of images of the assay surface at the microarray imager with the laser light source enabled, mathematically stacking the second set of images to generate an accumulated image, and applying the determined background correction to the accumulated image to generate a corrected image. In this way, microarray image processing is made faster and more sensitive.

As used herein, the assay surface may be various surfaces, such as a mechanical planar or non-planar surface, onto which a substrate may be layered and a marker can be attached. The assay surface may include, as one example, the flat surface of a standard microscope slide made of glass or plastic. The microscope slide may be of a 75 mm by 35 mm format and may be 1 mm thick. In another example, the slide may be of a 110 mm by 75 mm format and may be 1 mm thick. The surface of the slide may be coated with an assay substrate such as porous nitrocellulose. The assay marker may then be coated on the assay substrate, and analyzed using various assay methods discussed herein.

In another example, the assay surface may include a slide having a microarray channel, where the surface may include the inner surface of the channel, such as side walls or curved inner surfaces of the channel. As another example, the assay surface may include the surface in microtitre wells of a microtitre slide or plate coated with porous nitrocellulose, where a microarray is printed on the bottom of the well on the surface. The microtitre slide or plate (or microplate) may be a flat plate with a 2:3 rectangular matrix. The plate may be made of glass or plastic. The plate may be configured with multiple wells that may be available in 6, 24, 96, 384, or 1536 well formats. Still other examples of assay surfaces may include channels in a lateral flow device coated with a porous nitrocellulose membrane on the surface. Still other examples may include non-planar surfaces such as the interior walls of a well or channel coated with substrate (e.g., for capturing antibodies). The use of standardized microarray surfaces, such as microscope slides, microtitre plates, microtitre wells and channels, etc., allows for several array surfaces to be labeled, transported, and stored with ease. Further, the surfaces can be quickly inserted and removed from the imaging system.

It will be appreciated that as used in some examples herein, the term "microarray slide" may be used to refer to an example microarray assay surface. However, the term is not meant to be limiting and any of the above-discussed microarray assay surfaces (planar or non-planar) may be used in alternative examples. As such, any surface that can be coated with an assay substrate, such as porous nitrocellulose, and then layered with a biomarker for analysis using a label, such as a fluorophore label, may be used as an assay surface herein.

In another embodiment, a method for microarray slide imaging comprises: operating a light source to capture a plurality of images of an assay surface of a microarray slide, the plurality of images captured across a length of the slide over a duration; and processing the captured images to reconstruct a single image of the assay surface of the microarray slide. In this way, the need for reiterative scans is reduced.

In another embodiment, a microarray imaging system comprises a single source diode laser; a digital camera; a filter for adjusting an emission wavelength of light emitted by the laser; an assay surface having a porous nitrocellulose substrate impregnated with a protein, the protein multiplexed to a plurality of quantum nanoparticles, each of the plurality of quantum nanoparticles having distinct emission wavelengths and a processor. The processor may be configured with computer readable instructions for: operating the laser with the filter at a first position to excite the assay surface with light of a first wavelength; capturing a first set of images at the camera of a first emission profile of the assay surface; operating the laser with the filter at a second position to excite the assay surface with light of a second, different wavelength; capturing a second set of images at the camera of a second emission profile of the assay surface; and processing the images for overlap correction between the plurality of quantum nanoparticles. In this way, the accuracy of images in multiplexed assays is improved. In one example, the assay surface is on a microarray slide.

In yet another embodiment, a method for microarray slide imaging comprises: operating a light source to capture a plurality of images of a microarray slide, the microarray slide including a fluorophore conjugated biomolecule coupled to a substrate of the slide, the slide further including one or more human or machine readable markings on the substrate of slide; and mathematically processing the plurality of images to reconstruct a single image of the slide, the single image including the one or more human or machine readable markings. In this way, the entire image of the slide can be reconstructed.

As used herein, the discrete diode laser may include a single-mode laser that emits light from only one mode of oscillation or a multi-mode laser where the laser is oscillating with several modes, each closely spaced in wavelength. As such, both the single-mode laser and the multi-mode laser may be capable of providing a substantially single wavelength excitation light source.

It will be appreciated that while the example embodiments described herein use nitrocellulose as the solid microarray assay substrate (e.g., in membrane or microtiter well form), in alternate embodiments, other substrates may be used that provide a binding affinity like porous nitrocellulose, and that further provide resonant scattering and low value of native fluorescence. These may include, for example, polyvinylchloride (e.g., sheets or microtiter wells); polystyrene latex (e.g., beads or microtiter plates); polyvinylidine fluoride; diazotized paper; nylon membranes; activated beads, magnetically responsive beads, and the like.

As one example, a compact, low-cost, high-resolution scanning system is provided for imaging and analyzing biomolecule microarrays on porous nitrocellulose. The resulting system, when used for measuring biomolecule analytes, has a dynamic range and sensitivity comparable, and in some cases exceeding, that of conventional laser-focused scanners but at a much reduced capital investment. The system is flexible in that it can be configured as a multiplex-assay scanner through the use of multi-wavelength fluorescent-nanoparticle labels such as quantum nanoparticles or other alternative labels whose brightness is greater than organic fluorophores and have similar properties to quantum nanoparticles. Suitable alternative labels should have an extinction coefficient of about 10 million per molar per cm. It may also be configured as a dedicated detector suitable for use in identifying particular biomolecules marked with single-wavelength emitters. Through the use of PNC substrates, an assay in accordance with the present disclosure has an increased protein-binding capacity relative to clear nitrocellulose, epoxy substrates, or functionalized glass. Further, signal increases due to backscatter and proper selection of excitation and emission wavelengths is enabled through the use of PNC. The unique combination of imaging software (including signal deconvolution and overlap correction algorithms), substantially brighter fluorophores, porous nitrocellulose film, and digital imaging offers the potential to provide high-performance microarray scanning at a fraction of the cost of conventional systems.

In this way, a microarray imaging system can be provided in which the excitation source is a high-intensity discrete diode laser and the detector is an imaging chip such as is used in modern digital cameras. The advantages to using a discrete diode laser source are low cost, high-intensity, minimal power requirements, and the availability of diodes and lenses. The advantage of using a single laser as opposed to a plurality of lasers is enabled by the common excitation of various inorganic fluorophores (quantum nanoparticles) and provides a cost advantage. The advantage of using digital camera technology is its inherent speed of imaging, low cost, good resolution, and the ease of availability of components. Overall, microarray imaging systems can be made more compact and cost-effective while also improving accuracy and resolution of images.

Although the above system has been described in the context of bright fluorophores, the system could also be used with organic fluorophores in the instances where there is a substantial amount of analyte to be detected and the full sensitivity of the system is not required. In these cases, the system still offers the advantages of economy, size, and ease of use.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
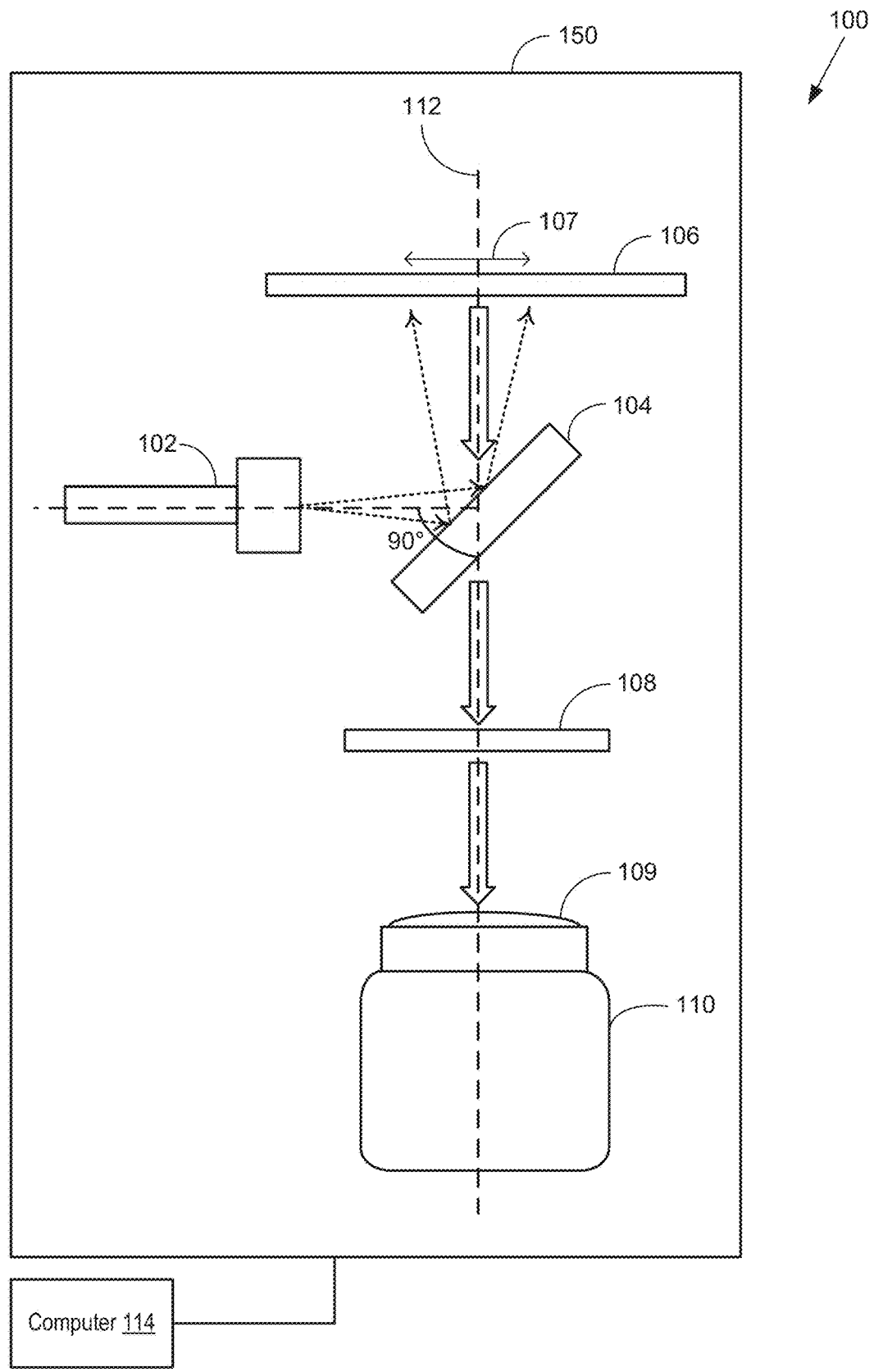
FIG. 1 shows an illustration of the alignment of components in the microarray assay imager.
Figure 2:
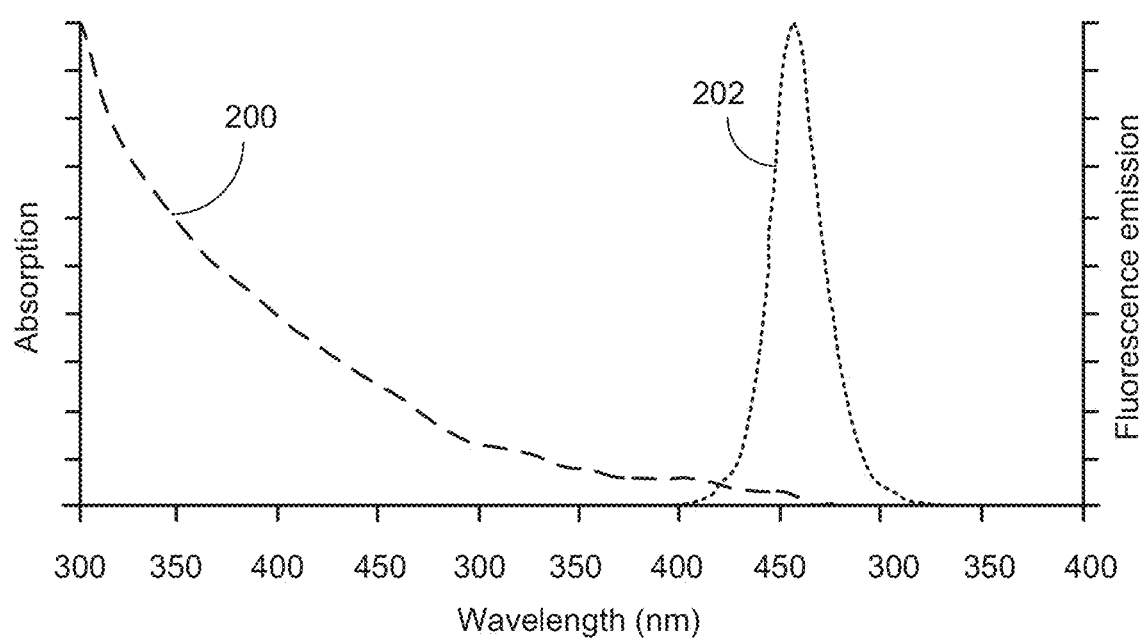
FIG. 2 shows an emission and absorption spectra for an example QNP.
Figure 10:
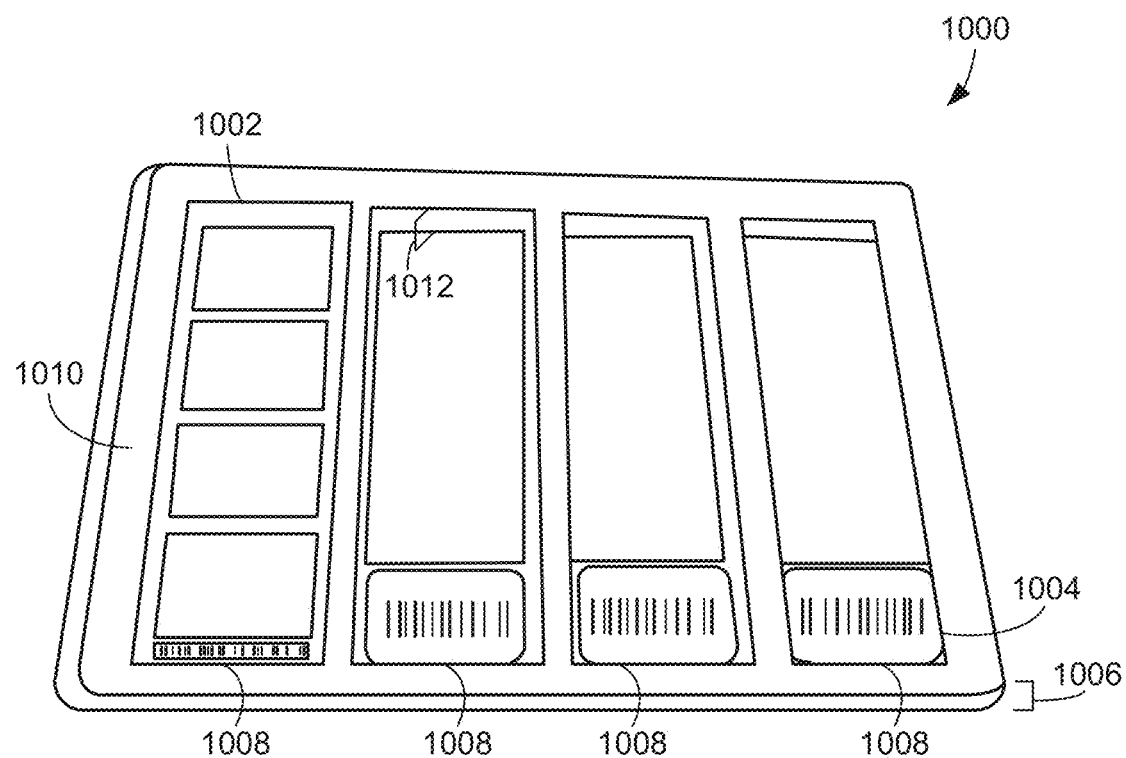
FIG. 10 shows a slide adapter tray for holding microarray slides.
Figure 11:
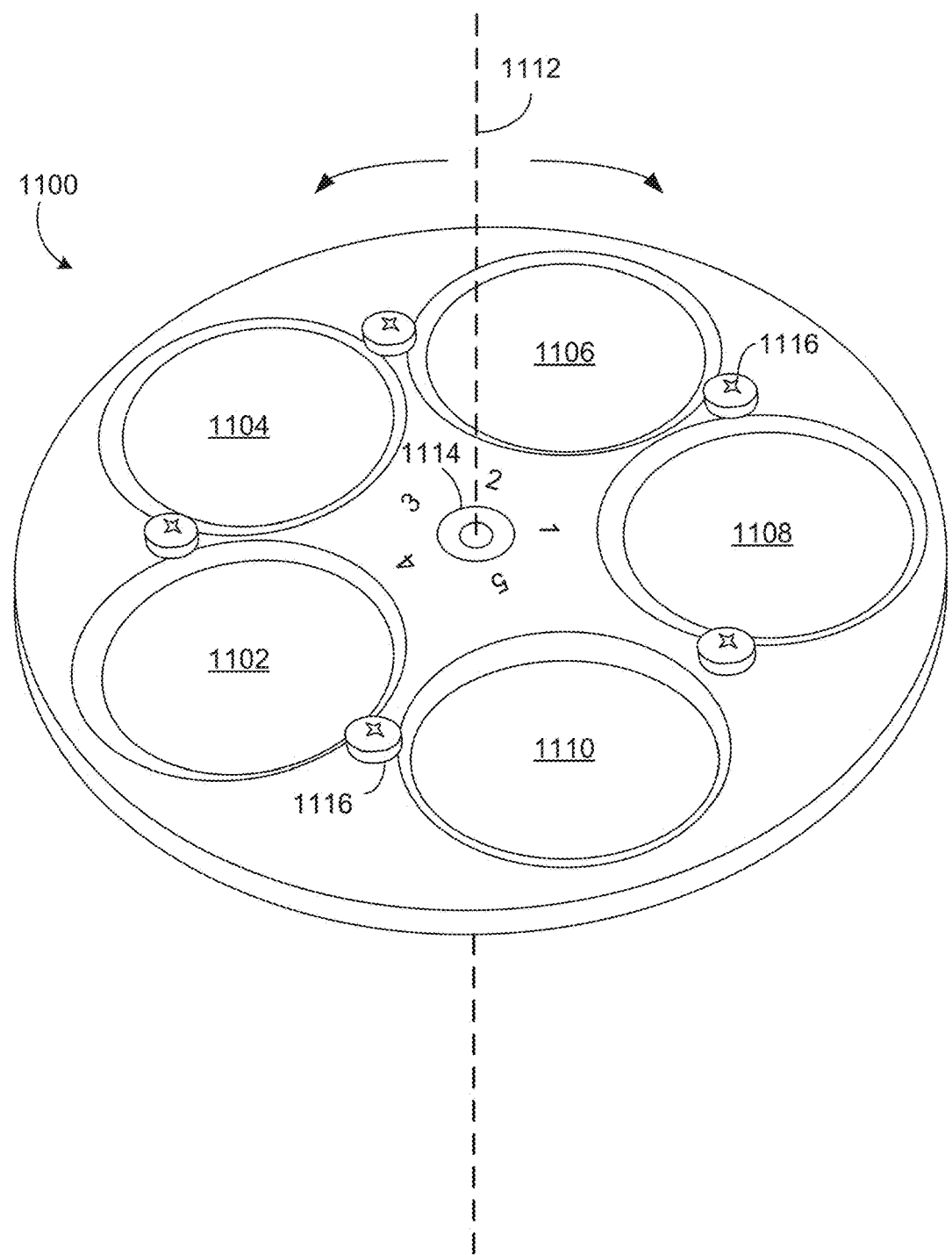
FIG. 11 shows a five-element filter wheel for optical filtering of emission spectra.
Figure 12A:
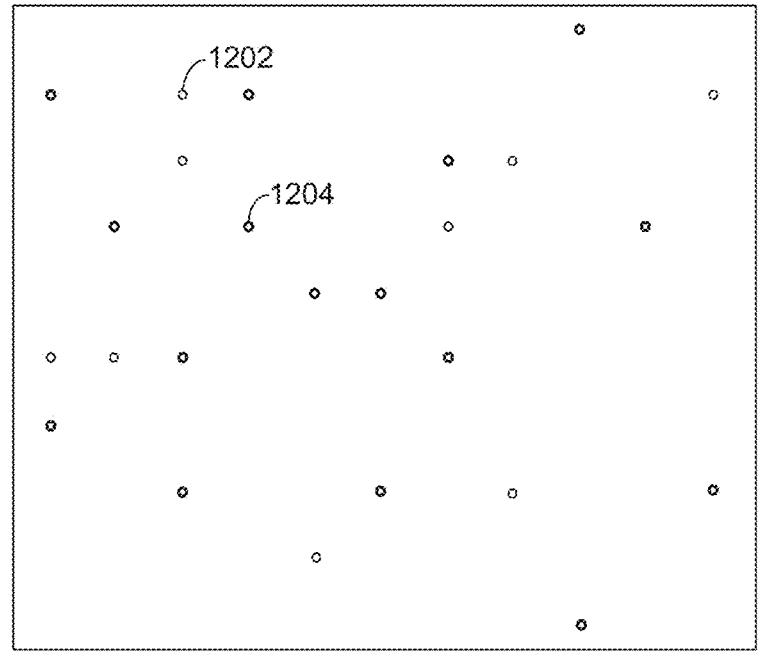
FIG. 12A shows an example colorimetric assay image at a first time point.
Figure 12B:
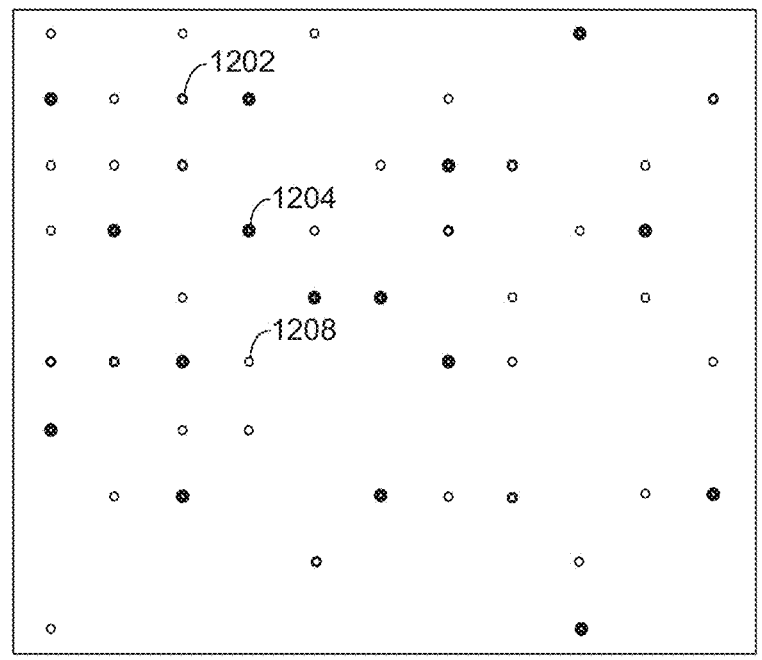
FIG. 12B shows an example colorimetric assay image at a second time point.
Figure 13:
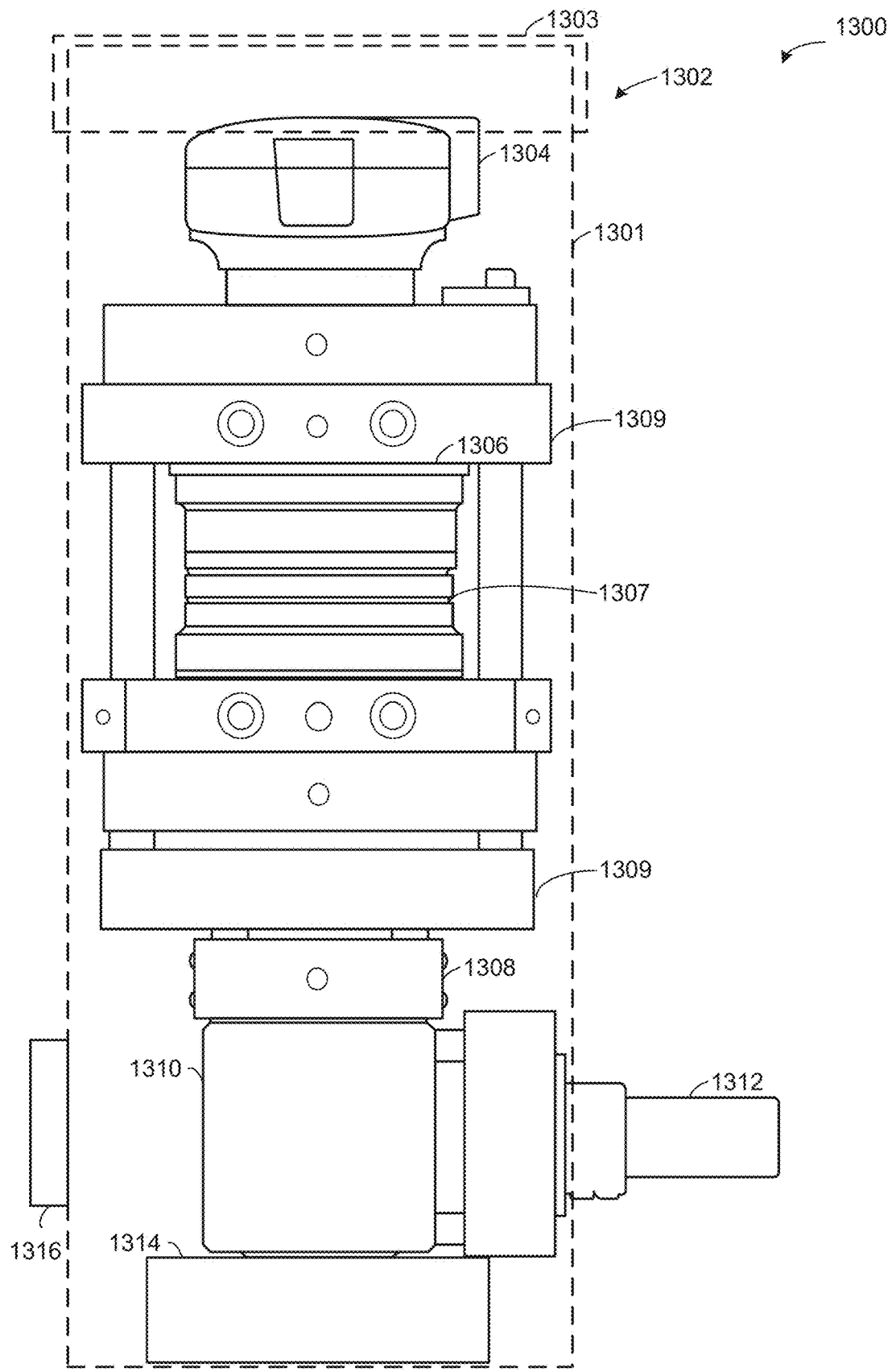
FIG. 13 shows an illustration of a remote acquisition head of a microarray assay imager.
Figure 14:
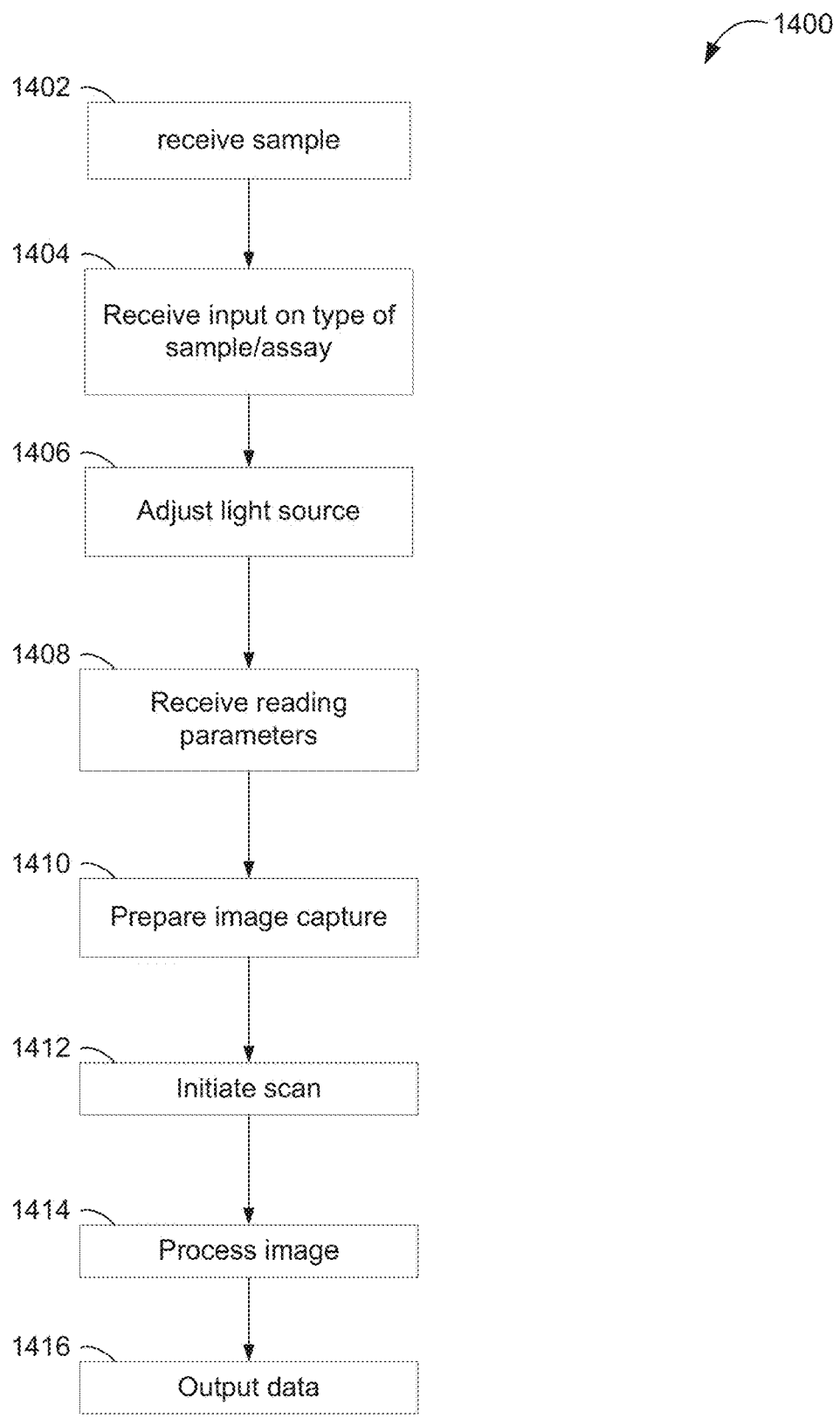
FIG. 14 shows an example flowchart of a method of performing a microarray assay.
Figure 15:
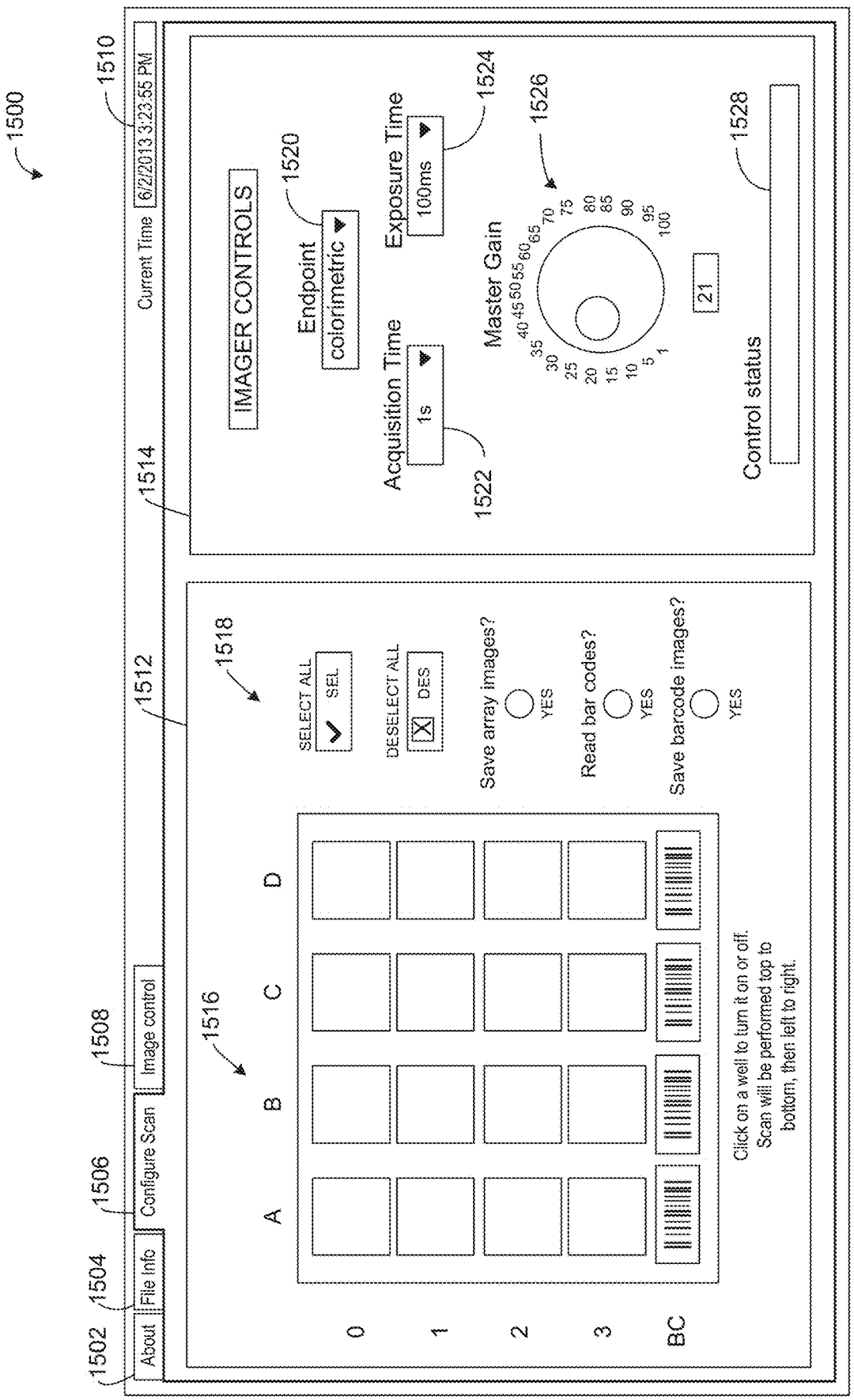
FIG. 15 shows an example software interface for controlling the microarray assay imager.
Figure 18A:
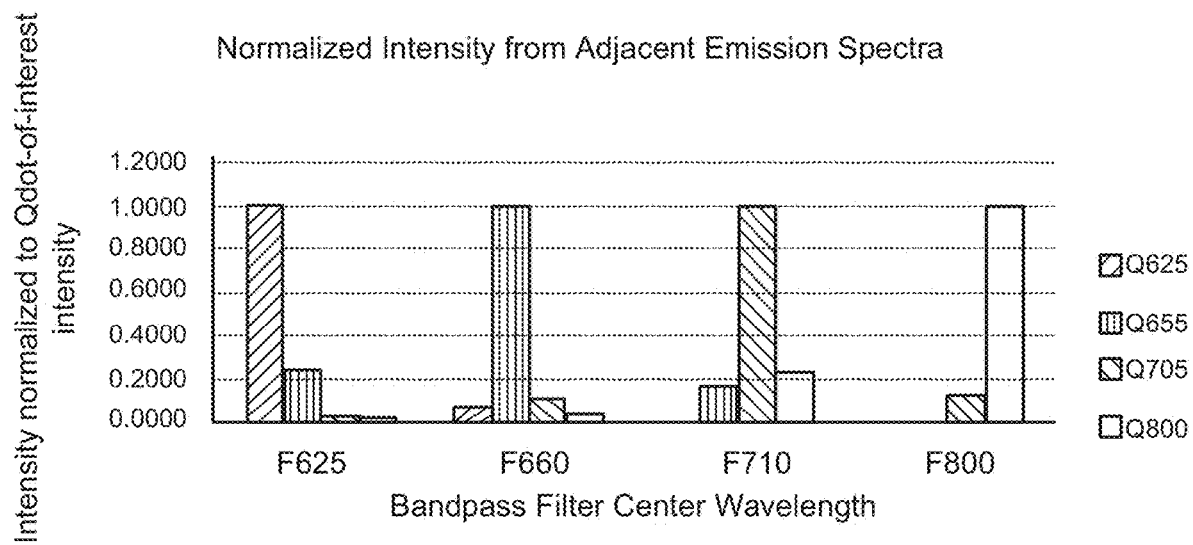
FIG. 18A shows the intensity of several QNPs with various optical filters.
Figure 18B:
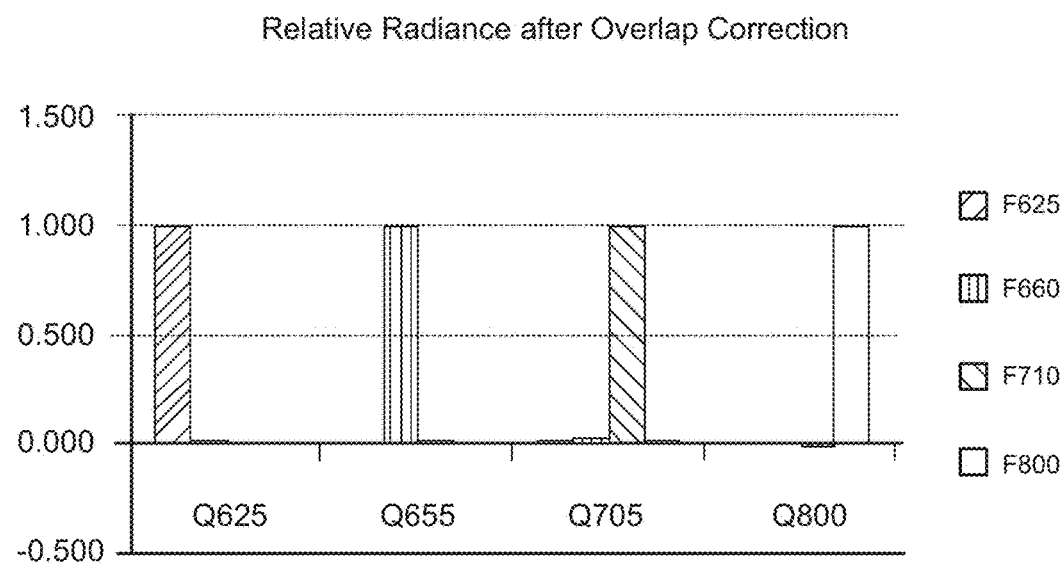
FIG. 18B shows the deconvoluted intensity of several QNPs with various optical filters.
Figure 19A:
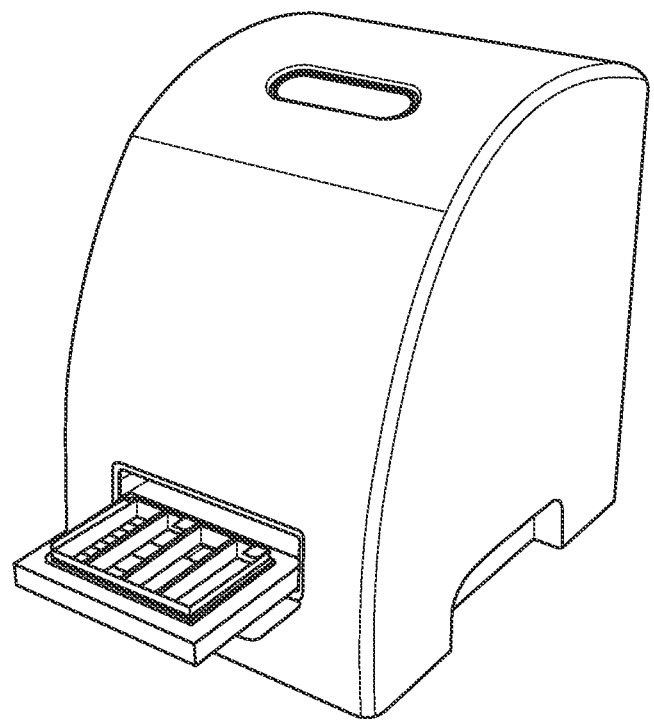
FIGS. 19A-B show example configurations of a microarray imager, according to the present disclosure.
Figure 19B:
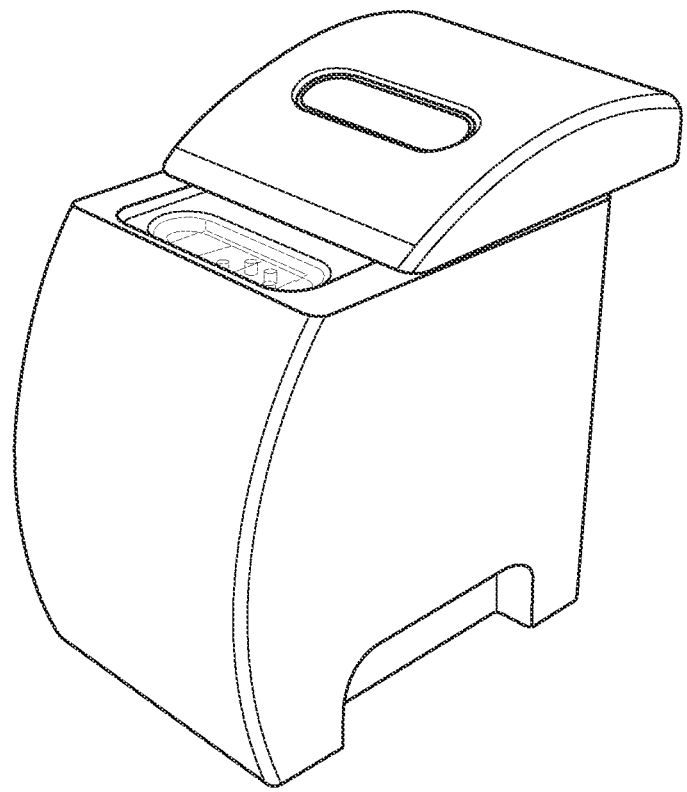
Figure 20:
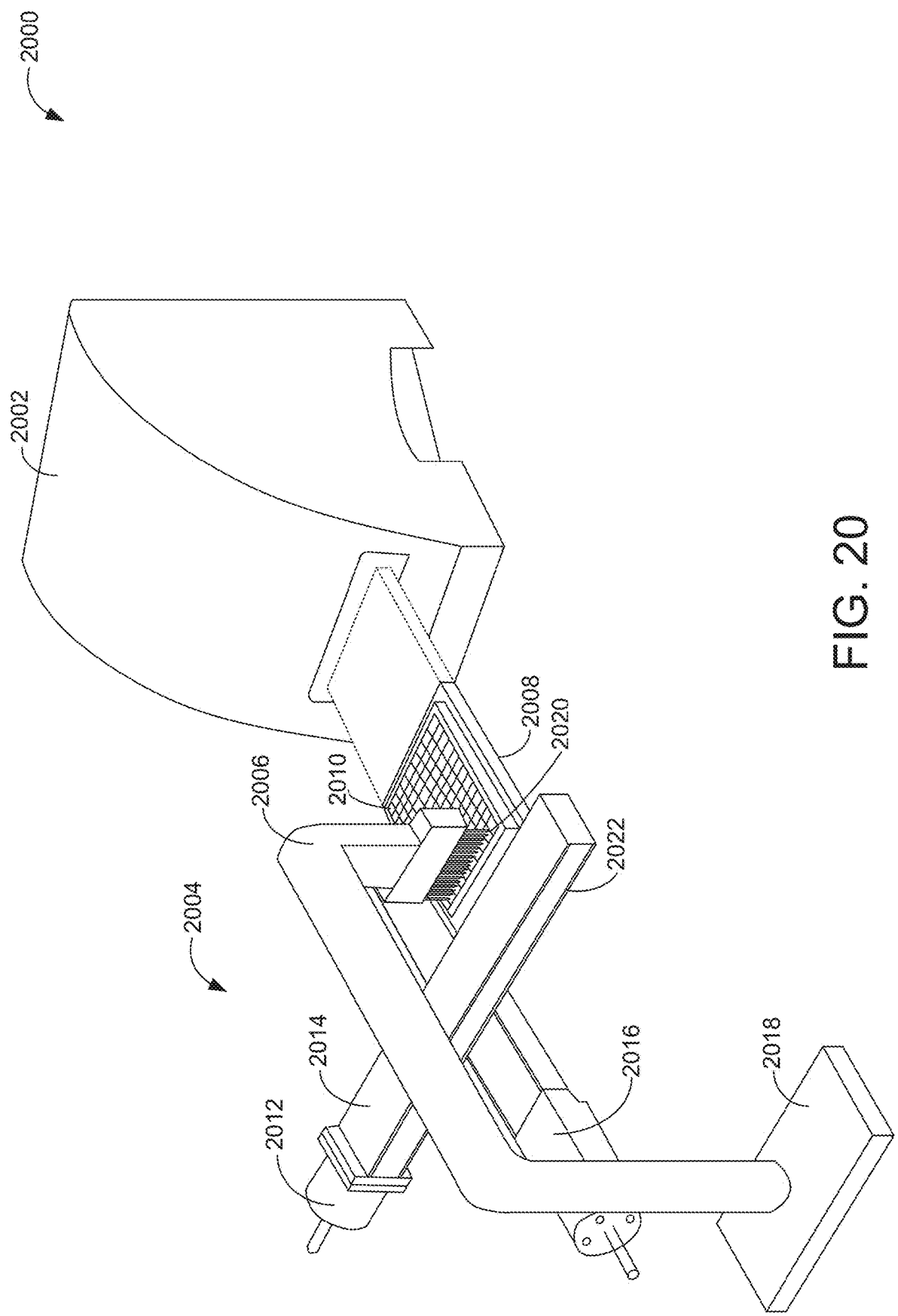
FIGS. 20-21 show example configurations of a microarray imager coupled to a robotic fluid handling system.
Figure 21:
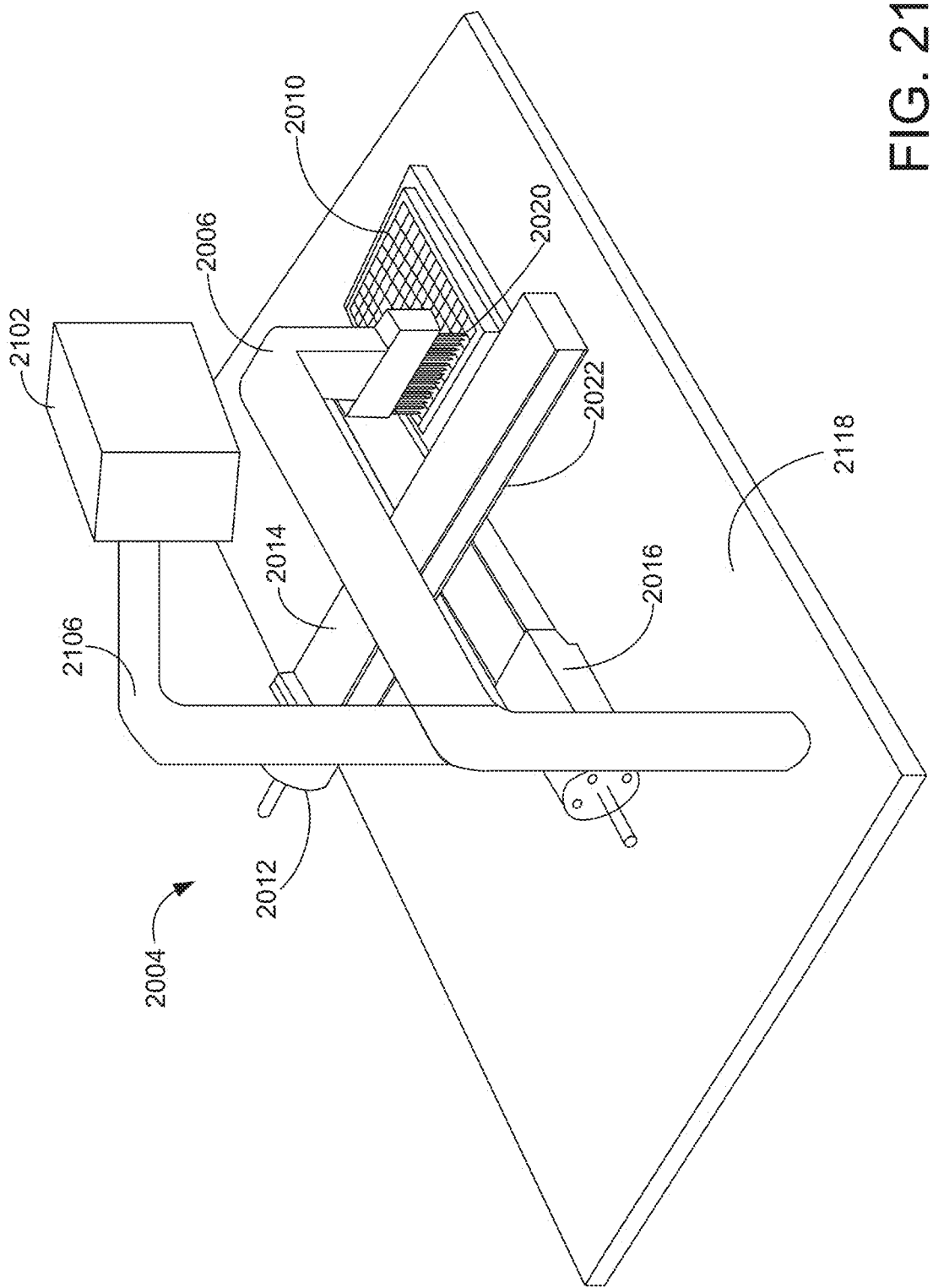

The systems and methods of the present disclosure will be described in greater detail below with reference to the figures. FIG. 1 schematically shows the orientation of components within the optical stack of an imaging device of the present disclosure. FIGS. 2-5 depict the properties of porous nitrocellulose (PNC) and quantum nanoparticles (QNPs) that make them well suited for microarray assays imagable by an imaging device of the present disclosure. FIGS. 6-9 show different views and embodiments of microarray assay imagers. FIGS. 10-11 and 13 show different components and accessories of the microarray assay imager. FIGS. 12A-B show example applications of the imaging device in colorimetric assays. A controller of the imager may be configured to perform routines, such as the example methods of FIGS. 14 and 16-17, to operate the microarray assay imager and perform image capture, correction, and optimization. An example software interface between the imager and an operator is shown at FIG. 15. FIGS. 18A-B show data from an example multiplex QNP assay using the microarray imager and associated software. Example configurations of the microarray assay imager are shown at FIGS. 19A-B. The microarray imager may also be coupled to a robotic microarray fluid handling system, as shown in FIGS. 20-21, to facilitate sample handling (e.g., dispensing).

A system of the present disclosure includes a microarray assay imager. Microarray assays typically use functionalized glass surfaces, slides or plates as substrates to fix biomolecules (such as protein biolabels). However, glass microarrays and the coatings that allow these slides to bind biomolecules can be expensive and binding capacity may still be minimal.

Another type of substrate that may be used in microarray assays is porous nitrocellulose (PNC). PNC films include a sponge-like film or layer whose cavity sizes are on a nanometer scale. Specifically, strands of nitrocellulose (NC) polymer are intertwined and interconnected to form cavities whose sizes may range from a few nanometers to as much as 500 nm. Protein molecules bond very efficiently to such a three-dimensional matrix. In some embodiments, the binding capacity of PNC may be greater than non-porous NC, plain glass, or functionalized glass surfaces.

However, PNC film may have limitations when used with fluorescence spectroscopy. Specifically, PNC films may have a native background fluorescence whose intensity varies with the wavelength of the excitation source. For example, when the excitation wavelength is shorter, the background light emission may have correspondingly larger background. This phenomenon is generally referred to as "native fluorescence" (or "auto-fluorescence").

To reduce the auto-fluorescence effect, fluorescence spectroscopy can be performed on PNC films using longer excitation wavelengths, such as wavelengths in the range of 600 nm to 900 nm. However, most laser-focused scanners are not tuned to these near-infrared (NIR) wavelengths. In addition, their efficiency at these longer wavelengths may be greatly reduced compared to the more conventional blue, yellow, green, and red fluorescence bands. As a result, PNC films may not be used most efficiently in the specific combination with conventional fluorophores in microarrays.

Another characteristic of PNC films is their ability to diffusely reflect both the excitation light and the emitted light into non-isotropic patterns. This phenomenon is similar to Tyndall scattering in colloidal liquids, and is based on classical Mie scattering theory, wherein the light is scattered by uniformly-shaped particles whose size is nearly equal to the wavelength of the excitation or emission light. In the case of PNC, the surface features are voids formed by the interwoven polymer chains of PNC rather than scattering particles, but the mathematical description is congruent. According to classical Mie scattering theory, when the wavelengths of the excitation or emission light have certain values compared to the size of the scattering features, the resulting scattering intensity varies, resulting in maxima and *minima* in the scattering light intensity. As elaborated herein, these unique properties of PNC can be advantageously used in microarray imaging to not only improve the quality of imaging achieve during fluorescence scanning, but also to develop small, more cost-effective, and more efficient microarray imagers. Specifically, by optimizing the distribution of pore sizes in the PNC film and using excitation wavelengths and emission wavelengths that are coincident with the maxima, the intensity of fluorescent light is optimized, thereby providing an advantage in overall detection sensitivity. For the present application, this phenomenon is referred to as "resonant scattering" but is a classical phenomenon entirely explained within the context of classical Mie scattering theory.

In the present application, use of the imager begins with the preparation of a biological sample to be assayed via micro-array imaging. The sample may be prepared as microarray spots on a porous nitrocellulose (PNC) assay surface. The sample spots may be arranged as a rectangular array, for example. Each spot may have a defined diameter (e.g., 100-250 microns) and the spots may be separated by a defined pitch (e.g., 250 microns pitch). Each spot may comprise a deposition of a biological sample that is tagged with a label conjugated to a fluorescent species or fluorophore. The array may be scanned and the images saved as digital files. The slides may be discarded after the analysis or stored for later reference.

As used herein, the assay surface may be any surface, such as a mechanical planar surface, onto which the porous nitrocellulose substrate may be layered and a marker can be attached. The assay surface may include, as one example, a standard microscope slide made of glass or plastic. The microscope slide may be of a 75 mm by 35 mm format and may be 1 mm thick. In another example, the slide may be of a 110 mm by 75 mm format and may be 1 mm thick. The surface of the slide may be coated with an assay substrate such as porous nitrocellulose. The assay marker may then be coated on the assay substrate, and analyzed using various assay methods discussed herein.

In another example, the assay surface may include a slide having a microarray channel. As another example, the assay surface may include the microtitre wells of a microtitre plates coated with porous nitrocellulose and a microarray printed on the bottom of the well. The microtitre plate (or microplate) may be a flat plate with a 2:3 rectangular matrix. The plate may be configured with multiple wells that may be available in 6, 24, 96, 384, or 1536 well formats. Still other examples of assay surfaces may include channels in a lateral flow device coated with a porous nitrocellulose membrane. Still other examples may include non-planar surfaces such as the interior walls of a well or channel coated with substrate (e.g., for capturing antibodies). The use of standardized microarray surfaces, such as microscope slides, microtitre plates, microtitre wells and channels, etc., allows for several array surfaces to be labeled, transported, and stored with ease. Further, the surfaces can be quickly inserted and removed from the imaging system.

It will be appreciated that as used in some examples herein, the term "microarray slide" may be used to refer to an example microarray assay surface. However, the term is not meant to be limiting and any of the above-discussed microarray assay surfaces (planar or non-planar) may be used in alternative examples. As such, any surface that can be coated with an assay substrate, such as porous nitrocellulose, and then layered with a biomarker for analysis using a label, such as a fluorophore label, may be used as an assay surface herein.

The biological sample used in the example microarray assays described herein may be proteinaceous in nature. However, the object of the present disclosure may additionally apply to other biomolecules and analytes such as DNA, RNA, polynucleotides, peptides, etc.

Software programs may control various aspects of the microarray imaging, including image focus, filter selection, and target alignment, in principle. Various analysis tools may be provided within the software for the purpose of selecting portions of the image, analyzing the data, and storage of data for archiving. Through the use of the software, the operator may also control various aspects of the instrument configuration, such as excitation light intensity, imaging speed, image accumulation, and camera control. Further, as elaborated herein, the software may also enable signal deconvolution and overlap correction.

Design of the Imager

The microarray assay imager 100 of the present disclosure is schematically depicted at FIG. 1. A light source 102 provides an expanded beam of near-UV light. Light from light source 102 enters the imager through a dichroic mirror 104 oriented at an angle to the instrument's main axis 112. In the depicted example, dichroic mirror 104 is oriented at a 45 degree angle relative to the instrument's main axis. Light is then reflected towards target 106 where it illuminates an area 107 of the target. Herein, target 106 may be a PNC microarray slide. Dichroic mirror 104 may be replaced with any suitable beam splitter or combined beam splitter and filter. In one example, target area 107 illuminated is approximately 20 mm×25 mm at the target surface. Laser light strikes target 106 normal to the surface of the PNC film of target 106. Fluorescent light emitted at near-normal angles from the target will then pass back through the dichroic mirror 104 without reflection and will enter an optical band pass filter 108. Light will then exit the filter and be focused by a high-definition lens 109 onto the surface of an imaging chip (e.g., camera chip) 110.

Varied light sources may be utilized to provide excitation light for the various fluorescent species. The inventors have recognized the advantages of using a high-intensity discrete diode laser whose optical power is in the range of 0.5 to 2 watt. To excite the fluorophores coupled to the sample on target 106 (such as QNP fluorophores) with the best intensity, the inventors have chosen a high-power 405 nm discrete diode laser, currently used for Blue-Ray video players. The inventors have also utilized 425 nm discrete diode lasers with equal or greater efficacy. These light sources provide suitable power levels. In addition, the beam may be easily collimated, focused, or expanded to provide uniform illumination at the target.

In one example, imager 100 may be enclosed within a chamber (as elaborated below). Laser light source may be completely enclosed within imager 100 for safety reasons.

If a diode laser is to be used as an excitation source in an imager configuration, the diode laser may need to be able to remain on for extended periods of time. This is important as the shutter time of the camera may range from a few milliseconds to several seconds. Many laser diodes, such as discrete laser diodes, are designed to operate in a pulsed mode where the laser is intermittently turned on for a short period of time. As such, a discrete diode laser may also be able to withstand continuous-wave (CW) operation for extended periods of time with no substantial degradation in power output as long as it has a mild heat sink. In configurations using the discrete diode laser as the light source, it may be beneficial to use QNPs as the fluorophore conjugated to the sample. This is because the discrete diode laser is on for extended periods of time and QNPs do not bleach with continuous exposure to laser light in the timeframes mentioned.

It will be appreciated that the diode laser used in the example embodiments described herein may be a discrete diode laser including a single-mode laser that emits light from only one mode of oscillation, or a multi-mode laser where the laser is oscillating with several modes, each closely spaced in wavelength. However, the multimode laser may not emit over as wide a range of wavelengths as an LED would. As such, both the single-mode laser and the multi-mode laser may be capable of providing an excitation light source of substantially single wavelength relative to the absorption band of the fluorophore.

In one example, dichroic mirror 104 serves as a wavelength division multiplexer. A wavelength-division-multiplexer (WDM) is used to align the excitation light with the optical axis of the instrument. A particular example is a dichroic mirror whose pass band is about 425 nm.

Light exiting the discrete diode laser will be reflected by the dichroic mirror when the light is incident at an angle of 45 degrees. It will be almost completely reflected since its wavelength (405 nm) is less than the pass band of the mirror (425 nm). Fluorescent light emitted by the target will pass through the dichroic mirror with very little attenuation, since its wavelength will be greater than 425 nm (see FIG. 7). A custom dichroic mirror whose pass band exceeds 800 nm may be advantageous for this purpose. A commonly stocked dichroic mirror that has somewhat lower transmission efficiency for wavelengths greater than 700 nm may be used in alternate embodiments.

In another example, light source 102 is positioned 90 degrees (perpendicular) to the instrument optical axis 112. This requires the use of a dichroic mirror 104 to multiplex the excitation light onto the target and the emitted light from the target.

In another example, light source 102 may be positioned behind target 106. This configuration may reduce (e.g., eliminate) the requirement for a dichroic mirror. However, the embodiment shown at FIG. 1 (with the light source positioned perpendicular to the instrument's optical axis) may provide advantages over the embodiment employing the back-illuminated technique. In particular, with back illumination of the sample, excitation light may be lost due to scattering through target (e.g., through the PNC film). This may result in lower brightness of the emission signal. In addition, some amount of excitation light may pass directly through the PNC, where it may continue on to the camera and lead to a greater background signal. Thus, in the case of PNC film used on the target 106, front-illumination may be used for optimal resolution of the sample signal.

In an alternative embodiment, the excitation source may be located close to the target but not within the light path of the emitted light. In this case, the excitation light could strike the target at an oblique angle, illuminating the target but not obstructing the emitted light from reaching the camera. In this configuration, a plurality of lower-power emission sources, such as LEDs or lasers, may be used to more uniformly illuminate the target and/or reduce cost. Due to the non-linear relationship between cost and laser power, ten lasers of 50 mW power may cost less than one laser of 500 mW, for example.

Returning to FIG. 1, band pass filter 108 allows transmission of the emitted fluorescent light while attenuating background radiation outside of the fluorescence band. For example, if four QNP emitters are to be used, then four band pass filters may be required. During signal measurement, the appropriate filter is introduced into the beam via a filter interchange mechanism. The filter interchange mechanism may include a filter wheel, such as the filter wheel shown in FIG. 11. As another example, the filter interchange mechanism may include a filter slide or other appropriate filter interchange mechanism. Each filter pass band may be centered at the emission wavelength of the fluorescence and may have a pass band width commensurate with the 50% intensity level of the QNP species. There may be standard filter recommendations for both fluorophores and QNP emitters, and a user may select filters whose center wavelength and band pass characteristics will provide optimized signal transmission and background attenuation. Filters designed and selected in this way will typically have a transmission coefficient of 90% within the pass band and a transmission coefficient of one ten-millionth outside of the pass band (for optical density (OD)=5). As a reference, a pass band filter having an optical density of 5 is considered to be an excellent filter. Band pass filters may be of the single-element type or of the stacked configuration. In either case, it is preferred to use filters whose surface(s) are coated to reduce back reflection and increase transmission, thereby reducing reflection "ghosts" in the image and improving imaging efficiency.

For an application-specific instrument in which only one fluorescent emitter is needed, it is possible that only one filter would be needed, in which case cost could be further reduced by eliminating the filter wheel and inserting a single band pass filter instead.

Conventional laser-focused scanners may achieve high resolution by focusing the laser beam to a very tiny spot on the target and then scanning that spot over the entire sample. This process provides resolution as small as 5 µm, but is inherently slow. A single microscope-slide target size can take as long as several minutes to scan. The inventors recognize the value in obtaining results much faster, and the present disclosure provides a system in which faster image processing may be achieved by photographing the target rather than scanning. An efficient way to photograph the target is through the use of a modern digital camera sensor. Specifically, the imager of the present disclosure may utilize either a CMOS (complementary metal-oxide-semiconductor) camera sensor or a CCD (charge-couple device) camera sensor. Traditionally, CCD imagers have been more sensitive than CMOS imagers. However, recent advances in CMOS digital camera technology now permit image resolution of about 5-10 megapixel with concomitant sensitivity comparable to more expensive CCD cameras, possibly at a reduced overall camera cost.

The components of imager 100 described above may together constitute an image capture instrument 150 of the imager. In some examples, the image capture instrument 150 may be configured to reside inside a chamber. Further, the image capture instrument of may be connected to a computer 114. In this case, the computer may be a separate unit from the image capture instrument 150. The image capture instrument may be a small, compact device connected to the computer via USB connection, although other known connections may be used. This improves portability of the image capture instrument. In one example, the image capture instrument may be hand-held. It may be convenient for the computer connected to the image capture instrument to be of the flat note-pad variety, optionally further including an integrated touch screen.

In a second configuration, the computer may comprise an integral part of the imager. In this embodiment, the computer may be permanently and physically connected to the image capture instrument, for example, located within the same chamber.

Single Excitation Source

As discussed above, various light sources may be utilized to provide excitation light for the various fluorescent species. However, the inventors have recognized that by using a high-intensity discrete diode laser as the single excitation source, various advantages are achieved. First, the beam may be easily manipulated (e.g., collimated, focused, or expanded) to provide uniform illumination at the target. Further, a single laser can be used for several emission wavelengths (e.g., when using QNPs or tandem dyes). By using the same laser to provide light of different emission wavelengths, the need for additional optical components, such as a beam splitter, a filter wheel, excitation filters, wavelength bandpass filters, etc. is reduced. In one example, a wider bandpass filter can be used. While this may increase the amount of background illumination, the background can be addressed using image processing algorithms (e.g., dithering algorithms) discussed herein. This substantially reduces the cost and complexity of the microarray imager instrument. In addition, it allows for further compaction of the instrument. It will be appreciated that while some of the examples discussed herein relate to multiplexing assays, the same single laser source can also be used for single wavelength assays.

Quantum Nanoparticles

Quantum nanoparticles, herein referred to as QNPs, may also be referred to as semiconductor nanocrystals or fluorescent nanoparticles. Specifically, QNPs are a class of fluorescent nanoparticles that absorb light in the ultraviolet (UV) or violet region and emit in the visible to near-infrared (NIR) region. When QNPs are illuminated with a primary energy source, a secondary emission of energy occurs at a frequency that corresponds to the bandgap of the semiconductor material used in the QNP. In quantum confined particles, the bandgap energy is a function of the size and/or composition of the nanocrystal. A mixed population of QNPs of various sizes and/or compositions can be excited simultaneously using a substantially single wavelength of light and the detectable luminescence can be engineered to occur at a plurality of wavelengths. The luminescent emission is related to the size and/or the composition of the constituent QNPs of the population and the emission wavelength can be engineered by changing the size or composition or both. Furthermore, QNPs can be made highly luminescent through the use of a shell material which efficiently encapsulates the surface of the QNP core. A "core/shell" QNP has a high quantum efficiency and significantly improved photochemical stability. The surface of the core/shell QNP can be modified to produce QNPs that can be coupled to a variety of biological molecules or substrates An example absorption curve for a QNP is shown with reference to FIG. 2. As depicted therein, QNPs have a relatively broad absorption curve 200 (several hundreds of nanometers), but a very narrow emission curve 202. The absorption curve 200 of QNPs is nonlinear and exhibits an exponentially-increasing curvature at shorter excitation wavelengths. These fluorescent properties of QNPs make them particularly useful in the present context. The light intensity emitted by QNPs is essentially proportional to the absorbed light intensity. Consequently, as either the intensity of the excitation is increased, as the wavelength of the excitation light is decreased, the QNP emission becomes brighter. This makes QNPs appealing as fluorescent labels because they do not saturate (quench) or bleach with increasing excitation light intensity, as conventional fluorophores do. This feature of QNPs applies well to the use of an imager of the present disclosure, as the target may be exposed to laser light for extended periods of time without significant degradation in emission efficiency.

Figure 3:
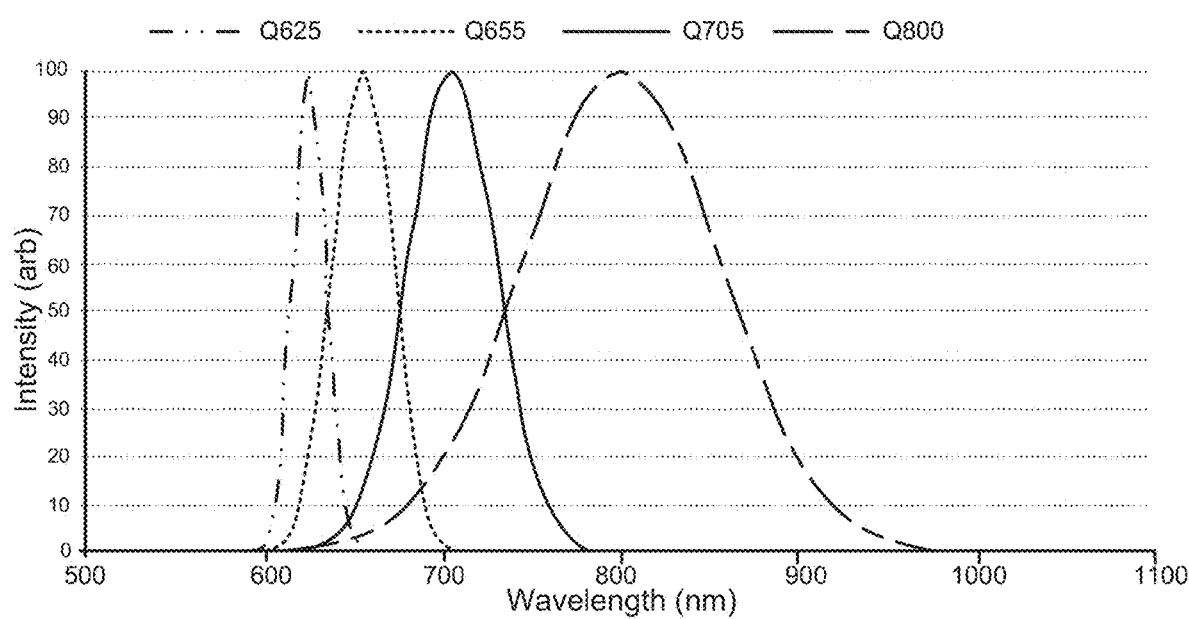
FIG. 3 shows example emission spectra for several example QNPs.

The emission curves 202 of QNPs are essentially Gaussian with line widths of about 25 nm to 100 nm (50% intensity level), depending on their center-wavelength emission. QNPs emitting at shorter wavelengths (such as Q625 and Q655) have narrower emission bands and QNPs emitting at longer wavelengths (such as Q705 and Q800) have wider emission bands as shown in FIG. 3. Regardless of the intensity of the excitation light or its wavelength, the emission band shape of a particular QNP species remains substantially constant. As described below, this provides a platform from which multiplexed assays can be developed with QNPs whose overlap errors can be exactly corrected for. This improves the accuracy of microarray assays using QNPs as fluorophores when more than one QNP fluorophore is present in a particular assay.

QNPs are available in a range of emission wavelengths, including 625 nm, 655 nm, 705 nm, and 800 nm. QNPs with a red to near infra-red wavelength can be advantageously used with PNC films because the background emission (from PNC) at these wavelengths is minimized and the resonant scattering is increased. Therefore, it may be advantageous to design microarray platforms around NIR QNP fluorescent nanoparticles instead of conventional fluorophores when devising a specialized instrument for fluorescence immunoassays on PNC film. As mentioned above, regardless of the intensity of the excitation light or its wavelength, the emission band shape of a particular QNP species remains constant. This mathematical fact is utilized in the present disclosure for analyzing QNP microarray data.

In one embodiment, the present disclosure is performed using Quantum-Dot (QNP) fluorescent nanoparticles as the emission source. QNPs in the wavelength bands of 625, 655, 705, and 800 nm may be preferred. All of these can be excited with a 405 nm laser light, but each requires a separate emission filter. QNP nanoparticles can be conjugated to biological labels using one of many methods known to one skilled in the art.

It will be appreciated that the terms, "quantum nanocrystal" "quantum nanoparticle" and "QNP" are used interchangeably herein and refer to an inorganic crystallite between about 1 nm and about 1000 nm in diameter or any integer or fraction of an integer there-between, such as between about 2 nm and about 50 nm or any integer or fraction of an integer there-between. A semiconductor nanocrystal is capable of emitting electromagnetic radiation upon excitation (i.e., the semiconductor nanocrystal is luminescent) and includes a "core" of one or more first semiconductor materials, and may be surrounded by a "shell" of a second semiconductor material. A semiconductor nanocrystal core surrounded by a semiconductor shell is referred to as a "core/shell" semiconductor nanocrystal. The surrounding "shell" material will preferably have a bandgap energy that is larger than the bandgap energy of the core material and may be chosen to have an atomic spacing close to that of the "core" substrate. The core and/or the shell can be a semiconductor material including, but not limited to, those of the group II-VI (ZnS, ZnSe, ZnTe, CdS, CdSe, CdTe, HgS, HgSe, HgTe, MgS, MgSe, MgTe, CaS, CaSe, CaTe, SrS, SrSe, SrTe, BaS, BaSe, BaTe, and the like) and III-V (GaN, GaP, GaAs, GaSb, InN, InP, InAs, InSb, and the like) and IV (Ge, Si, and the like) materials, and an alloy or a mixture thereof.

Porous Nitrocellulose (PNC)

PNC films comprise a sponge-like film or layer whose cavity sizes are on a nanometer scale. Strands of nitrocellulose (NC) polymer are intertwined and interconnected to form cavities whose sizes may range from a few nanometers to as much as 500 nm. While the cavities are referred to as "pores" having a "pore size", it will be appreciated that the PNC cavities may be more like tiny caverns or voids whose shapes can be relatively random. The pore sizes can range from 10 to 1000 nm in diameter. Furthermore, while the pores may be irregular in shape, there may be certain pore sizes that are more prominent and frequent than others. Protein molecules bond very efficiently to this three-dimensional matrix. The binding capacity of PNC may be greater than non-porous NC, plain glass, or functionalized glass surfaces. Additionally, PNC may provide increased binding affinity of peptides and nucleic acids over other substrates provided that the surface of the PNC film is functionalized to accept the binding of these molecules.

PNC films tend to have a native background fluorescence whose intensity varies with the wavelength of the excitation source. For example, when the excitation wavelength is shorter, the background light emission may have correspondingly larger background. This phenomenon is generally referred to as "native fluorescence" or "autofluorescence". To reduce this effect, PNC based assays may use longer excitation wavelengths, such as wavelengths in the range 600 nm to 900 nm. However, most microarray scanners or imagers that are laser-focused are not tuned to these near-infrared (NIR) wavelengths. In addition, the efficiency of the scanners at these longer wavelengths may be greatly reduced compared to the more conventional blue, yellow, green, and red fluorescence bands. As a result, PNC films may not be used most efficiently in the specific combination with conventional fluorophores in microarray imaging systems.

Applicants have recognized that PNC has not been commonly used as a substrate for fluorescent-based microarray assays compared to epoxy and functionalized glass surfaces due to the discussed properties. This is also due to a lack of detection instrumentation specifically designed to take full advantage of the properties of PNC including its backscatter amplification property. By using the method and system of imaging described herein, the very same properties of PNC can be advantageously leveraged along with QNPs to improve microarray analysis sensitivity and accuracy.

In addition to the greater binding capacity of PNC, the structure of 3D-PNC films provides amplification (that is, an inherent enhancement of fluorescence), through a mechanism referred to here as "resonant scattering", akin to Tyndall scattering in colloidal liquids or translucent solids. This phenomenon is based on classical Mie scattering theory, wherein the light is scattered by uniformly-shaped particles whose size is nearly equal to the wavelength of the excitation or emission light. In the case of PNC, the surface features are voids formed by the interwoven polymer chains of PNC rather than scattering particles, but the mathematical description is congruent. According to classical Mie scattering theory, when the wavelengths of the excitation or emission light have certain values compared to the size of the scattering features, the resulting scattering intensity varies, resulting in maxima and *minima* in the scattering light intensity. By optimizing the distribution of pore sizes in the PNC film and using excitation wavelengths and emission wavelengths that are coincident with the maxima, the intensity of fluorescent light is optimized, thereby providing an advantage in overall detection sensitivity.

Figure 4:
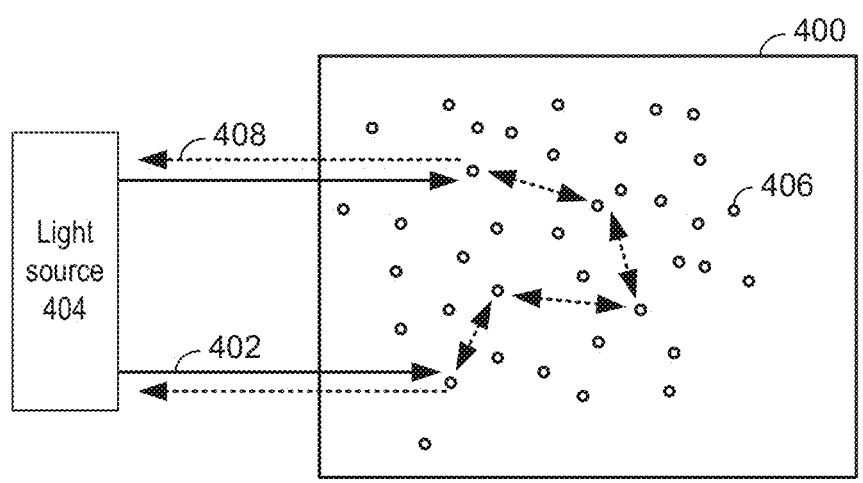
FIG. 4 shows an illustration of resonant backscatter from porous nitrocellulose.

An example depiction of the resonant backscatter in PNC is shown with reference to FIG. 4. Incident light 402 (solid arrows) from an excitation light source 404 is scattered from pores 406 at the surface and from within a PNC film 400. PNC film 400 may be cast on a microarray assay substrate (e.g., microarray slide) surface made of solid glass or plastic, for example. The scatter creates additional paths 408 (dashed arrows) for the light to travel, thereby increasing the overall extinction coefficient of the fluorescent species. Since the scattering has a strong dependence on pore size, by using PNC films having pore sizes that are larger (e.g., several hundred nanometers in diameter), the scattering of incident light can be substantially increased.

Currently, nearly all fluorescence microscopy is performed with fluorescent dye-based conjugates, wherein fluorescent dyes are conjugated to biomolecules such as antigens or antibodies. However, due to the lower efficiency of the available fluorophores, detection and imaging methods require scanners whose optical excitation source is very bright and detection methods that are extremely sensitive. The inventors herein have realized that by taking advantage of the resonant scattering of PNC, fluorescence amplification can be improved when PNC is used as a microarray substrate. This is because the fluorophore label will emit light not only when stimulated by photons that strike the label from the incoming direction of the excitation beam, but also from light reflected back by the PNC. As such, this increase can be realized for a variety of fluorescent species, including fluorophores and QNPs, and similar fluorescent labels whose extinction coefficient is at or above $10^6$ $M^{-1}cm^{-1}$. In the case of conventional fluorophore dyes, this effect is limited due to self-quenching of the fluorescent light. In the case of QNPs, however, the emitted light intensity is proportional to the absorbed light intensity. The present disclosure takes advantage of this phenomenon and the resulting organic fluorescence (and resonant backscatter) by using a very high intensity violet discrete diode laser to excite the QNPs, and using PNC to amplify the fluorescence. In addition, by performing the assay in the near-infrared range, a contribution of the native fluorescence of PNC can be reduced.

The use of three-dimensional (3D) PNC, cast on solid glass or plastic surfaces, as a substrate for microarray and Elisa-type antibody-based assays provides numerous advantages over two-dimensional (2D) surfaces. The advantages are, at least in part, due to a 500-fold increase in protein binding capacity relative to clear substrates. In addition, the type of binding generates in one that preserves native protein conformations. Specifically, the methods by which proteins bind to PNC preserve native protein secondary and tertiary conformations which are critical for maximal protein recognition and function during microarray assays. These characteristics make PNC a suitable substrate for various microarray protein assays such as protein lysate arrays and antibody capture arrays. Furthermore, PNC offers the possibility of increased binding of peptides and nucleic acids when the surface of the PNC film is functionalized to accept the binding of these molecules. In addition to the greater binding capacity of PNC, as discussed above, the structure of 3D-PNC films may provide an inherent enhancement of fluorescence signals (herein also referred to as resonant backscatter fluorescence and resonant backscatter). This property is particularly advantageous when using fluorescence as the endpoint in identifying proteins. Consequently, because of the organic fluorescence, PNC may be a preferred substrate for protein binding, in particular, for binding protein lysates.

It will be appreciated that while the example embodiments described herein use nitrocellulose as the solid microarray assay substrate (e.g., in membrane or microtiter well form), in alternate embodiments, other substrates may be used. These may include, for example, polyvinylchloride (e.g., sheets or microtiter wells); polystyrene latex (e.g., beads or microtiter plates); polyvinylidine fluoride; diazotized paper; nylon membranes; activated beads, magnetically responsive beads, and the like.

In some embodiments, the solid support may be first reacted with a component that will bind to the solid support, such as an antigen or an antibody. The reaction may be performed under suitable binding conditions such that the component is sufficiently immobilized to the support. In some cases, immobilization to the support can be enhanced by first coupling the antigen or antibody to a protein with better solid phase-binding properties. Suitable coupling proteins include, but are not limited to, macromolecules such as serum albumins including bovine serum albumin (BSA), keyhole limpet hemocyanin, immunoglobulin molecules, thyroglobulin, ovalbumin, and other proteins well known to those skilled in the art. Other reagents that can be used to bind molecules to the support include polysaccharides, polylactic acids, polyglycolic acids, polymeric amino acids, amino acid copolymers, and the like. Such binding molecules and methods of coupling the binding molecules to antigens, are well known to those of ordinary skill in the art.

After reacting the solid support with the solid phase component, any non-immobilized solid-phase components are removed from the support by washing, and the support-bound component is then contacted with a sample (such as a biological sample) that is to be assayed for the presence of a target analyte, such as protein, DNA, RNA, or other polynucleotide having a ligand moiety that can couple to the antibodies immobilized on the solid support. After washing to remove any unbound ligand, a secondary binder moiety detectably labeled with the quantum nanocrystal fluorophore described herein is added under suitable binding conditions, wherein the secondary binder is capable of associating selectively with the bound ligand. The presence of the fluorophore is then detected using techniques described herein.

Target Analyte

Target analytes that can be analyzed include biomolecules such as proteins, polypeptides, and single- or double-stranded nucleic acid molecules that contain a target nucleotide sequence. Protein and polypeptide analytes may include post-translational modifications of the polypeptide, for example, glycosylations, acetylations, phosphorylations and the like. In addition, protein fragments, analogs, mutated or variant proteins, fusion proteins and the like are included within the meaning of polypeptide. Nucleic acid analytes may be from a variety of sources, e.g., biological fluids or solids, chromosomes, food stuffs, environmental materials, etc., and may be prepared for the hybridization analysis by a variety of means, e.g., proteinase K/SDS, chaotropic salts, or the like. Furthermore, nanocrystals may be conjugated to molecules that can interact physically with biological compounds such as cells, proteins, nucleic acids, subcellular organelles and other subcellular components. For example, nanocrystals can be associated with biotin which can bind to the proteins avidin and streptavidin.

It will be appreciated that while the examples described herein are with reference to a protein sample, this is not meant to be limiting, and that in alternate embodiments, the methods, assays, and devices described herein may be used with any of the alternate target analytes and biological molecules described above.

The various analytes described above may be adapted to multiple types of array or other assays that may be imaged by the imager of the present disclosure. Non-limiting examples of arrays that may be imaged by an imaging device of the present disclosure are provided below:

1. Reverse-Phase Protein Arrays

A Reverse-Phase Protein Array (RPPA) may comprise cell or tissue lysates (complex mixtures of protein and other cellular components) deposited onto a porous nitrocellulose microarray surface in a denaturing lysis buffer. After microarray printing, a standard RPPA assay protocol may be performed utilizing available reagents, for example, those available in a kit. Example kits include the Reverse-Phase Protein Array Assay System kits from Grace Bio-Labs and the Tyramide Signal Amplification Kit from Dako. An example Reverse-Phase Protein assay is described below:

1. To remove excess spotting buffer salts and detergents prior to beginning assay, wash microarray slide in fresh deionized water (4×15 min) with agitation. This should be performed in a staining jar with large wash volumes.
2. Remove microarray from the final water wash, attach a ProPlate incubation chamber (following volumes assume use of a 1-well ProPlate with 1-2 ml volumes capacity).
3. Incubate microarray with the Antigen Retrieval Reagent which enhances availability of some antigen binding sites through further denaturation.
    a. Incubate for 15 min. with 2 ml 1× Antigen Retrieval Reagent.
    b. Wash with 2 ml deionized water (2×5 min), completely covering slides.
4. Wash with 2 ml 1×PBST (2×5 min).
5. Incubate microarray with 2 ml Super G-based RPPA Blocking Buffer 1 (10 min).
6. Wash with 2 ml 1×PBST (2×5 min).
7. Block microarray with $H_2O_2$ for 5 minutes (enough to wet surface of microarray).
8. Rinse twice with 1×TBST.
9. Block microarray with Avidin block for 10 minutes (enough to wet surface of microarray).
10. Rinse twice with 1×TBST.
11. Block microarray with Biotin block for 10 minutes (enough to wet surface of microarray).
12. Rinse twice with 1×TBST.
13. Incubate microarray with 1 ml primary antibody towards protein of interest (typically 0.1-0.2 µg/ml) diluted in Dako incubation buffer for 30 minutes.
14. Wash with 2 ml 1×TBST (2×5 min. with buffer changes).
15. Incubate microarray with 2 ml Super G Blocking Buffer 2 (10 min).
16. Wash with 2 ml 1×TBST (3×5 min. with buffer changes).
17. Incubate microarray with 1 ml biotin-conjugated secondary antibody (anti-primary antibody host, typically 0.1-0.2 µg/ml) diluted in Dako incubation buffer for 15 minutes.
18. Wash with 2 ml 1×TBST (2×5 min. with buffer change).
19. Incubate microarray with 1 ml avidin-biotin-HRP amplification complex for 15 minutes.
20. Wash with 2 ml 1×TBST (2×5 min. with buffer change).
21. Incubate with Tyramide amplification reagent for 15 minutes (enough to wet surface of microarray).
22. Wash with 2 ml 1×TBST (2×5 min. with buffer change).
23. Incubate with 1 ml 0.5-10 nM streptavidin-conjugated Q-Dot800 diluted in GBL QDot Incubation Buffer for 60 minutes.
24. Wash with 2 ml 1×TBST (3×5 min. with buffer changes).
25. After all washes in TBST, rinse with fresh deionized water.
26. Allow slides to dry at room temperature for 10 min. prior to data acquisition with imager.

2. Antibody Capture Arrays

Antibody capture microarrays may comprise an assortment of purified antibodies which recognize specific antigens. Antibodies are deposited individually allowing for spatial recognition of bound antigens. Like an ELISA assay, antibody capture arrays may be designed to capture specific biolabel antigens from biological samples such as blood, serum, urine, cell lysates, food samples, or others, in a multiplexed fashion. Detection of positive array elements may depend on incorporation of a label molecule (such as a QNP) and identification of the positive array element. Incorporation of the reporter molecule may be to the antigen itself (prior to performing the assay) or by indirect labeling of the antigen with another molecule (typically an antibody or antibody fragment). These additional molecules may also demonstrate specificity for individual biolabels (in the example of a sandwich assay). This antibody or antibody fragment may have a QNP attached to it directly or may be labeled indirectly by a secondary antibody or via a biotin-streptavidin interaction with a QNP conjugated streptavidin. After microarray printing, an assay protocol can be performed with reagents found in a kit, such as the Protein Array Assay System kit from Grace Bio-Labs. An example cytokine sandwich assay is detailed below.

1. Block microarray with Super G Blocking Buffer for 60 minutes.
2. Wash with 1×PBST (2×5 min).
3. Remove microarray from the final wash, attach a ProPlate incubation chamber (following volumes assume use of a 16-well ProPlate with 80-200 µl volumes capacity).
4. Transfer 80 µl serum samples (per well) to the ProPlate chambers and incubate the serum sample for 60 minutes with agitation.
5. Wash with 100 µl 1×GBL Incubation/Wash Buffer per well (3×5 min. with buffer changes).
6. Incubate microarray with 80 µl (per well) biotin-conjugated detection antibody (typically 0.1-0.4 ug/ml) diluted in GBL Incubation/Wash Buffer for 60 minutes.
7. Wash with 100 µl 1×GBL Incubation/Wash Buffer per well (3×5 min. with buffer changes).
8. Incubate with 80 µl (per well) 0.5-10 nM streptavidin-conjugated Q-Dot800 diluted in GBL QDot Incubation Buffer for 60 minutes.
9. Wash with 100 µl 1×GBL Incubation/Wash Buffer per well (3×5 min. with buffer changes).
10. Wash with 100 µl 1×PBS Wash Buffer per well (3×5 min. with buffer changes).
11. Wash with 100 µl water per well (1×1 min.).
12. Allow slides to dry at room temperature for 10 min. prior to data acquisition with imager.

3. Proteome Arrays

Proteome microarrays may comprise an assortment of purified or semi-purified proteins which are recognized by specific antibodies, proteins, or cofactors. Proteins may be deposited individually allowing for spatial recognition of binding partners. Detection of positive array elements depends on incorporation of a label molecule (such as a QNP) and identification of positive array elements. Incorporation of the reporter molecule may be directly to the binding partner itself (prior to performing the assay) or indirectly by labeling the antigen or cofactor with another molecule (typically an antibody or antibody fragment). This antibody or antibody fragment may have the QNP attached to it or may be labeled via a secondary antibody or biotin-streptavidin interaction to incorporate the QNP. After microarray printing, a proteome assay protocol can be performed with reagents found in a kit, such as the Protein Array Assay System kit from Grace Bio-Labs. An example proteome assay for the detection of autoantibodies from human serum is detailed below.

1. Block microarray with Super G Blocking Buffer for 60 minutes.
2. Wash with 1×PBST (2×5 min).
3. Remove microarray from the final wash, attach a ProPlate incubation chamber (following volumes assume use of a 16-well ProPlate with 80-200 µl volumes capacity).
4. Transfer 80 µl (per well) human serum sample to the ProPlate chamber and incubate for 60 minutes with agitation.
5. Wash with 100 µl 1×GBL Incubation/Wash Buffer per well (3×5 min. with buffer changes).
6. Incubate microarray with 80 µl (per well) anti-human IgG biotin-conjugated detection antibody (typically 0.1-0.2 µg/ml) diluted in GBL Incubation/Wash Buffer for 60 minutes.
7. Wash with 100 µl 1×GBL Incubation/Wash Buffer per well (3×5 min. with buffer changes).
8. Incubate with 80 µl (per well) 0.5-10 nM streptavidin-conjugated Q-Dot800 diluted in GBL QDot Incubation Buffer for 60 minutes.
9. Wash with 100 µl 1×GBL Incubation/Wash Buffer per well (3×5 min. with buffer changes).
10. Wash with 100 µl 1×PBS Wash Buffer per well (3×5 min. with buffer changes).
11. Wash with 100 µl water per well (1×1 min.).
12. Allow slides to dry at room temperature for 10 min. prior to data acquisition with imager.

4. Western Blot

A western blot (also referred to as a protein immunoblot) is an analytical technique used to detect specific proteins in a given sample, such as a tissue homogenate or extract. Gel electrophoresis is used to separate native proteins by 3-D structure. Alternatively, denatured proteins may be separated by the length of the polypeptide using gel electrophoresis. Proteins may then be transferred to a membrane (typically nitrocellulose) where they are stained with antibodies specific to the target protein. Antibodies may be conjugated to QNPs for ease of imaging on porous nitrocellulose.

Pulsed Technology

The impact of the background organic fluorescence of PNC when illuminated with excitation light in the visible to UV range was described above. Here, the inventors describe a way to reduce the natural PNC background organic fluorescence and in doing so increase the signal-to-background ratio, thus increasing the detection sensitivity of biomolecules on PNC. This may be possible through a laser modulation or pulsation technique. In the process of photon absorption in matter, photons of light from a high-intensity source are allowed to illuminate an absorptive material. The excitation photons cause electronic transitions from valence states to upper, unoccupied electronic states. If the upper electronic states are allowed (real) states, the electron occupies the upper state for a small period of time and then transitions back down to a lower energy state with a concomitant emission of a secondary photon of energy. This process is known as fluorescence if the lifetime of the upper state is short, such as in the order of nanoseconds. If the lifetime in the upper state is long, such as in the order of seconds, the process is known as phosphorescence. If the upper electronic states are disallowed (virtual) states, the electron cannot occupy the upper state for any period of time, yet the upper state can serve as a virtual "scattering state" prior to the electron returning to a lower energy state. This latter process is known as Raman scattering. The lifetime of an electron in a fluorescence state is determined by the stability of the excited state. States having very well defined energy levels are very stable and have long lifetimes whereas states whose energy bands are broad are unstable and have very short lifetimes. This relationship between the energy stability (ΔE) and the lifetime (Δt) is approximately described by the Heisenberg formula (Equation 1):

$$(\Delta E)(\Delta t) \geq \hbar, \quad \text{(Eq. 1)}$$

where ΔE is the energy uncertainty, Δt is the lifetime, and ℏ is the Planck Constant. The formula relating photon wavelength to photon energy is the Planck Equation (Equation 2):

$$E = hc/\lambda \quad \text{(Eq. 2)}$$

From Equation 2 we obtain the variation in energy relative to the variation in wavelength (Equation 3):

$$\frac{\Delta E}{E} = \frac{\Delta \lambda}{\lambda} \quad \text{(Eq. 3)}$$

Consider now two fluorescent species: Alexa-647, which is a fluorophore dye, and QNP-655, which is a quantum nanocrystal nanoparticle. The approximate emission peak wavelength and the emission line width are provided in Table I below. Alexa-647 has a known emission lifetime of about 2 ns. Assuming that Equation 3 is valid for both fluorophores and QNPs, we can scale the lifetime of Alexa-647 to obtain 30 ns for QNP-655. Because the QNP nanoparticles have much more defined (stable) energy states than fluorophores, their emission state lifetime is much greater.

TABLE I

Fluorescence emission properties of two fluorescent species

| Fluorescent species | Peak Emission Wavelength (nm) | Emission Bandwidth (nm) | State Lifetime (ns) | Frequency Bandwidth (MHz) |
|---|---|---|---|---|
| Alexa-647 | 670 | 300 | 2 | 3100 |
| QNP-655 | 655 | 20 | 30 | 200 |

Similarly, natural or organic fluorescence of PNC provides a comparably broader emission line than that of fluorophores. Thus, the inventors found that for the PNC background, energy levels may be unstable relative to the energy levels of QNPs. Therefore, the inventors concluded that the lifetime of fluorescence in PNC is also much shorter than in QNPs and the emission will be correspondingly faster, as with the fluorophores. This fact is advantageously used in the following techniques.

The signal-to-background (S/B) improvement with pulsed-detection can be estimated using the data in Table 1 and evaluating the ratio of the QNP signal to the PNC background signal. With a detection delay time of 10 ns, the S/B will improve by 100-fold when using the pulse-detection technique compared to conventional detection Referring now to FIG. 5, a representative comparison between emission lifetimes of an organic fluorophore and that of a QNP species is shown. Specifically, map 500 shows representative time-domain emission curves for an organic fluorophore (plot 502, dashed line) and a QNP nanoparticle (plot 504, dashed and dotted curve), as advertised by a current manufacturer of both organic fluorophores and QNPs is shown. The emission lifetime of the organic fluorophore is in the range of 2 ns while the emission lifetime of the QNP is in the range of 20 ns. As depicted, following excitation by a short laser pulse (plot 506, solid line), emission from the fluorophore is rapid, decaying to negligible intensity after a few nanoseconds (e.g., 2 ns). By contrast, the QNP emission persists longer, for example, up to 50 ns. Using the 1/e decay rate of each species, we can calculate the frequency bandwidth of the emission, which is $$f = \frac{2\pi}{\tau}$$

where τ is the 1/e decay rate. Frequency bandwidths of the two example fluorescent species are provided in Table 1. The signals from the QNP labels and the PNC background may be separated, in principle, on the basis of frequency bandwidth.

To separate the two characteristic signals (QNP emission vs. PNC background), a time-domain or frequency-domain detection method may be used. In its simplest embodiment, the time-domain method uses a laser that is briefly pulsed with an on-time of a few nanoseconds. The detector may be left in an off state prior to, during the laser pulse, and for up to about 10 ns following the trailing edge of the laser pulse. After this time period, light from the PNC background will be dissipated and the following light will be, largely, the result of the QNP emission. Then the detector could be turned on to receive the fluorescent light that is nearly all due to the QNP species.

The implementation of the pulsed detection method requires the use of a very fast optical detector whose spectral response is within the visible to near infra-red (NIR) range. Such a device is realized in a silicon avalanche photodiode (APD). These solid-state devices have very rapid response times, good optical-to-electronic conversion (quantum efficiency) and have internal gain similar to a photomultiplier tube. The specifications for such a device are elaborated at FIG. 12.

Although focused-laser scanners represent the benchmark for fluorescence detection biolabels, their ultimate performance may be limited by protein-capture affinity of clear substrates or signal-to-background in porous nitrocellulose. Through the combined use of the pulsed-detection technique, porous nitrocellulose capture substrates, and QNP fluorescent labels, scanning sensitivity could be substantially increased, for example, ten- to twenty-fold relative to focused-laser detection on clear substrates. This improves the sensitivity and reliability of microarray imagers.

Fiber Optic Light Guide

In one embodiment of the disclosed imager, in place of the microarray slide target, a flexible optic light guide may be substituted. The light guide may be of the high-resolution type as used in medical imaging and suitable for use over a wide range of wavelengths, from violet to near infra-red (NIR). Typically, such flexible light guides are composed of an array of optical fibers bundled together. Each of the fibers within the array may be permanently fixed in place and may maintain its position relative to the array. In such a configuration, there is a 1:1 relationship between the input to the bundle and the output from the bundle such that a transmitted image remains coherent from end to end. Utilizing the flexible guide may allow the imager to be separated from the target by a considerable distance, as much as several meters, without sacrificing the quality of the optical image. For example, it may enable the array imager may be designed as a monolithic fluorescence imager that stands on its own. To analyze microarray slides or microtiter plates, the light guide may be attached to a moveable gantry that can be brought into alignment with the slides or plates in order to image the microarrays printed onto the microarray slides, as elaborated with reference to FIG. 6.

Single Slide Imaging Device

Figure 6:
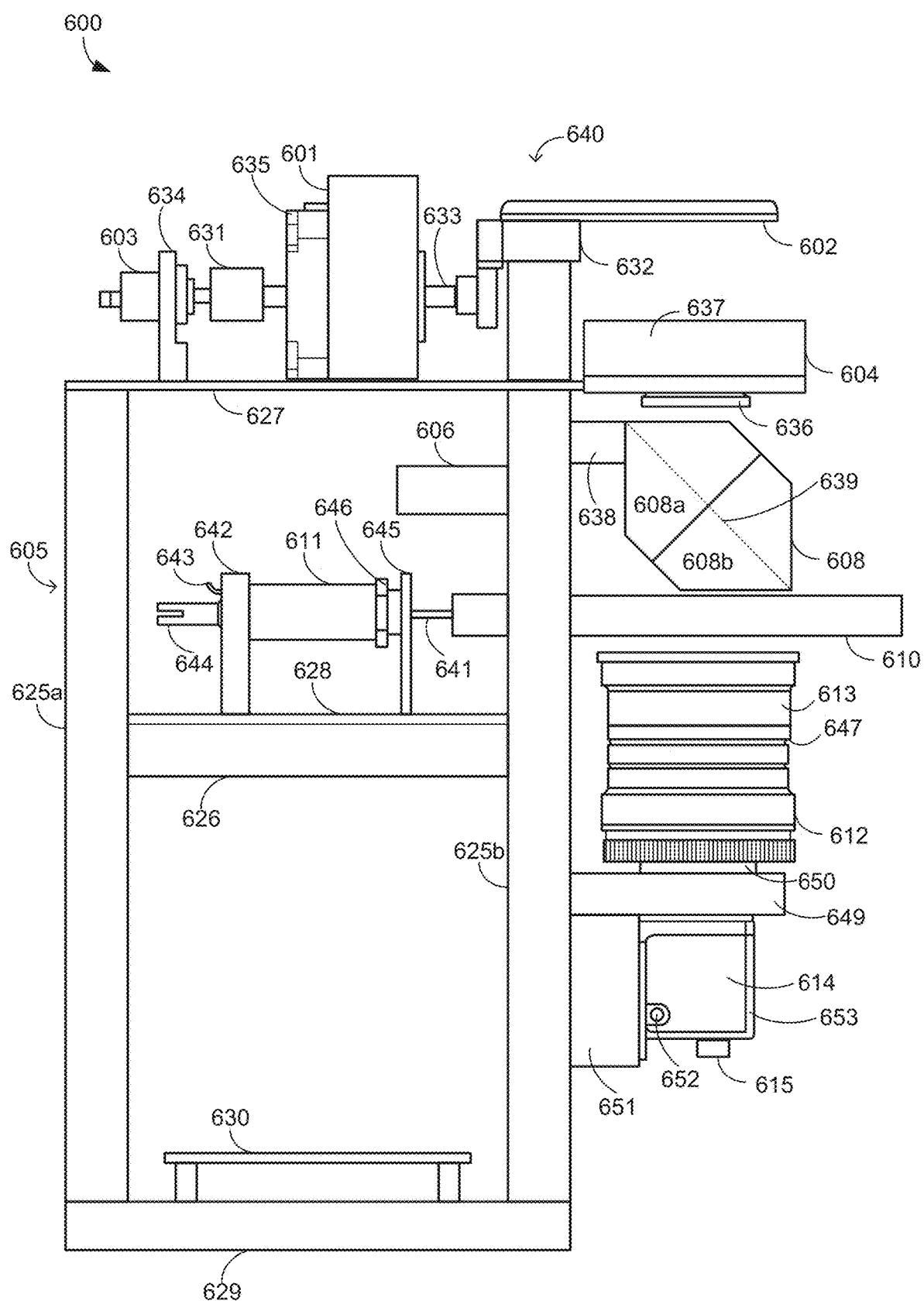
FIG. 6 shows a diagram of components in a first embodiment of a microarray assay imager.

The imager of the present disclosure may adopt several configurations and component arrangements. An example detailed embodiment 600 of an imager (such as the imager of FIG. 1) suited for single-side imaging is shown in FIG. 6. The configuration of the imager of FIG. 6 matches the configuration shown schematically in FIG. 1 in orientation and component alignment.

Imager 600 includes a frame 605 to which the various optical components are coupled. The components may be arranged at various levels or stacks. Each level arranged perpendicular to a longitudinal axis of frame 605. In one example, frame 605 may be sized to fit imager 600 is a standard imaging chamber. Frame 605 includes vertically arranged supporting rods 625*a-b* connected via cross beam 626. While the depicted example shows two supporting rods (a distal rod 625*b* and a proximal rod 625*a*), any number of supporting rods may be present. In one example, cross beam 626 may be coupled to the supporting rods at a mid-height location, as depicted. However, in alternate embodiments, frame 605 may include multiple crossbeams configured in any other configuration that provides support for the various optical components mounted to the frame.

An upper level of frame 605 may include upper platform 627 on which a first group of optical components are arranged. A second group of optical components may be arranged on a second platform 628, configured on cross beam 626. A lower platform 629 may be configured on a lower level of frame 605, substantially coupling the bottom of supporting rods 625*a-b* to each other. As such, lower platform 629 may act as a supporting base of the imager. To enable stability of the imager (e.g., to prevent imager 600 from toppling over), lower platform 629 may be configured to be thicker and heavier than upper platform 627. In some embodiments, lower platform 619 may be made of a different material than the rest of frame 605. A raised sleeve 630 may be arranged on lower platform 629. Element 630 represents an electronic circuit board that serves as the electronic controller and computer interface for the imager system.

Frame 605 may be made of a rigid material such as heavy duty plastic, metal, or an alternate material to which components of the microarray imager may be bolted, adhered or otherwise fixed in position. In some examples, frame 605 may be furthermore mounted within an enclosure. The enclosure may comprise a commercially available cabinet, or box, sized to house the microarray imager. In an alternate embodiment the enclosure may be a custom unit with openings suitable to readily access the target and to block light contamination during image acquisition.

The first group of components arranged on upper platform 627 may include a movable target stage 602 coupled to one of the supporting rods 625*a-b* via seat 632. Target stage 602 may be arranged towards a distal end 640 of imager 600, on upper platform 627 such that the target stage is parallel to upper platform 627 but offset away from the plane of frame 605. Specifically, target 602 may be arranged like a cantilever. Target stage 602 may be a standardized stage, dimensioned to receive target sample slides of standard dimensions. For example, target stage 602 may be designed to receive, for example, a 96 well plate, a 386 well plate, or a slide holder such as the one shown in FIG. 10. In the depicted embodiment, target stage 602 is configured to fit a single array slide which may be on porous nitrocellulose.

While the depicted embodiment shows target stage 602 on upper platform 627, it will be appreciated that in alternate embodiments, target stage 602 may be positioned on a base, or lower platform 629, of the imager, in which case the optical components may be configured in an opposite orientation to the arrangement shown. An example of such an embodiment is described herein with reference to FIGS. 7-9.

A position of target stage 602 may be adjusted by stage controller 601. Specifically, stage controller 601 may be coupled to seat 632 via coupling rod 633. Stage controller may move coupling rod 633 along an x-y plane (parallel to upper platform 627) to thereby move seat 632 into or out of the plane of frame 605. Based on the motion of the seat in the x-y directions, a position of target stage 602 may be adjusted. The motion allows for the positioning of a microarray slide, arranged on target stage 602, to be adjusted so that a specific area of the slide can be imaged or focused on. Stage controller 601 may be operated mechanical or via motorized action. In the depicted example, stage controller 601 is coupled to an encoder 603 via shaft 631 such that the controller position is continually measured by the encoder 603 and the position information is provided to electronic interface 630. Stage controller 601 may be coupled to upper platform 627 via fastening mechanism 635 and fastening mechanism 635 may be an integral part of controller 601. Fastening mechanism 635 may include screws, bolts, brackets, or any of the kind that are appropriate for strength and stability. Stage controller 601 may be powered using electrical energy, such as from a battery. Encoder 603 may be coupled to upper platform 627 via clamp 634. In some instances, encoder 603 may be an integral part of stage controller 601, in which case the controller 601 may be self-correcting for position or offer a means to the electronic interface 630 to provide positional accuracy.

A white light source 604 may be arranged directly below target stage 602. White light source 604 may be mounted on an extension of upper platform 627 extending out below target stage 602. Alternatively, white light source 604 may be fixedly mounted to distal supporting rod 625*b*. The white light source may be used to illuminate bar codes, or for capturing colorimetric assays. White light source 604 may include miniature incandescent bulbs or LED emitters, for example. The white light source may be a different light source from a diode laser 606 included in the imager and may be further capable of producing full spectrum, or white light. In one example, white light source 604 is used to identify the target slide while diode laser 606 is used to image and identify the contents of the target slide. White light source 604 may include a housing 637 in which the light source is housed and a focusing lens 636 for focusing the white light delivered by white light source 604.

Positioned directly underneath white light source 604 is a beam splitter 608. The beam splitter may be, for example, a dichroic mirror, such as dichroic mirror 104 of FIG. 1. Beam splitter 608 may be coupled to distal supporting rod 625*b* via clamp 638. Beam splitter 608 may be composed of two substantially symmetric components 608*a* and 608*b*. The beam splitter components may be pentagonal in shape and may be arranged in a tail-to-tail configuration such the combined beam splitter has a substantially hexagonal shape. Further, beam splitter 608 may be arranged with a central axis offset from the longitudinal axis of distal supporting rod 625*b* by an angle (e.g., by 30-45 degrees).

A laser 606 is positioned between upper platform 627 and second platform 628, substantially at the same height as beam splitter 608. In the depicted example, laser 606 is couple to distal supporting rod 625*b* at a location below the location where clamp 628 is coupled to distal supporting rod 625b. In addition, laser 606 is coupled on an opposite face of distal supporting rod 625b as compared to clamp 628 and beam splitter 608 such that laser 606 is aligned below seat 632 and coupling rod 633. Laser 606 may be arranged parallel to platforms 627, 626, and 629. Laser 606 may be a diode laser for pulsed or continuous wave excitation at a single (or narrow range) wavelength as described with reference to FIG. 1.

A filter slide 610 may be arranged immediately below the beam splitter 608, parallel to, and slightly above second platform 626. The filter slide 610 may comprise different filters to constrain passable wavelengths. During a multiplexed assay, a filter may be changed to best match the permitted light with the emission peak of the target fluorophores, such as the target QNPs. An example filter is described in greater detail below with reference to FIG. 11.

In some examples, imager 600 may include software that enables the filter to be automatically changed during a multiplexed assay based on various assay parameters or operator settings. A filter slide control 611 may receive input from a computer coupled to the imager to change the filter, for example to read emission wavelengths from different QNPs. Filter slide 610 may be coupled to filter control 611 via shaft 641. Filter slide control 611 may be fixedly mounted to second platform 628 via clamps 642 and 645. Filter slide control may be coupled to clamp 645 via fastening mechanism 646 which may include bolts, screws, and/or rivets. Filter slide control further includes an electronic cable connection 643. By adjusting the extension of shaft 641, a specific filter may be selected in filter slide 610.

In alternative embodiments, filters of filter slide 610 may be interchanged to permit a different wavelength or range of wavelengths. In another example, an imager in accordance with the present disclosure may comprise a single filter suited for reading QNPs within a specified emission spectrum range, obviating the need for filter change or filter control Lens system 612 may be arranged directly below filter slide 610. Lens system 612 may comprise one or more lenses 613. Lens system may include any lens suitable to focus light for clear image capture by camera 614 arranged at the bottom of the optical stack. For example, lens system 612 may comprise a commercially available, short range zoom lens 612. A zoom of the lens system may be controlled by a computer coupled to the imager at the request of program software or permanently fixed at an optical focal plane for a particular sample arrangement. The lens may comprise several indents 647, or telescope points that allow the focal plane of the lens system to be adjusted. Lens system 612 may be coupled to lens platform 649 fixedly attached to distal supporting rod 625b. Lens platform 649 may include a circular indent 650 with a central aperture that is arranged concentric to the optical axis of lens system 612 so that light focused by lens system 612 can be captured by the underlying camera 614.

Camera 614 may be a CCD camera of the kind described herein. The camera may be a commercially available camera. The camera may be affixed directly to distal supporting rod 625a via coupling 651. In addition, camera 614 may be coupled to a lower surface of lens platform 649 while lens system 612 is coupled to the lens platform at an upper surface. In some embodiments, camera 614 may be further held within a case 653 designed for a specified camera, wherein case 653 is bolted to coupling 651 via bolt 652. The operations of the camera may be controlled by a computer and associated software, such that external buttons 615 or other controls on the camera itself may not be adjusted. Control of the camera exposure may be controlled by software specific to the image capture device of the present disclosure. Example algorithms and methods for image capture are described herein with reference to FIGS. 14 and 16.

Multiple Slide or Plate Imaging Device

Figure 7:
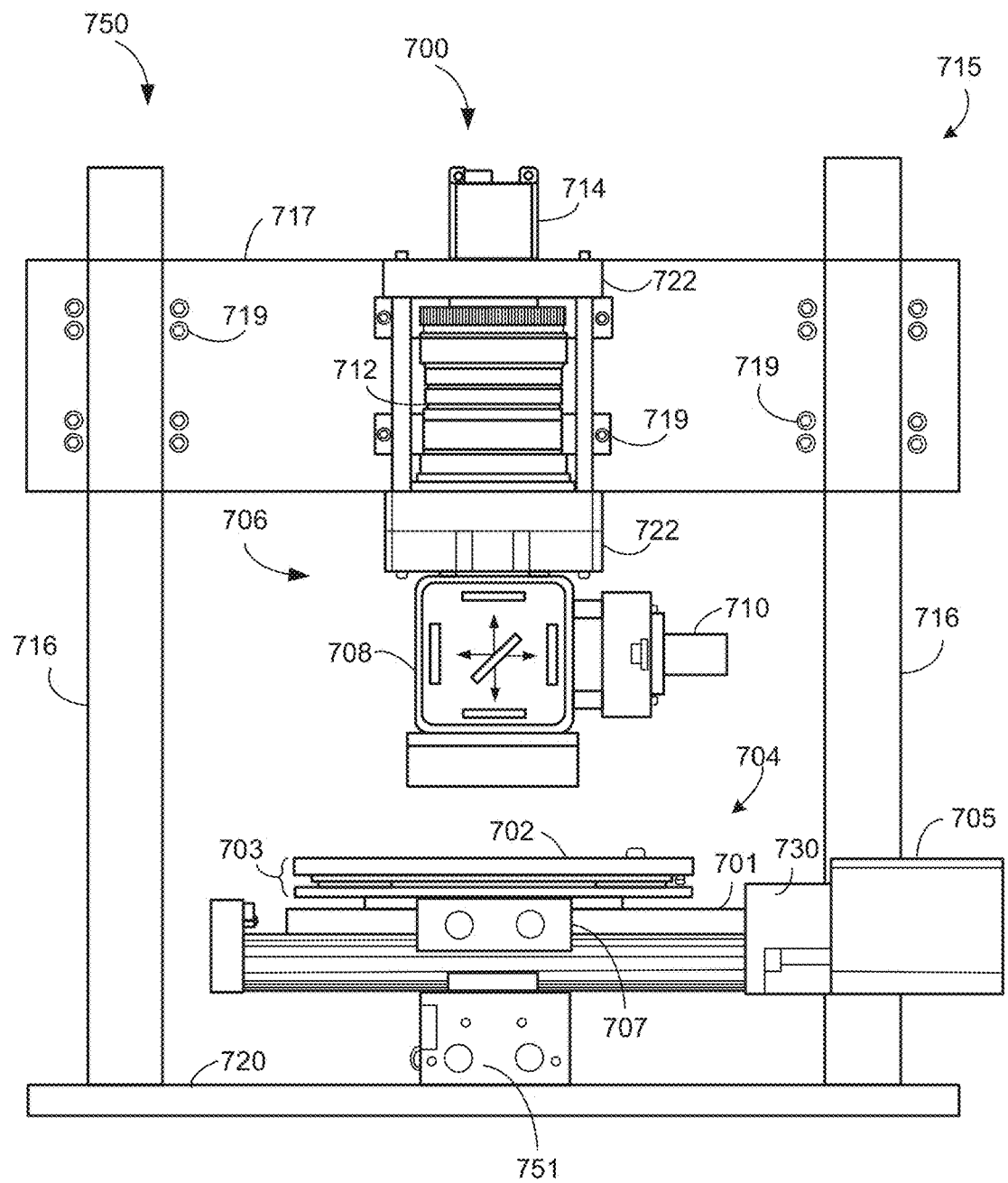
FIG. 7 shows a front view of a second embodiment of a microarray assay imager.

The embodiment of the imager shown in FIG. 6 may be best suited for imaging arrays on a single slide format. As another example, the single-slide embodiment of the imager may be used for imaging sections of a microscope slide target. In another embodiment, the imager may be equipped with an X-Y axial motion table (herein also referred to as a stage) for imaging multiple slides, as shown at FIG. 7. One example target configuration includes four slides, arranged side-by-side, in an adapter tray, as shown at FIG. 10.

In still other embodiments, the imager may be configured to image microtiter plates, for example individual wells of a 96-well or 384-well microtiter plate. Further, the imager may be configured to image wells contained within up to four microscope slides. Furthermore, the imaging device may be adapted to image strips of a microfluidic assay (such as a lateral flow assay). In such a configuration, regions within each slide may be compartmented as shown at FIG. 10. This reduces the requirements of the imaging system so that only a fraction of the slide can be imaged at one time, and individual images may be combined to form a larger image as a post-processing task. For example, a 96-well plate could be divided up into 24 individual images and combined later through post-processing. Furthermore, a robotic X-Y positioner table may be used to position the target slide or plate within the objective field of view.

A front view 760 of an example embodiment 700 of the imaging device configured with an X-Y motion table is shown in FIG. 7. The embodiment of FIG. 7 utilizes the same sequential arrangement of optical components as that shown in FIG. 6. However, in the embodiment of FIG. 7, the target slide is placed at the bottom and the camera is arranged at the top of the imager. In other words, the configuration of FIG. 7 may be 180 degrees opposite to the arrangement of optical components in FIG. 6.

In example embodiment 700, imaging device 700 has a target holder 702 that is joined to an X-Y motion table 704. Movement of the x-y motion table is controlled by a servomotor 705 subject to input from an attached computer as dictated by controlling software described in greater detail herein below.

Target holder 702 may be sized to fit standardized sample plates, slide adapter trays, or customized array devices. An example slideholder is shown in FIG. 10. Target holder 702 may have a depth 703, which is dimensioned to accommodate a sample plate or slide holder. The target holder 702 may be attached to a positioning rod 701. The positioning rod may be a square, rectangular, or conical rod. The lateral position of the target holder 702 along the positioning rod 701 is controlled by rotary motion of gears within gear box 707. The motion of the gear box may be controlled by servomotor 705. Specifically, actuation of servomotor 705 may transfer torque for moving positioning rod 701 via coupling device 730. The motion table may be software-controlled and configured to move sample arrays in a designated pattern to the focal area of the imaging device for image capture. The X-Y motion table 704 may be removably affixed to the remainder of the imaging device via assembly 751. This allows for a configuration where imaging components can comprise a handheld or portable remote acquisition head that may be easily removed or attached to the target holder 702 and X-Y motion table 704.

The acquisition head 706 of the imaging device 700 comprises the components necessary to capture an image of the target. Closest to the target holder 702 is positioned a combined beam splitter and filter 708. This is in contrast to the embodiment of FIG. 6 where the components comprise two different pieces of the imager. The beam splitter redirects light from the light source 710 by 90° toward the lens 712. The light source 710 may be a diode laser or other light source. The lens may comprise any lens capable of focusing light such that a clear image of the target may be passed on to the camera 714. The lens 712 may comprise a commercially available camera lens as describe above with reference to 612 of FIG. 6.

The camera may be affixed to the top of the lens bracket 722. The lens bracket 722 may comprise a housing to hold the lens and to further attach to the beam splitter and filter 708 on its bottom edge and the camera 714 on its top edge. The lens bracket 722 may be attached to the mounting frame 715 by fasteners 721. Fasteners 721 may allow the lens bracket 722 to be readily removable from the mounting frame, for example in the case of an imaging device with a remote acquisition head. Fasteners may comprise snaps, wing nuts, hook and loop fastener, or brackets as non-limiting examples.

In the second embodiment of the imaging device pictured in FIG. 7, the acquisition head 706 may be attached to a mounting frame 715. The mounting frame may comprise two upright arms 716. The upright arms may provide a vertical point to affix components of the imagine device. Spanning the upright arms 716 may be a horizontal cross beam 717. The horizontal cross beam 717 may be attached on to the upright arms 716 by fasteners 721. In alternate embodiments, a mounting frame may comprise a single integrated component, for example a molded mounting frame.

The frame may be further bolted within an enclosure or housing (not shown). Attachment points on the base 720 of the mounting frame may be used to attach or secure the mounting frame, and components of the imaging device therein to an external housing. In one example, the base may comprise a metallic plate with regularly spaced threaded holes. The threaded holes suitable for attaching the upright arms 716, or for attaching a base 720 of the mounting frame 715 within the housing. In another example, the base may be integral to the housing, forming a bottom surface of the enclosure and the attachment point for the mounting frame.

The housing may comprise a solid, opaque material, for example plastic or metal, with an opening suitable to access the target holder. The opening and other seams or apertures within the enclosure may be fitted with a seal suitable to prevent light contamination during image acquisition and prevent leaking of potentially harmful UV radiation. The housing may comprise a commercially available cabinet, or may comprise a custom built component designed specifically to house the imaging device of the present disclosure.

The attachment of the acquisition head to the mounting frame may be easily undone to allow the acquisition head to be easily separated from the frame and XY motion table such that it may be coupled elsewhere for image acquisition. A remote acquisition head may be coupled to a mounting frame by snaps, hook and loop fastener, wing nuts, magnets, etc., as non-limiting examples. Applications for such a remote acquisition head are described in greater detail below.

Figure 8:
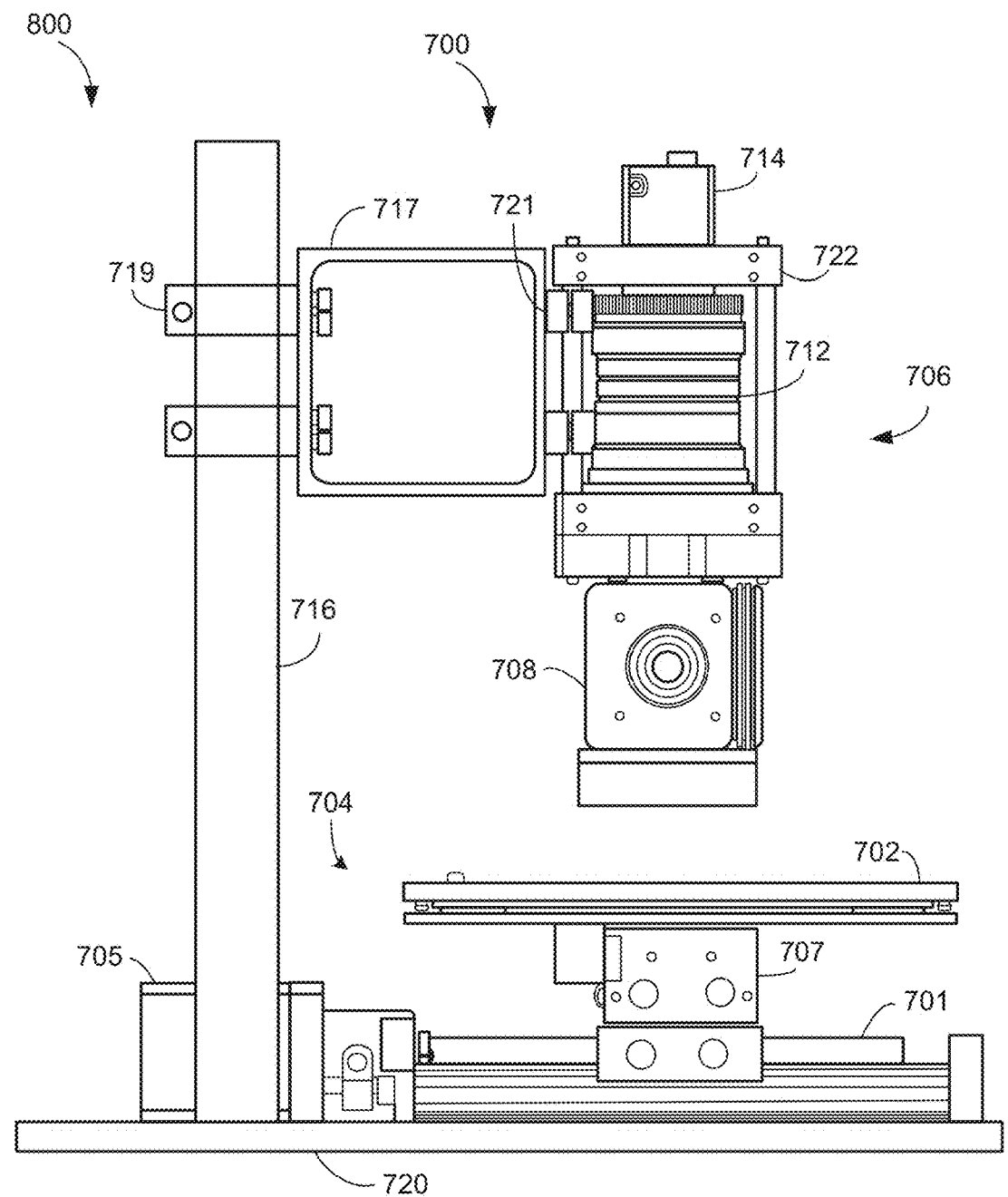
FIG. 8 shows a side view of the second embodiment of the microarray assay imager.

Turning now to FIG. 8, a side view 800 of the imaging device 700 is shown. From the side view the light source is not visible as it is blocked by the combined beam splitter and filter 708. A slight variation of an X-Y motion table 702 is shown with more spacing between the base of the motion table 704 and target holder 702. It should be appreciated that any suitable X-Y motion table may be used.

The lens bracket 722, may further comprise, or be attached to, the cross beam 717. The cross beam may be a rigid component suitable to distance the optical stack comprising the lens, camera, filter and beam splitter. In an embodiment where the acquisition head may be removable, the fasteners 721 may attachably connect the acquisition head to the cross beam 717. Bolts 719 may connect the crossbeam 717 to the upright arms 716 of the mounting frame.

Figure 9:
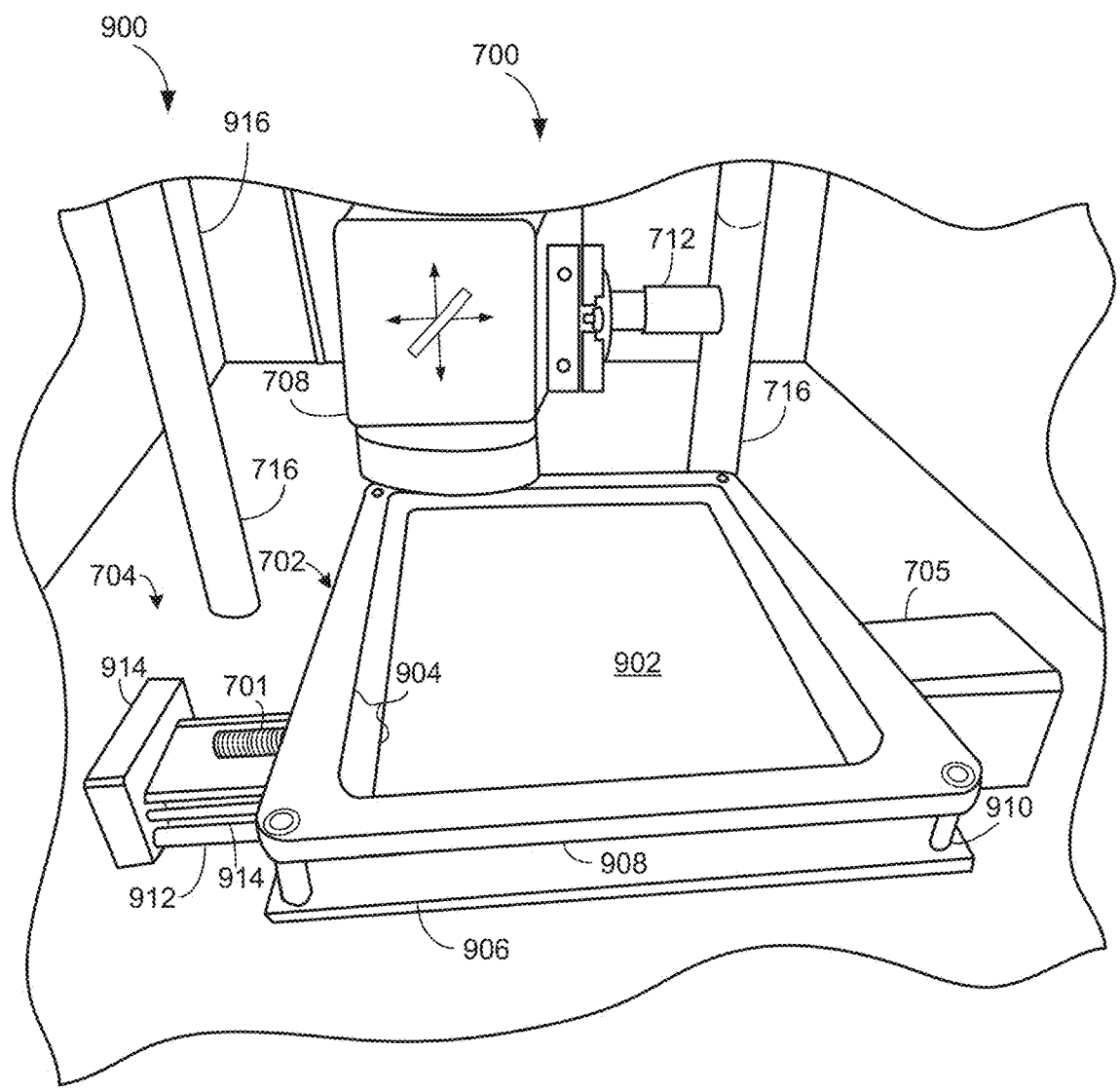
FIG. 9 shows a partial perspective view of the second embodiment of the microarray assay imager.

Turning now to FIG. 9, a partial perspective view 900 of the imaging device 700 is illustrated. In the forefront, target holder 702 may be seen comprising a recessed portion 902. The recessed portion may be sized to accommodate a slide adapter tray like the one shown in FIG. 10, for example. The recessed portion 902, may have a depth 904 to accommodate the height of the slide adaptor tray (shown at 1006 in FIG. 10). The recessed portion 902 of the target holder 702 may be formed from a base 906 of the target holder which is held to the top surface 908 by pins or bolts 910 at its corners. In the depicted example, base 906 is thinner than surface 908.

The target holder 702 may be moved by the X-Y motion table 704 so that different sections of the target holder may be imaged. The position rod 701 may be threaded so that action of the servomoter 705 on the gear box (not visible in FIG. 9) causes the target holder 702 to progress along the length of the position rod. It should be appreciated that an additional position rod may be underneath the target holder 702 at 90° to the position rod to control motion in the same plane in a perpendicular direction.

Position rod 701 may be arranged above a table base 912 of the XY motion table 704. The base may comprise grooves 914. The grooves 914, may provide a ledge, or point of contact for the gear box 707 (shown in FIGS. 7 and 8) to move within and along position rod 701. Furthermore, the table base 912 may have at its terminus a motion stop 914. The motion stop 914 may serve as a brake to the movement of the target holder 702 along the position rod 701.

The mounting frame 716 may be arranged inside a housing 916 the back corner of which is shown. The housing may comprise a closed box, cabinet or other light proof enclosure such that light contamination will effect imaging of the array and so that an operator is not exposed to potentially harmful UV radiation, and that light contamination does not affect image acquisition. The housing may, on its front side, comprise an opening through which the target holder may be accessed. The corners, seams, and openings in the housing may comprise a seal or lining to further prevent light permeation.

It will be appreciated that based on the configuration of the imager, the slide adapter may be configured to receive microarray slides at a top, middle, or bottom region of the imager. Two example embodiments are shown with reference to FIGS. 19A-B. Specifically, FIG. 19A depicts an embodiment wherein the slide adapter is located at a front, bottom region of the imager. Herein, the slide adapter may be moved out of the plane of the imager to receive a microarray slide, the adapter then moved back into the plane of the imager to initiate scanning of the slide. Herein, the light source may be arranged in an upper region of the imager. In comparison, FIG. 19B depicts an embodiment wherein the slide adapter is located at a top region of the imager. A top surface of the imager may be slideably moved out of the plane of the imager to reveal the slide adapter tray. An operator may then insert the microarray slide in the adapter and then slideably move the top surface of the imager back into the plane of the imager to cover and hide the slide adapter tray and initiate scanning.

Turning to FIG. 10, an example slide adapter tray is pictured. The slide adapter tray 1000 is configured to hold 4 slides, although the slide adapter tray may be configured to hold more or less slides of varying dimensions. Slides may be configured to have a single array spanning a single slide, or may comprise 4 smaller symmetric arrays such as shown at 1002. In addition to sample arrays, slides may be configured with barcodes 1004. The barcodes may serve to identify the samples blotted on a specific array and may further encode information readable by software to dictate a type of array, or image capture parameters.

The slide adaptor tray may comprise 4 slide wells 1008. Each well 1008 may comprise a recessed opening within the broader frame 1010. The wells 1008 comprise a depth 1012 sized to accommodate a standard glass slide. The external dimension of the slide adaptor tray may be that of a 96 well plate or 386 well plate, such that a single target holder 702 (shown in FIG. 9) may be used for a variety of assays.

Furthermore, a slide adapter tray configured to rest within the target holder of the present disclosure may vary per assay type. For example, a colorimetric assay may use a different slide adapter tray than a fluorescent QNP assay. The different trays may vary in their height 1006. The differing heights may be utilized if different light sources have different focal depths. Additionally or alternatively, a distance between the target holder and the acquisition head of the imager may be variable such that different focal planes may be achieved. The slide adapter trays may also vary for identification or differentiation purposes. For example, a controller of the imager device may be able to recognize the adapter tray based on its specific identification mark, color, or height, and determine the assay type intended. Based on the inference of assay type, the controller may automatically, without requiring input from an operator, adjust imager settings. For example, a light source, focal plane, duration of imaging, position of slide, etc. may be automatically adjusted. Conversely, an imaging device of the present disclosure may be fitted with a solenoid or other mechanism to automatically change the focal distance per light source.

A single slide may contain an array with sample spots dotted in an assigned matrix. A typical assay grid is arranged as N×M, where N is the number of columns and M is the number of rows of spots. Each spot may be from 50 microns to 200 microns in diameter, for example. The spots may be placed apart with twice the diameter of the spot separating the center of adjacent spots. It should be appreciated that arrangement of sample spots, as well as density of spots, may vary based on assay type.

Turning to FIG. 11, an example filter wheel 1100 is shown. The embodiments of the imager shown in FIGS. 7-9 utilize a combined filter and beam splitter, but as shown in FIGS. 1 and 6, a separate filter and slide may be used in other embodiments. In cases where multiplexed assays will employ multiple QNPs with varied emission spectra or where colorimetric, SYPRO Ruby or other dyes are used, a readily switchable filter wheel such as the filter wheel of FIG. 11, may shorten the time it takes to perform a microarray assay.

Each filter may permit light of a narrow wavelength range such that, in the case of a multiplexed assay, a filter whose range matches a peak emission may be used to image the array for a given QNP. The filter may be switched to image QNPs at a different wavelength that may be conjugated to a different antibody, for example. Such a filter wheel may be incorporated to an imager of the present disclosure such that it may be changed automatically by a program controlling the assay. Alternatively, the filter wheel may be manually changed in response to a software prompt, when the program is ready to image the emission spectrum from another QNP, for example.

The example filter wheel shown in FIG. 11 comprises five filters arranged concentrically. Filters 1102, 1104, 1106, 1108, and 1110 may differ in the wavelengths of light they permit to permeate. The filters may be optimized for 625, 660, 710, 800 and full spectrum light, for example. Such a filter wheel would allow for rapid reading of a multiplexed assay utilizing 4 differing QNPs. The addition of a full spectrum filter may allow for reading a barcode for example, or for colorimetric assays. In alternate examples, more or less filters may be included in filter, arranged concentrically with a distance between consecutive filters increasing as the number of filters on the wheel decreases.

Changing of a filter may occur by rotating the filter around its central axis 1112. At the center of the filter wheel, a pivot point 1114, may serve as a connection point to the imaging device. The filter slide control (such as shown at 611 in FIG. 6) may be configured to rotate the filter wheel 1100 by specific degree values such that the center of the filter is aligned with the light axis through the camera (shown at 112 in FIG. 1). Alternatively a mechanism may be in use that employs mechanical stops, such as the alignment of screws 116, for example, to determine alignment of the filters 1102, 1104, 1106 1108 and 1110.

White Light Source for Colorimetric Assay

Colorimetric assay detection may be incorporated into an imaging-based instrument by substituting a white-light source instead of the laser source used in fluorescent detection, and substitution of visible light filters centered on the preferred visible-wavelength channel. A white light source may be included as part of the imager of the present disclosure. The white light source may be switchable with a pulsed laser diode and/or other light source. The white light source may be switched manually by an operator of the imager. Alternatively, a computer controller may be used to alternate the light source as the request of an operator (e.g. as dictated by input to controlling software) or autonomously upon detection of a specialized sample plate for example. In this way, colorimetric assays such as may be performed by the imager of the present disclosure.

An example depiction of a colorimetric assay capture is shown at FIGS. 12A and 12B. Specifically, FIG. 12A depicts the output of a colorimetric assay captured by an imager at a first, earlier time point 1200 (time point 1). The image captured here show array spots of varying intensity. For example, assays spots 1202 and 1204 are of light and medium intensity respectively at time point 1. FIG. 12B depicts the output of the colorimetric assay captured by the imager at a second, later time point 1206 (time point 2). The image captured at the later time depicts an alternation in the intensity of some array spots and the appearance of new array spots. For example assays spots 1202 and 1204 are now of medium and dark intensity respectively. Furthermore, assay spot 1208 has developed by the second time point. By comparing the spots (location, intensity, etc.) of FIGS. 12A and 12B, the progress of a colorimetric assay can be studied. As such, FIGS. 12A-B provide just one example of a type of assay where a white light source may be used in an array setting. Furthermore, a time element may be utilized to capture array images at programmed time points such that time sensitive assays may be image by the imaging device of the present disclosure. For example, an enzymatic assay may be monitored as it progresses. For example, if a dye-conjugated antibody binds a cleavage product of a molecule but not the molecule as a whole, the imager may be used to monitor such an assay. As another example, a chemiluminescent assay may be monitored at different time points where the chemiluminescent signal varies over time.

A variety of sources may be used to provide white light illumination in colorimetric detection. White light-emitting diodes (LEDs), colored LEDs, as well as various incandescent lamps may be used. Optimal imaging of colorimetric assays may be performed with illumination wavelengths in the green region of the electromagnetic spectrum, such as the 500 nm-550 nm range. For these wavelengths, many types of optical filters are available, including transparent colored glass. An example filter is Thor Labs green glass filter (part number FGB37).

Remote Data Acquisition

In an example configuration of the imager, the target may be a microscope slide or similarly formatted slide or plate. Imaging and evaluating of the microarray are performed one slide at a time. However, in some applications, a user may desire to scan or image multiple slides or microtiter plates, in which multiple arrays are contained within a single target. Known solutions for this application are automated slide loaders used as an add-on accessory to fluorescence scanners. Some of the autoloaders are designed for microscope format while others are designed for ANSI/SBS (American National Standards Institute/Society for Biomolecular Screening) compliant microtiter plates. Incorporation of a slide loader into a scanner may be a costly solution, often increasing costs of a digital scanner by 30% or more. The imaging portion of the present disclosure may be removed and used in conjunction with existing machinery including microplate readers, sampling robots, and others types of automated assay systems, thereby reducing complexity relative to an autoloader solution. Methods of using a remote data acquisition head which may form a removable part of the imager of the present disclosure or may comprise standalone equipment are described below.

A second method of accommodating microtiter tray imaging involves the use of a remote acquisition head for the imager. This may be particularly useful when only one fluorescent label (wavelength) is used. Herein, the optical components may be simpler since only one emission filter is needed. Thus, the laser, beam splitter, emission filter, and camera can be incorporated into a single, monolithic remote fluorescence analyzer unit. Such a unit may be mounted permanently within an automated slide or plate handling robot. In one embodiment the unit may exist as a fixed analyzer and the plates can be moved into the field of view of the imager. In another embodiment, the remote acquisition head may be made part of a moveable gantry that can be brought into alignment with the slides or plates in order to image the microarrays printed onto the slides. This methodology is in contrast to conventional digitizing scanners, which cannot be easily attached to a moveable gantry for automated assay analysis.

An example remote acquisition head is described below in reference to FIG. 13. The remote acquisition head 1300 may comprise the imaging components of a stand-alone imaging device contained within an enclosure 1302. The enclosure may comprise a plastic, metal or other light blocking housing. The housing may comprise several openings, through which components of the imager may be accessed, for example an electrical outlet or image capture opening. Where openings in the enclosure may exist, a gasket, caulking or other light blocking seal may be present to prevent light contamination during image capture, or possible leaking of potentially harmful UV radiation.

The enclosure may comprise a body 1301 and a lid 1303. The lid may be a sealed component that is integral to the enclosure 1302. In another embodiment, the lid may be hinged, or otherwise removably fastened to the body of the enclosure so as to provide access the components of the imaging device for repair, replacement etc. The lid may be fastened by a magnet, clasp, lock or other suitable mechanism to hold the lid to the body of the enclosure creating a light blocking seal.

The enclosure may serve to hold components together in rigid alignment. The enclosure may shield the components from dust and moisture, and prevent light pollution to the camera from affecting image capture. Any variations of the type of these components described above are possible in a remote acquisition head. A key feature of the remote acquisition head is the absence of a sample stage. Instead of an integrated sample stage, the enclosure is fitted with an opening that allows a laser source 1312 to protrude out. Allowing the laser to protrude beyond the enclosure may reduce the overall size that the enclosure may occupy, making the remote acquisition head increasingly portable and more readily able to fit within existing mechanisms or machines.

The imaging components comprise a camera 1304, lens 1306, filter stack 1308, dichroic mirror 1310 and white light illuminator 1314 as described above with reference to the embodiments of FIGS. 1 and 6. The lens may comprise a commercially available, short range zoom lens. Zoom may be controlled by the computer at the request of program software or an operator to find an optical focal plane for a particular sample arrangement. The lens may comprise several indents 1307, or telescope points that allow the focal plane to be adjusted.

The camera may be affixed to the top of the lens bracket 1309. The lens bracket 1309 may comprise a housing to hold the lens and to further attach to the filter 1308 on its bottom edge and the camera 1304 on its top edge. The lens bracket may be affixed to the inside of the enclosure 1302 or be integral to the enclosure, for example.

The remote acquisition head may be arranged so that a target may be aligned below the white light illuminator 1314. The enclosure 1302 may comprise an aperture to focus illumination and image capture by interfacing with an existing sampling device, for example. In an alternate embodiment, a fiber optic light guide (not shown, described in greater detail above) may extend beyond the enclosure to flexibly attach to a robotic sampling head, microtiter plate reader or other. The remote acquisition head may contain certain electronic connections for operation of the camera 1304 and the lens 1307 if the lens is equipped with an automatic focus or iris adjustment. The remote acquisition head may also contain electronic connections to the laser 1312 and white light illuminator 1314. Each of the mentioned electronic connections are provided so that a main computer that operates positioning and assay management may also operate the camera 1304, lens 1307, laser 1312, and white light illuminator 1314. Such connections may be in the form of Universal Serial Bus (USB), serial (such as RS-232), direct connections such as control lines, power connections, and feedback or monitoring connections as appropriate.

A software/hardware interface 1316 may form an interaction point for the remote acquisition head to communicate with a computer, or sample handling equipment to control image acquisition. The software/hardware interface may comprise a USB hub for control of the camera and laser, a current source for the laser, and a power supply for the USB hub. The software/hardware interface may be located on an alternate surface of the enclosure, or may be arranged flush to the enclosure. The software/hardware interface 1316 may contain connections that interact with the remote acquisition head connections mentioned.

For precise operation of the remote acquisition head, a software application or library may control certain functions such as laser power adjustment (on/off and power level), camera control, image acquisition, error handling, and communications with a host program. The software may be provided as a library that can be imported into the software code for the host program (the host program may run on a personal computer). The library may contain connections that accept commands and parameters that a user may employ to send instructions and parametric values to the remote acquisition head. Thereby, the user may position the acquisition head over the target array to be imaged, send instructions to the library to turn on the laser and capture an image. The imager may then report the image back to the host program. In this manner, the capabilities or functions of the remote acquisition head may be limited to laser control and image acquisition and may not include any positioning functions. In principle, however, the software library need not be a different software than the standalone product; a remote operation of the software with limited access to specific functions will suffice. Although a general library can be designed to control the remote acquisition head, it is expected that bespoke field-deployable libraries can be designed specifically for particular applications. A software library provided as control of the remote acquisition head functions may interact with the remote acquisition head through the software/hardware interface 1316 by way of specific or general software drivers.

In another example, the imager may be designed as described above in reference to FIGS. 6-8, however, in place of a microarray slide target, a flexible optic light guide may be used. The light guide may be of a high-resolution type such as used in medical imaging. The light guide may be suitable for use over a wide range of wavelengths, from violet to NIR. Typically, such flexible light guides are composed of an array of optical fibers bundled together. Each of the fibers within the array is permanently fixed in place and maintains its position relative to the array. Thus, there is a 1:1 relationship between the input of the bundle and the output of the bundle such that a transmitted image remains coherent from end to end. Use of the flexible light guide may allow separation from the target by a considerable distance, for example, as much as several meters, without sacrificing the quality of the optical image.

In some embodiment, the array analyzer may be designed as a monolithic fluorescence imager that stands on its own. To analyze microarray slides or microtiter plates, the light guide may be attached to a moveable gantry that can be brought into alignment with the microarray slides or plates in order to image the microarrays printed onto the slides.

Multiplexed Assays

Microarray multiplexing may offer the ability to perform measurement of several analytes per assay. It is possible to design assays with various protocols to achieve multiplexing, but a simple case is where each label of interest is bound to a fluorescent species. Because different QNP wavelengths may be excited with the same 405 nm source, the present disclosure may use several wavelength combinations of QNP-conjugated labels within the same protein assay. A method for unfolding or de-convoluting the various wavelength signals emitted simultaneously by the labels may be performed and is described in greater detail herein below.

Using the system and methods of the present disclosure it is possible to design an assay in which several QNP species have been conjugated to individual labels, and all of the label conjugates have been combined in the same assay. The imager of the present disclosure may be able to detect all of the individual QNP conjugates through the use of optical filtering. FIG. 4 shows four QNP emitters whose emission peaks are centered at 625, 655, 705, and 800 nm, respectively. The imager may accomplish this by imaging the target successively using optical band pass filters that are tuned to the individual QNP wavelengths. However, despite the use of pass band filters, there will be an inevitable overlap of emission from adjacent QNPs that leads to an overestimation of the signal of interest. The present disclosure describes a way to correct for this spurious background when multiplexed assays are measured.

Overlap between adjacent QNP emission peaks is clearly present among the different QNPs, and is especially significant between adjacent QNPs. Typically, the QNPs at 625, 655, 705, and 800 nm intersect at their 50% intensity levels for adjacent species (shown in FIG. 4). If the emission from a multiplexed assay is measured consecutively with each band pass filter, the signal from a particular QNP will be in error by the overlap of the adjacent QNP emissions. If not corrected for, this may lead to inaccurate estimates of relative concentrations of labels conjugated to individual QNP species.

It will be appreciated that while the examples herein relate to multiplexed assays that use wavelength multiplexing, in alternate examples, single wavelength assays may also be performed.

Time-Modulated Fluorescence Emission

Similarly, natural fluorescence of PNC provides a comparably broader emission line than that of fluorophores. Thus, we expect that for the PNC background, the energy levels will be unstable relative to the QNPs. Therefore, we can conclude that the lifetime of fluorescence in PNC is also much shorter than in QNPs and the emission will be correspondingly fast, as with the fluorophores. This fact will be exploited in the following.

Figure 5:
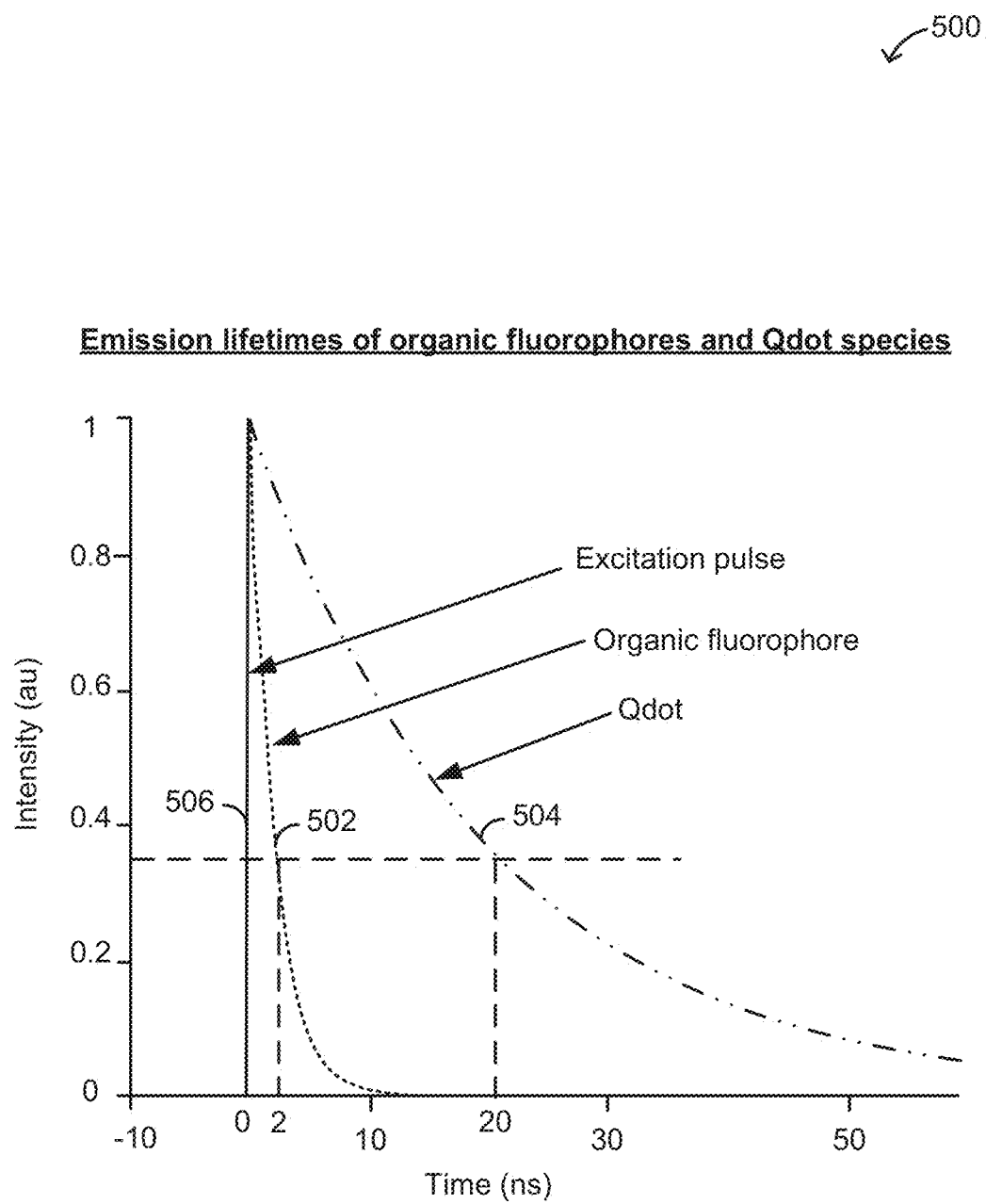
FIG. 5 shows emission lifetimes of organic fluorophore and QNP species.

FIG. 5 shows representative time-domain emission curves for an organic fluorophore (2 ns) and a QNP nanoparticle (20 ns), as advertised by a current manufacturer of both organic fluorophores and QNPs. Following excitation by a short laser pulse, emission from the fluorophore is rapid, decaying to negligible intensity after a few nanoseconds. By contrast, the QNP emission persists up to 50 ns.

Using the 1/e decay rate of each species, we can calculate the frequency bandwidth of the emission, which is $$f = \frac{2\pi}{\tau}$$

where $\tau$ is the 1/e decay rate. Frequency bandwidths of the two example fluorescent species are provided in Table 1. If the above analysis bears out, the signals from the QNP labels and the PNC background could be separated, in principle, on the basis of frequency bandwidth.

To separate the two characteristic signals (QNP emission vs. PNC background), a time-domain or frequency-domain detection method may be used. In its simplest embodiment, the time-domain method would require the laser to be briefly pulsed on with an on-time of a few nanoseconds. The detector would be left in an off state prior to, during the laser pulse, and for up to about 10 ns following the trailing edge of the laser pulse. After this time period, the light from the PNC background will be essentially dissipated and the following light will be nearly all a result of the QNP emission. At that point in time, the detector could be turned on to receive the fluorescent light that is nearly all due to QNP emission.

The implementation of the pulsed detection method requires the use of a very fast optical detector whose spectral response is within the visible-to-NIR range. Such a device is realized in a silicon avalanche photodiode (APD). These solid-state devices have very rapid response times, good optical-to-electronic conversion (quantum efficiency) and have internal gain similar to a photomultiplier tube.

Overall Method of Microarray Assay

Software may control many aspects of the image capture, processing, post-processing, and in some cases data analysis for microarrays, utilizing an imaging device of the present disclosure. The overall method of capturing a microarray or other assay by an imaging device of the present disclosure is described in FIG. 14. The method 1400 starts at 1402 where a sample is received. A user input may indicate the sample has been placed in the target holder of the imaging device. Alternatively, a camera image, or sensor indicating closure of a cabinet door, or other indication may be received at the computer indicating that a sample has been input. At 1404, input as to the type of sample and assay to be performed is received. This data may be manually input by an operator via a software interface or may be detected by the imaging device and software component from a detected type of slide adapter tray, assay alignment, barcode, or other. Such data may include: sample arrangement (for example, 4 whole slide arrays, or 4 microarray slides with a 4 "wells" per slide format, or plate format); which QNPs are used and what wavelength ranges to monitor emissions at; the number of multiplexed QNPs; if a time component is to be monitored; and other parameters.

At 1406, a light source is adjusted based on input parameters. The system may prompt an operator to alter a filter, or manually change from a laser diode to a white light source, for example. Conversely, the system may be configured to automatically change the light source based on parameters input at 1404.

At 1408, reading parameters are received. Reading parameters may comprise: a direction or pattern in which to image samples based on sample alignment; starting gain or exposure time; time points at which to measure samples; what sort of image processing may be performed; and others. Reading parameters may start at a default setting. Furthermore, reading parameters such as gain, exposure time, time to acquire an image, and sample location may be input to the software by an operator at an interface such as that shown in FIG. 15. Alternatively, reading parameters may be encoded into a barcode, and scanning of the barcode may alert the imaging system as to reading parameters for the specific assay. Reading parameters may differ per the type of assay being used and this may be written into the software to alter when a different endpoint is selected.

At 1410, the system prepares for image capture. Preparations may include: moving an X-Y motion table to a defined starting position; locking a cabinet door or tripping a sensor to disable a light if the cabinet door is opened (so as to prevent light penetration during image capture); opening a temporary save folder to save images captured during optimization; saving gain and exposure time values; etc.

Figure 16:
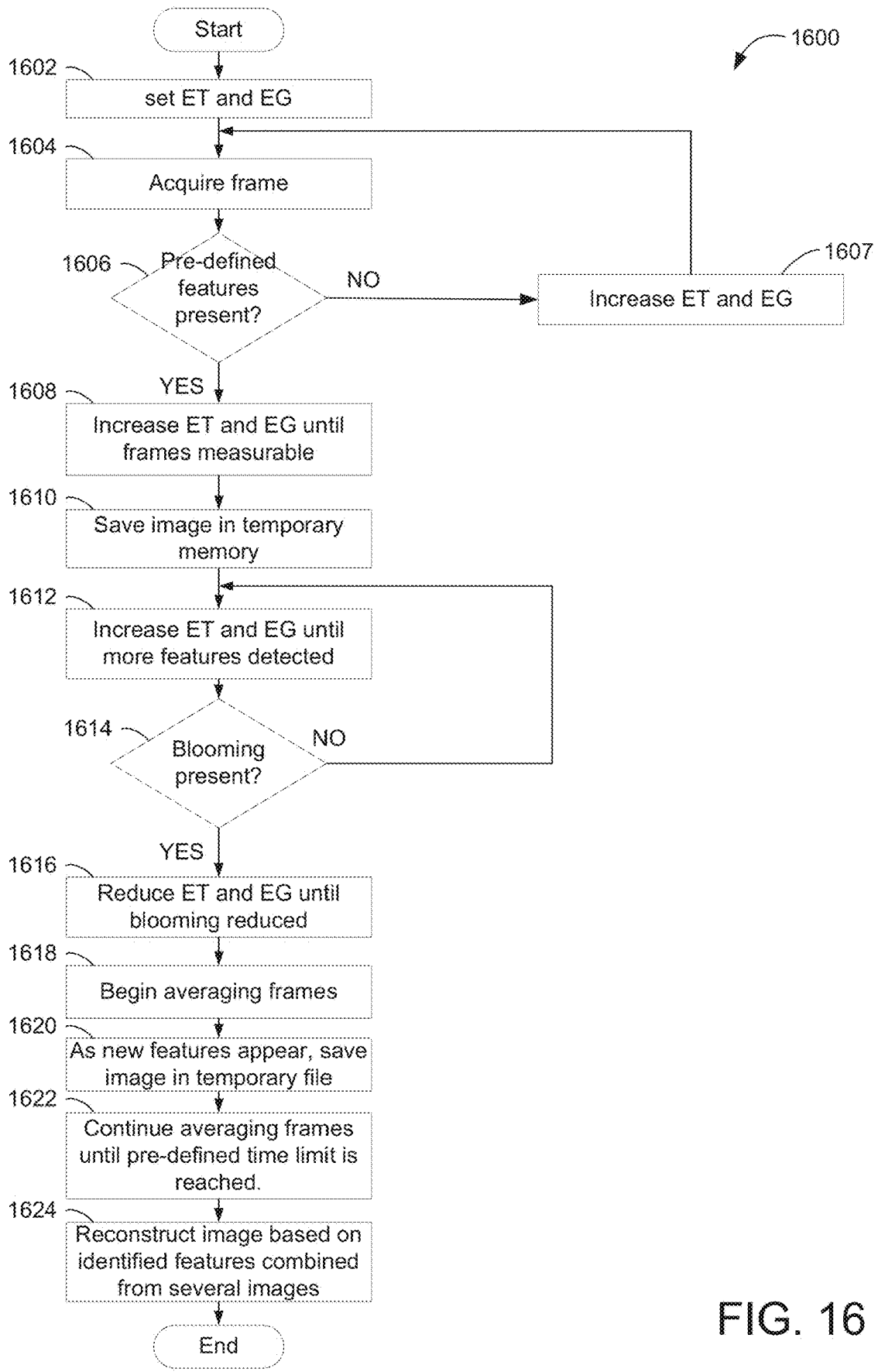
FIG. 16 shows an example flowchart of a method of image capture and optimization by the microarray assay imager and associated software.

At 1412, the scan is initiated. To initiate the scan, the computer puts into place the preparations for image capture and carries out image capture as per input parameters. During the scan the image captures progress as shown in FIG. 16. Once the scan is complete, the method proceeds to 1414 where further image processing occurs. Further image processing may comprise bit depth reformatting (described in greater detail below). In addition to manipulation of the image resolution, data image processing may comprise compiling multiple fields of view if a single array extends beyond a single field of view for the imaging device.

The data acquired in a scan is output at 1416. Data output may include overlap correction for multiplexed assays as described below in reference to FIG. 17. Furthermore data output may comprise storing any images or analyses in an output file. The output file may be a default file name and path or may be input prior to scan initiation. Imaging parameters and other applicable data may also be saved in an output folder.

Image Capture Software

The performance of an imaging instrument optimized for PNC protein assays can also benefit from image-analysis software. Software algorithms to: (1) optimize the image capture, (2) analyze the images for feature detection, and (3) provide statistical measures will be used in accordance with the system and methods of the present disclosure to collect and analyze microarray data.

The imager of the present disclosure will be equipped with a camera whose following parameters can be adjusted:

Exposure Time (ET)

Electrical Gain (EG)

Number of frames per second (FPS)

Each time the camera shutter opens, then closes a frame is captured. When the ET is increased, more photons per frame are gathered and any features within the image appear brighter. When the EG is increased, any feature captured will appear brighter due to amplification. When the FPS is increased, data may be gathered faster. The FPS cannot be increased beyond 1/RF, where RF is the refractory period of the camera shutter, which is a value just slightly larger than the ET.

Each of these adjustments has its own merits and disadvantages. For example, in a digital camera sensor, each individual pixel acts like a bucket that holds electronic charge. When photons of light are absorbed into the bucket, they convert to electrons through the process of photoemission. The pixel bucket can only hold a certain number of electrons, and then it will overflow. When an area of a target is very bright, the image produced by this feature on the sensor will cause a large number of electrons to be produced. When the pixel bucket "fills up," the excess electrons will overflow into adjacent pixels, leading to a distortion of the image, a process known as "blooming."

Using an imager of the present disclosure, blooming may be minimized by placing an upper limit on the ET for a particular radiance level. However, doing so may limit the sensitivity of the sensor to areas of the image that are not very bright. Thus, we need a way to limit the ET for some areas of the image while permitting the measurement of portions of the image that are not as bright. For example, a simple case of a microarray may include only two spots, A and B. Suppose that both spot A and spot B are imbibed with certain concentrations of the same QNP nanoparticles. Suppose further that spot A has a concentration CA and spot B contains a much lower concentration, CB. The radiance from spot A will be much larger than that from spot B on account of the concentration ratio CA/CB. If the settings are such as to permit measurement of spot A, it is likely that spot B will not be detected due to the lower sensitivity settings.

FIG. 15 shows an example software interface where an array operator may input specifications for the image capture of a particular array. The software interface may allow a user to input a starting gain and exposure time, and acquisition time. Furthermore, the user may input the type of assay being recorded (endpoint) as well as log details about the arrangements of samples within a slide adapter tray. Though a user may input starting parameters for image acquisition, the software may vary the parameters as described below in reference to FIG. 16 for optimal image capture. Furthermore, default settings may be used according to previous image acquisitions for the same type of assay.

The software interface 1500 may be configured in tabbed screens. Example tabs may include an about 1502, file info 1504, configure scan 1506 and image control 1508 tab. The interface may also feature a time and date stamp across screens. A time and date may be saved with image capture data. FIG. 15, shows example input parameters for a configure scan tab. This tab may allow an operator to input data used by an imaging device in image acquisition.

The configure scan tab 1506 may comprise a sample layout portion 1512 and an imager controls portion 1514. The sample layout portion may comprise a sample map 1516 and an option input 1518. The sample map 1516 may populate automatically based on information contained in sample barcodes. Alternatively, sample data comprising assay type, sample dates, sample concentrations, construct variants as non-limiting examples may be input manually. Option input 1518 allows the operator to select which samples should be imaged, if the imaged should be saved, and if bar codes should be read and saved.

Imager control portion 1514 may comprise basic inputs for a starting point for image acquisition. Image optimization will be described in greater detail below with reference to FIG. 16. An endpoint input 1520 may be configured as a pull down menu. Options may include a colorimetric, single or multiplexed assay, and may include options for a light source, or filter wavelength as examples. When an endpoint is selected, for example a colorimetric assay, other fields may populate to a default setting. The other fields within the imager controls portion 1514 include acquisition time 1522, exposure time 1524, master gain 1526 and a read out window 1528 for control status. The read out window 1528 may indicate the present status of the controller for the imaging device. The acquisition time 1522 and exposure time 1524 inputs may comprise pull down menus. The master gain 1526 may comprise a simulated turn knob. In other examples, scroll lists, knobs, menus, check boxes or blank inputs could be used to input image acquisition control data. In an embodiment where a selected endpoint may result in the other inputs populating at default levels, defaults may be manually overwritten.

Turning to FIG. 16, a flowchart of a method 1600 is described for optimal image acquisition. A computer associated with, or integral to, an imaging device of the present disclosure may run software encoding the method as describe below. At 1602, the ET and EG are set to relatively low default values. Alternatively, a starting point for ET and EG may be set by an operator through the software interface as described above in reference to FIG. 15. At 1604 a frame is acquired. At 1606, the image is checked for pre-defined features (such as circular spots of a certain approximate diameter). If pre-defined features are not present (NO) the method proceeds to step 1607 where the ET and EG are increased and then returns to 1604 where another frame is acquired. If pre-defined features are detected (YES), the method proceeds to 1608.

Once features are detected at 1608, ET and/or EG are increased until the features are measurable. At 1610, the image is saved in temporary memory. The file for saving a temporary image may be designated by a user or may be saved in a default file. At 1612 the ET and EG are increased until more features are detected. At 1616, the image is checked for blooming. If no blooming is present (NO) the method returns to 1612 where the ET and EG are increased. If blooming is detected (YES), the method proceeds to 1616 where the ET and EG are reduced until blooming is reduced.

At 1618, the captured frames are accumulated. At 1620, as soon as new features appear, an image is saved in the imager's temporary memory. At 1622, accumulation of frames continues until a pre-defined time limit is reached. This time limit may be a default time limit determined by the type of assay being imaged, or may be input by the user. At 1624, an imaged is reconstructed based on identified features combined from several saved images. In the case where an array is larger than a single field of view, multiple images are pieced together to provide an image of the entire array. The ET and EG values used for image capture may be saved with the image file.

Because modern Imaging sensors can provide as many as 15 frames per second (FPS) and because ET values can be as low as 100 ms, the above algorithm can be quite fast. In fact it can be on the scale of seconds as opposed to several minutes for a single scan on a scanning type instrument.

In the above embodiment, each image may be saved with its corresponding ET and EG values. The image pixel values may be scaled by the ET and EG values in order to normalize the magnitudes of the radiance (brightness) for various features.

The above method provides several advantages relative to currently-available commercial scanning/imaging instruments. These include:

(1) The effective signal-to-noise (S/N) or signal-to-background (S/B) may be improved over the extended exposure method, because the background increases faster with extended-exposure than with accumulation.
(2) The accumulation method described may be immune to "blooming" effects that result from over-exposure. This is important because a user may not repeat the assay to differentiate between high concentration and low concentration regions of the array.
(3) The effective dynamic range of the instrument may be amplified, so that scalar values can be provided as 16-bit numbers to post-processing software.
(4) Results are provided real-time, several frames (updates) per second. A technician or user may not have to wait for a full scan to complete before accessing the results.
(5) For threshold detection, scanning may terminate as soon as a pre-designated detection threshold is reached. This may be important for point-of-care diagnostic applications.

Bit Depth Reformatting and Dithering

Images may be further processed by bit-depth reformatting to increase resolution. A method is described here for increasing resolution of images, and this method may be applied after each image is acquired during the accumulation process, or as a post-acquisition process after the images are acquired and accumulated. Images are represented in a digital format by assigning each pixel within the image a numerical value whose actual magnitude is related to the brightness of the image. For example, each pixel within the image of a 16-bit unsigned integer format would have a value of between 0 and 65,535 in magnitude, corresponding to the brightness value of that pixel. A very bright pixel will have a value closer to 65,535 and a dim pixel will have a value closer to zero. Modern high-resolution immunoassay scanners process and store images in 16-bit format. However, commonly available imaging cameras are generally available in 8-bit and 12-bit versions. In an 8-bit image, only 256 unique values are represented. In a 12-bit image, only 4096 unique values are represented. For an imaging system to provide 16-bit images, what is needed is an accurate method for conversion of 8-bit or 12-bit images to 16-bit images. One possible conversion method is a simple scaling of each pixel value in the 8-bit or 12-bit image by a corresponding factor of 256 or 16, respectively. However, this will result in a 16-bit image that still only has 256 or 4096 unique values, respectively. This leads to considerable coarseness in the image, which will appear as granularity in a display of the image. A suitable process for conversion may be more robust than this, and such a method is described below.

The different methods of image post-processing may be encoded with software that accompanies an imaging device of the present disclosure. As an example of a robust numerical conversion method, consider image acquisition from an 8-bit camera and subsequent conversion of the data to 16-bit format. Individual images from the camera may be combined as in the method of FIG. 16. However, if the camera is an 8-bit format, then the resulting composite image will be 8-bit also. The following sequence of actions is then used to convert the image to 16-bit:

1. Create an empty 16 bit accumulation array for calculation purposes.

2. Acquire an h by v 8 bit image array. Store the 8 bit image array in the empty 16 bit accumulation array.

3. Acquire $N_{reps}$ successive 8 bit image arrays where $N_{reps}$ is equal to the total acquisition time multiplied by the Frame Rate. After each acquisition, add the new 8 bit image array to the existing 16 bit accumulation array. $N_{reps}$ can be as large as 256 without overflowing the 16 bit array.

4. Once $N_{reps}$ images have been accumulated, convert the 16 bit accumulation array to 32 bit floating point. Calculate the scaling factor as 256 divided by $N_{reps}$. Multiply the 32 bit floating point accumulation array by this scaling factor. Once scaled, convert the 32 bit floating point accumulation array back to unsigned 16 bit accumulation array.

5. Apply a dithering algorithm such as a Floyd-Steinberg dithering algorithm to reduce the remaining granularity of the image. The Floyd-Steinberg dithering algorithm is just one example of a suitable dithering algorithm, and a variety of other dithering algorithms would be appropriate.

Dynamic Range Extension

Applying a dithering algorithm to an accumulation of 8 bit image arrays is adequate when the intensity of the dimmest points of interest are above the background and the intensity of the brightest points of interest are not yet the maximum value of 255. In instances when this is not the case, a different method must be employed which extends the dynamic range of the intensity values. Such an algorithm may be implemented as follows:

1. An h by v 8 bit image is acquired and each intensity value recorded in an image array. If any intensity value equal to or greater than 255, the ET and EG are reduced until all intensity values are less than 255. The suitable ET is recorded and an iteration counter is set to 1.

2. The intensity of each pixel of the image is then compared to the value of 127. If there are no pixels with intensity greater than 127, the image is stored in an image array. If there are pixels with intensity greater than 127, the pixels with intensities less than or equal to 127 are set to zero. This modified image is then stored in a modified image array.

3. A new exposure time is chosen which is twice the original exposure time. The value in the iteration counter is multiplied by 2. A new image is taken with the new exposure time. The intensity of each pixel of the image is then compared to the value of 255. If there are no pixels whose intensity is equal to 255, the image is stored in the image array and the new exposure time is stored.

4. If there are pixels with intensity equal to 255, these pixel intensities are set to zero. This de-saturated image is stored in a de-saturated image array. The pixel intensities of the modified image array are multiplied by 2. The modified image array and the de-saturated image array are added pixel-by-pixel, and the resulting array is stored in the image array.

5. Using this algorithm, the dynamic range is effectively increased by 2×, resulting in a 9-bit image. If still more dynamic range is desired, then the new exposure time is stored as the original exposure time, and the entire process as described in 1-4 is repeated. The process can be repeated up to 8 times, which would result in a 16 bit image.

If fewer iterations than 8 are desired, but it is still desirable to cast the image into 16 bits, the intensity values stored in the image array are multiplied by a factor. The factor is equal to 256 divided by the number of times the algorithm was executed.

In this way, the dynamic range of the imager is improved. Specifically, by stacking images taken with the light source off (e.g., with the laser off), a background correction may be learned. By then stacking images taken with the light source on (e.g., with the laser on), and then subtracting the learned background correction, the dynamic range of the imager is enhanced. In addition, multiple images captured across a microarray slide can be used to reconstruct an overall image. This allows imaging to be performed with fewer iterations.

Multiplex Overlap Correction

Because the emission profile of each QNP is Gaussian regardless of concentration (shown in FIG. 3), the curve shape is predictable. Thus, the fraction of overlap between two adjacent QNP emission peaks is a value that does not depend on the intensity level of either QNP peak. Because total radiance from a QNP sample is proportional to the concentration of QNP nanoparticles within that sample, the total overlap increases with increasing concentration. These facts may be exploited to determine an overlap matrix for several QNPs that can be inverted and used as a correction to any measurement of multiplexed QNPs, for the purpose of reducing or completely eliminating the overlap error, and thereby producing a better measurement of relative QNP concentrations within a specimen.

For example, a spot of a particular QNP, say 625 nm, may be printed on a PNC matrix, then illuminated with short-wavelength light. The QNP 625 will emit light in a band centered about 625 nm with a Gaussian half-width of about 20-40 nm. If the emitted light is measured with the 625 nm filter interposed in the beam, the resultant signal will represent the radiance of light that is transmitted by the 625 nm filter. However, if a 655 nm filter is used to measure the light, a radiance value that corresponds to the amount of overlap of the QNP 625 nm light within the 655 nm emission window (See FIG. 4) is produced. Using the pass band filters at 705 nm and 800 nm, corresponding results for the overlap of the 625 nm emission within those wavelength bands, respectively, will be produced. These overlap values represent coefficients of a transformation matrix that converts radiance of emitted light to detected signals that contain both the signals of interest as well as the overlap errors. If this matrix is inverted, it can be applied to any measurement of multiplexed QNP signals. This application may result in corrected values of the signals that now have had the overlap removed.

Figure 17:
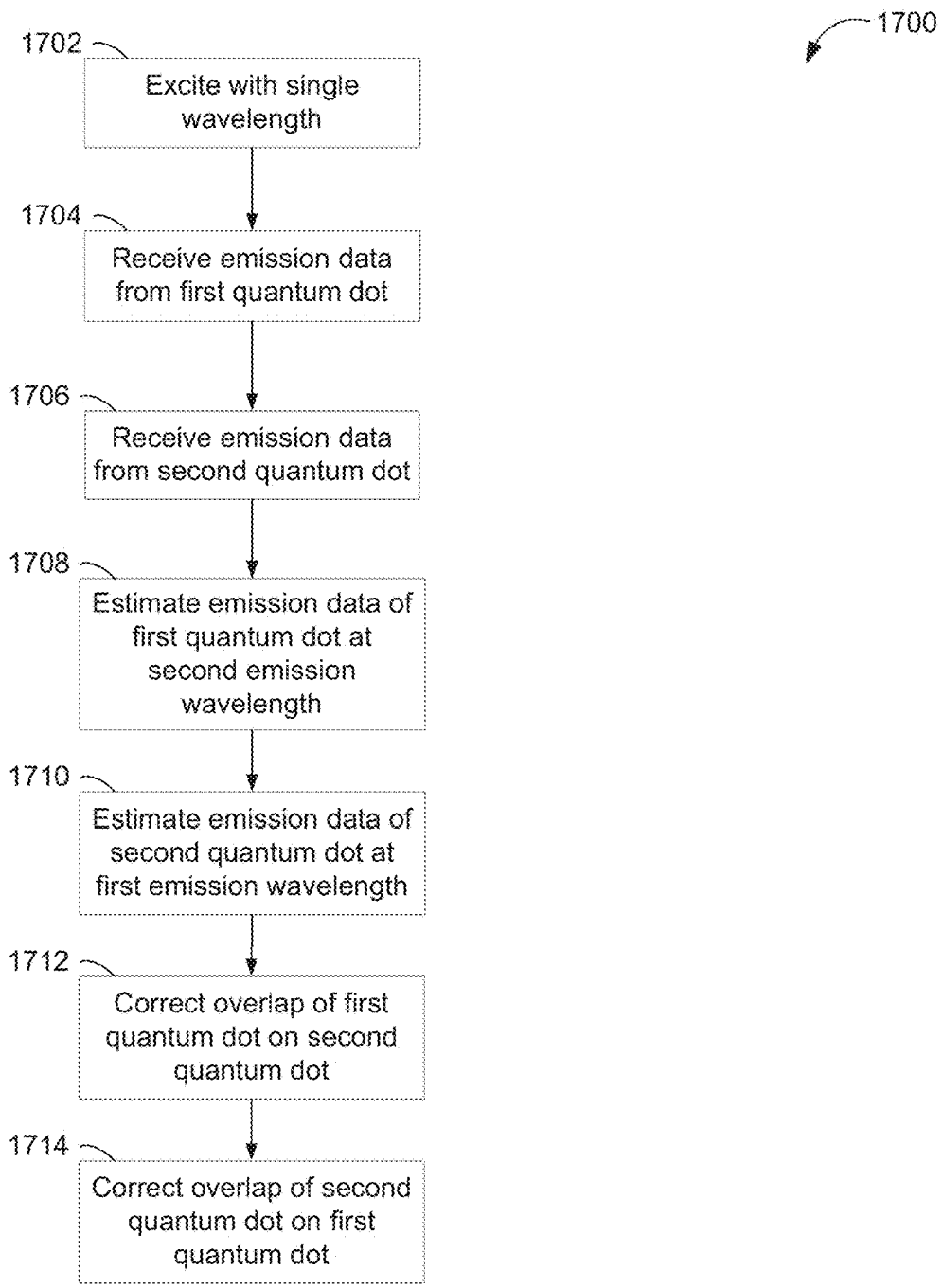
FIG. 17 shows an example flowchart of a method of overlap correction for deconvoluting multiple QNP emission spectra.

A method for overlap correction is shown in FIG. 17. The method may be programmed into software suitable to run an imaging device of the present disclosure as well as capture and process resultant array images. The method 1700 for overlap correction starts at 1702 where a QNP array is excited with a single wavelength. At 1704 emission data from a first QNP is received. At 1706, emission data from a second QNP is received. Emission data from a first and second QNP may be received through different filters that are optimized for their peak emissions. The QNPs may differ in their range peak emission wavelengths, however may still emit light within the range of the filter selected for the other QNP. At 1708, an estimation is made of the emission data of the first QNP at a second emission wavelength. This estimation may comprise the proportion of the total received emission within the range of wavelengths that is likely to be contributed by the first QNP. At 1710, an estimation is made of the emission data of the second QNP at a first emission wavelength. Similarly this estimation may comprise a percentage of the emission at the detected range is contributed by the second QNP. At 1712, the overlap of the first QNP on the second QNP is corrected. At 1714, the overlap of the second QNP on the first QNP is corrected. These corrections comprise removing the estimated contribution of the first QNP to the second QNP and vice versa.

The method 1700 describes overlap correction of two QNPs with different peak emission wavelengths. However, the method may be applied to any number of QNPs with sufficiently different peak emission wavelengths by comparing the emission at different wavelengths and comparing relative contributions of each particular QNP based on its predictable Gaussian range of emission wavelengths.

As an example of the overlap correction, consider FIGS. 18A and 18B. In FIG. 18A the intensity (radiance) of four different QNP spots whose images were measured when interposing four different band pass filters are plotted. Each group of columns shows the primary color for the particular filter as well as the contribution of non-primary QNP bands that are overlapping into the particular filter. As can be seen from FIG. 18A, errors due to overlap can be as large as 25%. In FIG. 18B the resulting radiances after overlap correction are shown. The resulting errors may be reduced to the range of 1-2%.

The above described technique arises from the Gaussian nature of the QNP emission bands and represents a solution to a known, existing problem in wavelength multiplexing: the measured signals are in error when adjacent emission bands overlap. Although a Gaussian emission peak has been used in the forgoing example, the method is not confined to only Gaussian emission profiles. A Gaussian profile will result in a mathematically easier correction scheme as opposed to a different, irregular profile.

In principle, the overlap values of various QNPs for various filters may be measured on an instrument during the manufacturing process. These values can be mathematically rendered and stored on-board the imaging instrument of the present disclosure, where they can be later used to correct for overlap errors in multiplexed assays.

Alternatively, overlap coefficients may be more accurately derived by spotting control dots within each assay. Each control spot would contain only one type of QNP and would be measured with each filter. The computer software would create the correction matrix based on these measurements. Because PNC provides greater emission signal strength (radiance) when used together with QNP nanoparticle emitters, the accuracy of the overlap correction method is increased relative to clear nitrocellulose film or functionalized glass substrates.

In one example, a system for microarray imaging comprises a laser excitation source aligned obliquely to a light measurement path via a dichroic mirror, an adjustable frequency band pass filter, a digital optical receiver, and a processor having instructions for processing and storing images generated by the optical receiver. The laser excitation source may be a discrete diode laser excitation source. The storing may include storing images of nitrocellulose microarray slides coupled with protein samples, the protein samples multiplexed with a plurality of quantum nanocrystal species of varying emission wavelengths. The estimating may include estimating overlap contribution of each of the plurality of quantum nanocrystal species at each of the varying emission wavelengths. An output of each of the plurality of quantum nanocrystal species may then be corrected based on the estimated overlap contribution.

In another example, a microarray system comprises a microarray slide including a porous nitrocellulose substrate, a sample coupled to the substrate, and each of a plurality of quantum nanocrystal fluorophore species multiplexed to a target analyte of the sample, the plurality of quantum nanocrystal fluorophore species having a common excitation wavelength and varying emission wavelengths. The system further comprises a slide reader including an opening for receiving the slide, a discrete diode laser excitation source for exciting the plurality of quantum nanocrystal fluorophore species on the slide, the excitation source aligned obliquely to a light measurement path via a dichroic mirror. The reader further includes one or more band pass emission filters for filtering light emitted by the fluorophore species, the one or more emission filters based on the emission wavelengths of the plurality of quantum nanocrystal species. The reader also includes a digital optical receiver for receiving light from the emission filters along the light measurement path, and a processor. The processor may be configured with instructions for capturing an image of the slide, quantifying the light received from emission filters, estimating overlap contribution of each of the fluorophore species based on light emitted at each of the emission wavelengths, correcting the quantified light based on the estimated overlap correction, estimating an amount of target analyte present in the sample based on the correction, and storing the image of the slide. In one example, the target analyte is a protein. Herein, the plurality of quantum nanocrystal fluorophore species includes fluorophore species having emission wavelengths between 600-850 nm. The excitation source may have a wavelength between 300-450 nm.

In yet another example, a method for overlap correction is provided comprising the steps of receiving emission data from a first quantum nanocrystal fluorophore having a first emission wavelength, and receiving emission data from a second, different quantum nanocrystal fluorophore having a second, different emission wavelength, wherein the first and second fluorophore excited at a common excitation wavelength. The method further includes estimating emission data of the first quantum nanocrystal fluorophore at the second emission wavelength, estimating emission data of the second quantum nanocrystal fluorophore at the first emission wavelength, and correcting overlap of the first fluorophore on the second fluorophore by subtracting emission data of the first quantum nanocrystal fluorophore at the second emission wavelength from emission data of the second quantum nanocrystal fluorophore at the second emission wavelength while correcting overlap of the second fluorophore on the first fluorophore by subtracting emission data of the second quantum nanocrystal fluorophore at the first emission wavelength from emission data of the first quantum nanocrystal fluorophore at the first emission wavelength. Herein, each of the first and second quantum nanocrystal fluorophore is coupled to a nitrocellulose support on a microarray slide.

In still another example, a method for detecting a protein analyte in a sample comprises, providing a sample for protein analysis on a porous nitrocellulose substrate, reacting the sample with a plurality of quantum nanocrystal fluorophores to form a multiplex of the fluorophores with protein analyte present in the sample, removing any unbound conjugates, and indicating the presence of the multiplex based on an emission spectra of the multiplex, the spectra determined at each of a plurality of emission wavelengths, the emission wavelengths based on the plurality of fluorophores reacted with the sample. The method further comprises illuminating the same with a discrete diode laser excitation source, the wavelength of the excitation source lower than each of the emission wavelengths of the fluorophores. Herein, the excitation source is arranged to provide light obliquely to the sample on the nitrocellulose substrate via a dichroic mirror. Further, a path of light emitted by the plurality of fluorophores is substantially perpendicular to the light received from the excitation source. The presence of the multiplex being indicated based on an emission spectra of the multiplex includes correcting the emission spectra of the multiplex for overlap contribution of each fluorophore of every other of the plurality of fluorophores. Herein, correcting includes estimating a contribution of each fluorophore at each emission wavelength of the plurality of fluorophores.

In yet another example, a method comprises, receiving emission data from a first quantum nanocrystal fluorophore on a porous nitrocellulose (PNC) slide having a first emission wavelength, receiving emission data from a second, different quantum nanocrystal fluorophore on the PNC slide having a second, different emission wavelength, the first and second fluorophore excited at a common excitation wavelength, and deconvoluting the emission data based on effects of the PNC on the first quantum nanocrystal fluorophore and the second quantum nanocrystal fluorophore, the effect on the first quantum nanocrystal fluorophore different than the effect on the second quantum nanocrystal fluorophore, and further based on the common excitation wavelength.

Now turning to FIGS. 20-21, example embodiments are depicted wherein a microarray imaging system is coupled to an automated microarray handling system, such as via a robotic arm of the handling system. As such, components introduced in FIG. 20 are not re-introduced in FIG. 21.

FIG. 20 shows a first embodiment 2000 wherein microarray imaging system 2002 is coupled to automated microarray handling system 2004. In the depicted example, microarray imaging system 2002 is configured as described previously at FIG. 19A. The automated microarray handling system 2004 is configured for handling (positioning etc.) of microarray slides as well as for fluid handling (dispensing etc.) for the microarray slides.

Microarray handling system 2004 includes robotic arm 2006 positioned on base 2018, the robotic arm arranged with a dispenser system 2020. Dispenser system 2020 is configured to dispense and deliver a predetermined amount of fluid into a plurality of wells of microarray slide 2010 while on slider tray 2008. Dispenser system 2020 may dispense analytes, reagents, washing buffers, combinations thereof, etc. Dispenser system 2020 includes an X,Y positioners 2014 and 2016 with respective stepper motors 2012 to control the positioning of microarray slide or plate 2012 on tray 2008. A processor of the microarray system may be configured to integrate and control X,Y positioners of the dispenser system to finely control the stepper motors so that the array of dispensers is aligned with the wells of the microarray plate. X,Y positioners 2014 and 2016 may also include tracks 2022 with wheels to enable lateral movement of the robotic arm. Iii the depicted configuration, following dispensing of fluid at the fluid handling system, the robotic arm may be configured to move the microarray plate laterally into the microarray imager so that imaging can be performed following dispensing of the appropriate fluids. For example, after dispensing an amount of analyte into each well of the microarray slide, the dispensing performed by the robotic microarray fluid handling system, the microarray slide is received at the microarray imager for imaging via the robotic arm of the robotic microarray fluid handling system. That is, the microarray slide is transported, via the robotic arm, onto a slide holder located at a predetermined position relative to the single source diode laser and the digital camera of the microarray imaging system.

In an alternate embodiment, as shown at 2100 of FIG. 21, microarray imager 2102 is mounted on microarray handling system 2004 so that dispensing and imaging can occur without requiring lateral movement of microarray plate 2010. For example, the microarray handling system may include a first robotic arm 2006 coupled to dispensing system 2020 and a second robotic arm 2106 coupled to microarray imager 2012. In alternate examples, both the dispensing system and the imaging system may be coupled to the same robotic arm. This configuration allows the imaging system to take images of the microarray plate substantially while fluid is being dispensed to the microarray slide wells.

It will be appreciated that in still further embodiments, instead of transporting the microarray slide, the robotic arm may transport the microarray imager, or a digital camera of the imager, to a position relative to the microarray slide that allows for imaging. In other words, the robotic arm may be configured to transport one of the microarray slide or the imager relative to each other. In one example, a processor of the imaging system may be configured with instructions for transporting the digital camera, via the robotic arm, to a predetermined position relative to a light source (such as a single source diode laser) and a mechanical planar assay surface (such as a microarray slide) so as to capture an image of the mechanical planar assay surface.

In one example, a method for generating an image of an assay surface comprises: capturing a first set of images of a an assay surface at a microarray imager with a laser light source disabled; mathematically stacking the first set of images to determine a background correction; then, capturing a second set of images of the assay surface at the microarray imager with the laser light source enabled; mathematically stacking the second set of images to generate an accumulated image; and applying the determined background correction to the accumulated image to generate a corrected image. Therein, the assay surface includes a porous nitrocellulose substrate on a microarray slide, the substrate coupled with a biomolecule sample, the biomolecule sample conjugated with one or more quantum nanocrystal species, and wherein the first and second set of images include images of the quantum nanocrystal species. Applying the determined background correction includes subtracting the determined background correction from the second set of images. The method may further comprise, processing the corrected image to quantify an amount of biomolecule coupled to the substrate on the microarray slide. Therein, the one or more quantum nanocrystal species may include species of varying emission wavelengths. Further, processing the corrected image may include estimating overlap contribution of each of the plurality of quantum nanocrystal fluorophores at each of the varying emission wavelengths. Capturing the first set of images with the laser light source disabled includes capturing the first set of images using one of ultraviolet or visible light. The laser light source may be a diode laser light source, wherein capturing the second set of images with the laser light source enabled includes capturing the second set of images using light of a single excitation wavelength from the discrete diode laser.

As another example, a method for microarray slide imaging comprises: operating a light source to capture a plurality of images of an assay surface on a microarray slide, the plurality of images captured across a length of the slide over a duration; and processing the captured images to reconstruct a single image of the slide. Operating a light source includes operating a light source in a visible or ultraviolet range. The plurality of images captured across a length of the slide may include images of different geographic locations of the slide captured over the duration, and processing the captured images may include placing each of the plurality of captured images in the reconstructed single image corresponding to a geographic location of the slide that each captures image represents. The imaging may be performed by a microarray imager. The method may further comprise, dispensing an amount of analyte into each well of the microarray slide, the dispensing performed by a robotic microarray fluid handling system; and receiving the microarray slide at the microarray imager, or the microarray imager at the microarray slide, for the imaging via a robotic arm of the robotic microarray fluid handling system.

In a further example, a method for microarray slide imaging comprises: operating a light source to capture a plurality of images of a microarray slide, the microarray slide including a fluorophore conjugated biomolecule coupled to a substrate of the slide, the slide further including one or more human or machine readable markings on the substrate of slide; and mathematically processing the plurality of images to reconstruct a single image of the slide, the single image including the one or more human or machine readable markings. The one or more human or machine readable markings may be positioned on the reconstructed single image in correspondence to their position on the substrate of the slide. The one or more human or machine readable markings may include, for example, manual notations, barcodes, and printed notations. Mathematically processing the one or more human or machine readable markings may include applying optical character recognition algorithms. The method may further comprise processing the plurality of images to retrieve quantitative information regarding the biomolecule and/or fluorophore coupled to the microarray slide substrate. Operating the light source may include operating the light source at a first wavelength in a visible or ultraviolet range, and further operating the light source at a second wavelength in a near infra-red range. Processing the plurality of images may include processing the plurality of images captured when operating the light source in the second wavelength to determine positions of the one or more human or machine readable markings, and processing the plurality of images captured when operating the light source in the first wavelength to determine the quantitative information regarding the biomolecule and/or fluorophore.

As another example, a system comprises a diode laser excitation source aligned obliquely to a light measurement path via a dichroic mirror; an adjustable frequency band pass filter; a digital optical receiver; and a processor having instructions for processing and storing images generated by the optical receiver. The laser emission source may be a single wavelength discrete diode laser excitation source, the discrete diode laser including one of a single-mode or a multi-mode diode laser. The storing may include storing images of assay surfaces on nitrocellulose microarray slides coupled with biomolecule samples, the biomolecule samples multiplexed with a plurality of quantum nanocrystal species of varying emission wavelengths. The biomolecule may include protein or polypeptide. The processing may include estimating overlap contribution of each of the plurality of quantum nanocrystal species at each of the varying emission wavelengths, and correcting an output of each of the plurality of quantum nanocrystal species based on the estimated overlap contribution. The plurality of quantum nanocrystal fluorophore species may include fluorophore species having emission wavelengths between 500-900 nm. The excitation source may have a wavelength between 300-450 nm. The system may further comprise an automatic fluid handling system including a fluid dispenser and a robotic arm, the fluid dispenser configured to dispense a predetermined amount of fluid including the sample at predetermined locations on the microarray slide, the robotic arm configured to transport the microarray slide into the slide reader following the dispensing.

In yet another example, a method for overlap correction comprises receiving emission data from a first quantum nanocrystal fluorophore having a first emission wavelength; receiving emission data from a second, different quantum nanocrystal fluorophore having a second, different emission wavelength, the first and second fluorophore excited at a common excitation wavelength; estimating emission data of the first quantum nanocrystal fluorophore at the second emission wavelength; estimating emission data of the second quantum nanocrystal fluorophore at the first emission wavelength; correcting overlap of the first fluorophore on the second fluorophore by subtracting emission data of the first quantum nanocrystal fluorophore at the second emission wavelength from emission data of the second quantum nanocrystal fluorophore at the second emission wavelength; and correcting overlap of the second fluorophore on the first fluorophore by subtracting emission data of the second quantum nanocrystal fluorophore at the first emission wavelength from emission data of the first quantum nanocrystal fluorophore at the first emission wavelength. Herein, each of the first and second quantum nanocrystal fluorophore is coupled to a nitrocellulose support on a microarray slide.

In yet another example, a method for detecting a target analyte in a sample comprises providing a sample for analysis on a porous nitrocellulose substrate; reacting the sample with a plurality of quantum nanocrystal fluorophores to form a multiplex of the fluorophores with target analyte present in the sample; removing any unbound conjugates;

and indicating the presence of the multiplex based on an emission spectra of the multiplex, the spectra determined at each of a plurality of emission wavelengths, the emission wavelengths based on the plurality of fluorophores reacted with the sample. The target analyte may include protein. The method may further comprise illuminating the sample with a discrete diode laser excitation source emitting light of a single wavelength, the wavelength of the excitation source lower than each of the emission wavelengths of the fluorophores. The excitation source may be arranged to provide light obliquely to the sample on the nitrocellulose substrate via a dichroic mirror. A path of light emitted by the plurality of fluorophores may be substantially perpendicular to the light received from the excitation source. Indicating the presence of the multiplex based on an emission spectra of the multiplex includes correcting the emission spectra of the multiplex for overlap contribution of each fluorophore of every other of the plurality of fluorophores. The correcting may include estimating a contribution of each fluorophore at each emission wavelength of the plurality of fluorophores.

In another example, a method comprises receiving emission data from a first quantum nanocrystal fluorophore on a porous nitrocellulose (PNC) assay surface having a first emission wavelength; receiving emission data from a second, different quantum nanocrystal fluorophore on the PNC slide having a second, different emission wavelength, the first and second fluorophore excited at a common excitation wavelength; and deconvoluting the emission data based on effects of the PNC on the first quantum nanocrystal fluorophore and the second quantum nanocrystal fluorophore, the effect on the first quantum nanocrystal fluorophore different than the effect on the second quantum nanocrystal fluorophore, and further based on the common excitation wavelength. The first and second fluorophore excited at a common excitation wavelength includes exciting each of the first and second fluorophore with a discrete diode laser.

In another example, a microarray system comprises an imaging module including each of a first and second light source, the first light source including a diode laser, the second light source configured to provide one or more of ultraviolet and visible light, the imaging module further including a digital optical receiver; an automated microarray handling module including a dispenser for dispensing a predetermined amount of liquid to a plurality of wells of a microarray plate, and a robotic arm for transporting the microarray plate between the handling module and the imaging module; and a processor having instructions for processing and storing images of the microarray plate generated by the optical receiver. The microarray imaging system is coupled to an automated microarray liquid handling system via a robotic arm of the handling system.

In this way, microarray imaging can be improved by using a combination of PNC film microarray substrate and quantum nanocrystal nanoparticle fluorophores. The approach combines selected properties of a specialized porous nitrocellulose film (PNC) with quantum nanoparticles to create an improved assay and detection sensitivity, permitting the development of a camera-based imaging system for fluorescent detection of macromolecules in microarray format. The two properties of PNC that enable this approach are the extraordinarily high binding capacity and a newly observed internal scattering of light (herein referred to as Resonance Scattering Amplification (RSA)). Quantum nanoparticles complement these PNC properties by providing a substantially higher level (e.g., 20-fold higher level) of emitted light than the fluorescent dyes in common microarray use. By identifying the fluorescence contribution of each fluorophore at different emission wavelengths in a multiplexed assay, fluorescence overlap may be corrected to improve the accuracy of fluorescence detection and quantitation. By using cameras for image capture, the microarray system can be made portable, and cost-effective, without reducing the accuracy of analyte detection. In addition, use of a digital imager provides several advantages over digital scanners including instrument cost savings, reduction in imaging time, and the ability to remotely image (e.g., as in robotic fluid handling assay systems).

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A microarray imaging system, comprising:
a microarray;
a dichroic beam splitter;
a light source including a diode laser positioned to provide laser light to the microarray via the dichroic beam splitter;
a digital optical receiver for receiving light from the light source and generating images; and
a processor having instructions stored in memory for acquiring, processing, and storing images generated by the digital optical receiver;
wherein the dichroic beam splitter is the only beam splitter in the system, wherein the digital optical receiver is a digital camera, and wherein the digital optical receiver is positioned below the microarray and below the dichroic beam splitter, with the microarray, dichroic beam splitter, and digital optical receiver aligned on a common optical axis.

2. The system of claim 1, wherein the diode laser is a single wavelength discrete diode laser excitation source, the diode laser including one of a single-mode or a multi-mode diode laser, wherein the digital optical receiver is a complementary metal-oxide-semiconductor (CMOS) image sensor, and wherein the diode laser, dichroic beam splitter, microarray, and CMOS image sensor are aligned along a common optical path.

3. The system of claim 1, wherein the microarray includes a microarray surface including a nitrocellulose microarray surface and wherein the digital optical receiver generates images of the nitrocellulose microarray surface coupled with a biomolecule sample, the biomolecule sample conjugated with one or more quantum nanocrystal species.

4. The system of claim 3, wherein each of the one or more quantum nanocrystal species has a distinct emission wavelength, and wherein the dichroic beam splitter reflects all light below a specified wavelength and transmits all light above the specified wavelength.

5. The system of claim 4, further comprising a plurality of filters filtering fluorescence emission from the microarray, the plurality of filters including a first filter and a second filter,
wherein the one or more quantum nanocrystal species are fluorophores, and wherein the processor includes further instructions stored in the memory for:
specifying an appropriate filter to position in an optical path;
acquiring resultant array images at specified emission wavelengths generated by respective filters; and
estimating an overlap contribution of each of the quantum nanocrystal fluorophores at each of the specified emission wavelengths, the estimating of the overlap contribution including estimating a contribution of each fluorophore at each of the specified emission wavelengths, and correcting an output of each of the quantum nanocrystal fluorophores based on the estimated overlap contribution.

6. The system of claim 5, further comprising a filter interchange mechanism comprising the plurality of filters coupled in the system between the digital optical receiver and the microarray, wherein the processor includes further instructions for:
adjusting a position of the filter interchange mechanism based on a specified emission wavelength;
quantifying light received via the first and second filters;
correcting the quantified light based on the estimated overlap contribution; and
estimating an amount of a target analyte contained in the biomolecule sample based on the corrected quantified light.

7. The system of claim 3, wherein the microarray surface includes a barcode, and wherein processing images includes storing generated images and stacking stored images to generate an accumulated image based on a position of the barcode in each of the stored images.

8. The system of claim 1, wherein the microarray imaging system is coupled to an automated microarray liquid handling system via a robotic arm of the handling system, the robotic arm positioned on a base of the automated microarray liquid handling system, the robotic arm arranged with a dispenser system, wherein the processor includes further instructions for:
dispensing and delivering a predetermined amount of fluid into a plurality of wells of a microtitre plate via the dispenser system, the dispenser system including X,Y positioners;
integrating and controlling the X,Y positioners of the dispenser system;
positioning the microarray imaging system over specified locations of microarrays in sequential order, and
acquiring microarray images at specified locations.

9. The system of claim 3, wherein the processor includes further instructions stored in the memory for:
capturing a first set of images of the microarray surface received by the digital optical receiver with the light source disabled;
mathematically stacking the first set of images to determine a background correction;
then, capturing a second set of images of the microarray surface received by the digital optical receiver with the light source enabled; and
mathematically stacking the second set of images to generate an accumulated image.

10. The system of claim 9, wherein the processor includes further instructions for applying the determined background correction to the accumulated image to generate a corrected image, the applying including subtracting the determined background correction from the accumulated image.

11. The system of claim 10, wherein the processor includes further instructions for processing the corrected image to quantify an amount of biomolecule coupled to the microarray surface.

12. A system, comprising:
a mechanical planar surface including a porous nitrocellulose substrate, a sample coupled to the substrate, and each of a plurality of quantum nanocrystal fluorophore species multiplexed to a target analyte of the sample, the plurality of quantum nanocrystal fluorophore species having a common excitation wavelength and varying emission wavelengths; and
a reader including:
an opening for receiving the mechanical planar surface;
a discrete diode laser excitation source for exciting the plurality of quantum nanocrystal fluorophore species on the mechanical planar surface, the excitation source aligned obliquely to a light measurement path via a dichroic mirror;
one or more band pass emission filters for filtering light emitted by the fluorophore species, the one or more emission filters based on the emission wavelengths of the plurality of quantum nanocrystal fluorophore species;
a digital optical receiver for receiving light from the emission filters along the light measurement path; and
a processor configured with instructions for:
delivering a pulse of light with the discrete diode laser excitation source to the mechanical planar surface;
maintaining the digital optical receiver off during the pulse and for a predetermined duration thereafter;
after the predetermined duration, capturing an image of the mechanical planar surface with the digital optical receiver;
quantifying the light received from the emission filters;
estimating an overlap contribution of each of the fluorophore species based on light emitted at each of the emission wavelengths;
correcting the quantified light based on the estimated overlap contribution;
estimating an amount of the target analyte present in the sample based on the correction; and
storing the image of the mechanical planar surface.

13. The system of claim 12, wherein the target analyte is a protein, and wherein the mechanical planar surface includes one of a microscope slide and a well of a microtitre plate, the system further comprising a white light source different from the discrete diode laser excitation source, wherein the dichroic mirror functions as a beam splitting device, the dichroic mirror being the only beam splitting device in the system, wherein the digital optical receiver is a complementary metal-oxide-semiconductor (CMOS) imaging sensor, and wherein the predetermined duration is up to ten nanoseconds.

14. The system of claim 1, wherein the dichroic beam splitter receives the laser light of the light source, the dichroic beam splitter positioned below the microarray, the system further having a plurality of movable filters positioned below the dichroic beam splitter.

15. The system of claim 1, further comprising a filter mechanism with filters, wherein the light source is positioned obliquely to an instrument optical axis, wherein the light source is arranged to provide light obliquely to the microarray and to the dichroic beam splitter, the microarray having a nitrocellulose substrate with fluorophores, a path of light emitted by the fluorophores being substantially perpendicular to light emitted by the light source and along the instrument optical axis, the filter mechanism positioned between the dichroic beam splitter and the digital optical receiver, the digital optical receiver being a digital camera.

16. A microarray imaging system, comprising:
a microarray;
a dichroic beam splitter;
a light source including a diode laser positioned to provide laser light to the microarray via the dichroic beam splitter;
a digital optical receiver for receiving light from the light source and generating images; and
a processor having instructions stored in memory for acquiring, processing, and storing images generated by the digital optical receiver;
wherein the dichroic beam splitter is the only beam splitter in the system, and
wherein the processor has further instructions for:
delivering a pulse of the laser light from the diode laser to the microarray;
maintaining the digital optical receiver off during the pulse and for a predetermined duration thereafter; and
after the predetermined duration, activating the digital optical receiver and generating one or more images.

17. The system of claim 16, wherein the predetermined duration is up to ten nanoseconds, the predetermined duration based on light absorption and emission properties of one or more of a quantum nanocrystal species and a nitrocellulose microarray surface.

18. The system of claim 1, wherein the microarray contains biomolecular recognition elements with more than one target analyte contained within each individual feature, such that separate target analytes are labeled with separate QNC fluorescent labels, and each separate QNC fluorescent label is excited by the diode laser and detected separately through specific selection of appropriate filters.

19. A system, comprising:
a mechanical planar surface including a porous nitrocellulose substrate, a sample coupled to the substrate, and each of a plurality of quantum nanocrystal fluorophore species multiplexed to a target analyte of the sample, the plurality of quantum nanocrystal fluorophore species having a common excitation wavelength and varying emission wavelengths, wherein the plurality of quantum nanocrystal fluorophore species includes a first quantum nanocrystal fluorophore species and a second quantum nanocrystal fluorophore species; and
a reader including:
an opening formed into a housing of the reader, the opening receiving the mechanical planar surface;
a discrete diode laser excitation source for exciting the plurality of quantum nanocrystal fluorophore species on the mechanical planar surface, the excitation source aligned obliquely to a light measurement path via a dichroic mirror;
one or more band pass emission filters for filtering light emitted by the fluorophore species, the one or more emission filters based on the emission wavelengths of the plurality of quantum nanocrystal fluorophore species;
a digital optical receiver for receiving light from the emission filters along the light measurement path as emission data; and
a processor with instructions stored in non-transitory memory for:
delivering a pulse of light at the common excitation wavelength with the discrete diode laser excitation source to the mechanical planar surface;
maintaining the digital optical receiver off during the pulse and for a predetermined duration thereafter;
after the predetermined duration, capturing an image of the mechanical planar surface with the digital optical receiver;
from the emission filters, receiving emission data from the first nanocrystal fluorophore species having a first peak emission wavelength and receiving emission data from the second quantum nanocrystal fluorophore species having a second peak emission wavelength;
estimating an emission overlap contribution of each of the first quantum nanocrystal fluorophore species and the second quantum nanocrystal fluorophore species based on light emitted at the second peak emission wavelength for the first quantum nanocrystal fluorophore species, and based on light emitted at the first peak emission wavelength for the second quantum nanocrystal fluorophore species;
correcting the received emission data from the first quantum nanocrystal fluorophore species and from the second quantum nanocrystal fluorophore species based on the estimated emission overlap contribution;
estimating an amount of a target analyte present in the sample based on the correction; and
storing the image of the mechanical planar surface, wherein the mechanical planar surface is one of a microscope slide and a well of a microtitre plate.

* * * * *